(12) United States Patent
Sipes, Jr.

(10) Patent No.: US 10,277,330 B2
(45) Date of Patent: Apr. 30, 2019

(54) FIBER OPTIC COMMUNICATIONS AND POWER NETWORK

(71) Applicant: RADIUS UNIVERSAL LLC, Lynbrook, NY (US)

(72) Inventor: Donald Lee Sipes, Jr., Colorado Springs, CO (US)

(73) Assignee: Radius Universal LLC, Lynbrook, NY (US)

( * ) Notice: Subject to any disclaimer, the term of this patent is extended or adjusted under 35 U.S.C. 154(b) by 0 days.

(21) Appl. No.: 15/915,934

(22) Filed: Mar. 8, 2018

(65) Prior Publication Data

US 2018/0219635 A1 Aug. 2, 2018

Related U.S. Application Data

(63) Continuation-in-part of application No. 15/399,397, filed on Jan. 5, 2017, which is a continuation-in-part
(Continued)

(51) Int. Cl.
*G02B 6/42* (2006.01)
*H04B 10/80* (2013.01)
(Continued)

(52) U.S. Cl.
CPC ......... *H04B 10/808* (2013.01); *G02B 6/3817* (2013.01); *G02B 6/4246* (2013.01);
(Continued)

(58) Field of Classification Search
None
See application file for complete search history.

(56) References Cited

U.S. PATENT DOCUMENTS

| 4,449,784 A | 5/1984 | Basov et al. |
| 4,715,675 A * | 12/1987 | Kevern ............... G02B 6/3838 |
| | | 385/80 |

(Continued)

OTHER PUBLICATIONS

International Search Report for co-pending International Application No. PCT/US2014,056506, dated Dec. 29, 2014 (20 pages).
(Continued)

*Primary Examiner* — Michelle R Connelly
(74) *Attorney, Agent, or Firm* — Leydig, Voit & Mayer, Ltd.

(57) ABSTRACT

A fiber optic-based communications network includes: a power insertion device, connected to multiple fiber links from a data source, configured to provide power insertion to a hybrid fiber/power cable connected to at least one fiber link of the multiple fiber links; the hybrid fiber/power cable, connecting the power insertion device to a connection interface device, configured to transmit data and power from the power insertion device to the connection interface device; and the connection interface device, configured to provide an interface for connection to an end device via a power over Ethernet (PoE)-compatible connection and to provide optical to electrical media conversion for data transmitted from the power insertion device to an end device via the hybrid fiber/power cable and the PoE-compatible connection.

14 Claims, 31 Drawing Sheets

Related U.S. Application Data of application No. 14/837,989, filed on Aug. 27, 2015, now Pat. No. 9,882,656, which is a continuation of application No. 14/836,600, filed on Aug. 26, 2015, now Pat. No. 10,171,180, which is a continuation-in-part of application No. 14/490,988, filed on Sep. 19, 2014, now abandoned, application No. 15/915,934, which is a continuation-in-part of application No. 15/262,454, filed on Sep. 12, 2016, which is a continuation-in-part of application No. 15/233,312, filed on Aug. 10, 2016, now Pat. No. 10,139,569, said application No. 15/262,454 is a continuation-in-part of application No. 14/837,989, filed on Aug. 27, 2015, now Pat. No. 9,882,656.

(60) Provisional application No. 61/880,030, filed on Sep. 19, 2013, provisional application No. 62/318,333, filed on Apr. 5, 2016, provisional application No. 62/468,548, filed on Mar. 8, 2017.

(51) Int. Cl.

| | | |
|---|---|---|
| *H04L 12/10* | (2006.01) | |
| *H04L 12/64* | (2006.01) | |
| *H04N 21/443* | (2011.01) | |
| *H04N 5/63* | (2006.01) | |
| *H04N 5/232* | (2006.01) | |
| *H04Q 11/00* | (2006.01) | |
| *H04L 25/02* | (2006.01) | |
| *G02B 6/38* | (2006.01) | |
| *G02B 6/44* | (2006.01) | |
| *H04B 10/272* | (2013.01) | |
| *H04B 10/077* | (2013.01) | |
| *H04B 10/073* | (2013.01) | |

(52) U.S. Cl.
CPC ......... *G02B 6/4292* (2013.01); *G02B 6/4293* (2013.01); *G02B 6/4416* (2013.01); *H04B 10/073* (2013.01); *H04B 10/077* (2013.01); *H04B 10/272* (2013.01); *H04L 12/10* (2013.01); *H04L 12/6418* (2013.01); *H04L 25/02* (2013.01); *H04N 5/23241* (2013.01); *H04N 5/63* (2013.01); *H04N 21/4436* (2013.01); *H04Q 11/0071* (2013.01)

(56) References Cited

U.S. PATENT DOCUMENTS

| | | | |
|---|---|---|---|
| 5,109,452 A | | 4/1992 | Selvin et al. |
| 5,242,315 A | | 9/1993 | O'Dea |
| 6,931,183 B2 | | 8/2005 | Panak et al. |
| 6,974,262 B1 | | 12/2005 | Rickenbach |
| 7,404,091 B1 | | 7/2008 | Gere |
| 8,502,733 B1 | | 8/2013 | Negus et al. |
| 8,935,543 B2 | | 1/2015 | Hunter, Jr. et al. |
| 9,742,704 B2 * | | 8/2017 | Coffey ............... H04L 41/0803 |
| 2005/0229016 A1 | | 10/2005 | Addy |
| 2006/0089230 A1 | | 4/2006 | Biederman et al. |
| 2006/0093277 A1 | | 5/2006 | Mulligan |
| 2007/0116411 A1 | | 5/2007 | Benton et al. |
| 2010/0183262 A1 | | 7/2010 | Caveney et al. |
| 2010/0299544 A1 | | 11/2010 | Hansalia |
| 2010/0319956 A1 | | 12/2010 | Ballard et al. |
| 2010/0325324 A1 | | 12/2010 | Aronson et al. |
| 2014/0029899 A1 | | 1/2014 | Isenhour et al. |
| 2014/0072264 A1 * | | 3/2014 | Schroder ............... H04J 14/00 385/76 |
| 2014/0147080 A1 | | 5/2014 | Lambourn et al. |
| 2014/0182124 A1 * | | 7/2014 | Louderback ....... H04B 10/2581 29/825 |
| 2015/0003790 A1 | | 1/2015 | Wu et al. |
| 2015/0309271 A1 * | | 10/2015 | Huegerich ............ G02B 6/4448 385/101 |
| 2016/0294475 A1 * | | 10/2016 | Chappell .......... H04B 10/25752 |

OTHER PUBLICATIONS

International Preliminary Report and Written Opinion for co-pending International Application No. PCT/US2014/056506, dated Mar. 31, 2016 (13 pages).
Technical Specification Sheet "PoE Extender over Hybrid Fiber", *Level One*, retrieved from www.level1.com/oneworld_one_brand_one_level, (3 pages).
Technical Specification Sheet, "Hybrid Fiber Cable, 12/18 AWG", *Level One*, retrieved from www.level1.com/oneworld_one_brand_one_level, (2 pages).
Data Sheet, "Hybrid Cable Assemblies", *Fiber Connections Inc.*, retrieved from www.fiber.com, DS19-7-2011, (2 pages).
Technical Specification Sheet, *Universal Interface Component of TE's Powered Fiber Cable System*, retrieved from www.te.com/TelecomNetworks ( 4 pages) 2014.
Data Sheet, "Ag5700—200W Powered Device Module", V1.2, *Silver Telecom*, Aug. 2012. (14 pages).
"Introduction to Power Over Hdbaset", *HDBaseT Alliance*, 2011, (6 pages).
Brochure entitled "Powered Fiber Cable System", *CommScope*, 2016, (6 pages).
OneReach™—PoE Extender System Brochure, "Take PoE, PoE+, and now high PoE simplicity and gigabit capability to new distances", *Berktek*, (12 pages), publication date unknown.
Article entitled: Fiber Optic Cables, Reels, Converters/Extenderes, Breakout Boxes and Rackmount, *Total Fiber Solutions*, www.camplex.com, (2 pages), publication date unknown.
Extended EP Search Report for related European Patent Application No. 14846208.8, dated Feb. 6, 2017.
International Search Report and Written Opinion of co-pending International Application No. PCT/US2017/025397 dated Jun. 16, 2017.
U.S. Appl. No. 15/399,397, filed Jan. 5, 2017.
U.S. Appl. No. 14/837,989, filed Aug. 25, 2015.
U.S. Appl. No. 14/836,600, filed Aug. 26, 2015.
U.S. Appl. No. 14/490,988, filed Sep. 19, 2014.
U.S. Appl. No. 15/262,454, filed Sep. 12, 2016.
U.S. Appl. No. 15/233,312, filed Aug. 10, 2016.

* cited by examiner

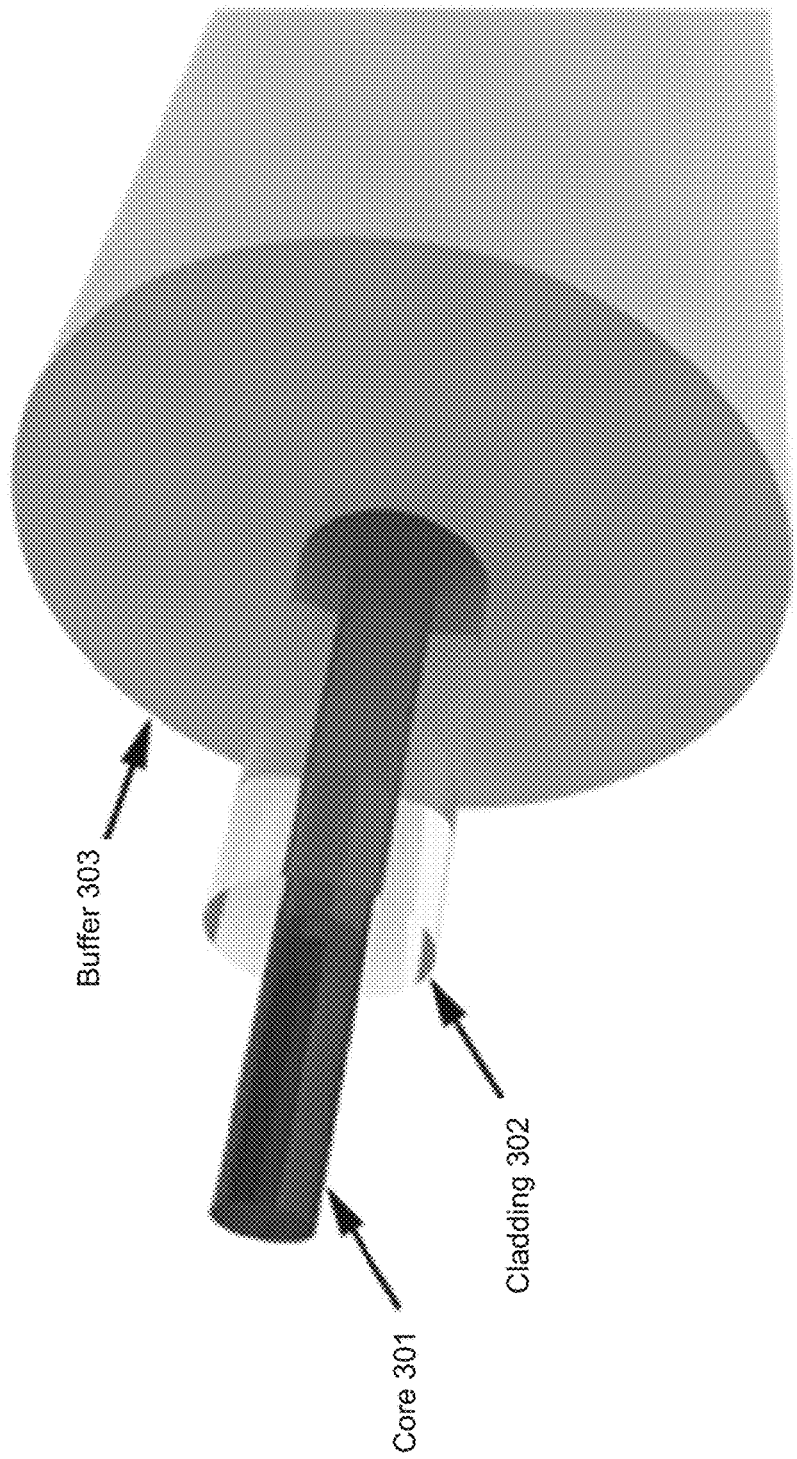

FIBER OPTIC COMMUNICATIONS AND POWER NETWORK

CROSS-REFERENCE TO RELATED APPLICATIONS

This patent application claims the benefit of U.S. Provisional Patent Application No. 62/468,548 filed Mar. 8, 2017, which is incorporated herein by reference in its entirety.

This patent application is also a continuation-in-part of U.S. application Ser. No. 15/399,397 filed Jan. 5, 2017, which is a continuation-in-part of U.S. application Ser. No. 14/837,989 filed Aug. 27, 2015, which is a continuation of U.S. application Ser. No. 14/836,600, filed Aug. 26, 2015, which is a continuation-in-part of U.S. application Ser. No. 14/490,988, filed Sep. 19, 2014, which claims the benefit of U.S. Provisional Application No. 61/880,030, filed Sep. 19, 2013, all of which are incorporated herein by reference in their entireties.

This patent application is also a continuation-in-part of U.S. application Ser. No. 15/262,454 filed Sep. 12, 2016, which is a continuation-in-part of U.S. patent application Ser. No. 15/233,312 filed Aug. 10, 2016, which claims the benefit of U.S. Provisional Patent Application No. 62/318,333, filed Apr. 5, 2016, all of which are incorporated herein by reference in their entireties, U.S. application Ser. No. 15/262,454 is also a continuation-in-part of U.S. patent application Ser. No. 14/837,989, filed Aug. 27, 2015, which is a continuation of U.S. application Ser. No. 14/836,600, filed Aug. 26, 2015, which is a continuation-in-part of U.S. application Ser. No. 14/490,988, filed Sep. 19, 2014, which claims the benefit of U.S. Provisional Application No. 61/880,030, filed Sep. 19, 2013, all of which are incorporated herein by reference in their entireties

BACKGROUND

After a number of years of enterprise Local Area Network (LAN) evolution, a stable architecture has been arrived at that has become ubiquitous worldwide (with over 3 billion LAN user connections in 2010 projected to grow to over 20 billion by 2020). This architecture is essentially a star topology where every user computer or other network connected device is connected to a Layer 2 switch via a direct cable. The upstream ports on the switch are connected to servers, routers or other switches to complete the network.

In the vast majority of these networks, the cables connecting these user devices to the switch is CAT 5 cable, and the connection protocol is 100 Megabit Ethernet with a maximum span length of 100 m. Power can be provided in addition to the communications via the Power over Ethernet (PoE) standard to a maximum of 30 W. In facilities where there are longer distances, the "edge" switches are placed closer to the user, and networks of switches are created to create an additional network upstream of the edge switch. Network performance is characterized by not only the speed of the data links, but also the delay, or latency, for the signals to go over the cable and through the layers of switching devices. The more switches in line between a user and another user or a server or the internet the worse the overall network performance.

The exponential growth in both the number of network connected devices and in the consumption of multimedia-related content places increasing demands for higher bandwidth on the enterprise networks that support them. However, conventional network configurations, which are often based on home-run connections from an edge switch to a client device based on long runs of Category 5 (CAT 5) cables, are unable to accommodate the bandwidth growth necessary to meet these increasing demands due to the limitations in bandwidth over long distances for CAT 5 cables.

In particular, Layer 2 switches comprise Input/Output interfaces and a switch fabric. Layer 2 switching is very fast and has low latency. The inclusion of other network features has led to the deployment of edge switches that have Layer 3 and 4 functionality as well. The addition of mobile users and the need for reconfigurability has led to the LAN network being overlaid with wireless multi-access networks such as defined by the 802.11 WiFi standard. Early Layer 2 star networks were used primarily for accessing local network resources such as servers, storage, or printers, or wide area network or basic WAN internet functions such as email and web page viewing. New applications, such as video viewing, rich media web or social networks and video conferencing, have increased the need for higher bandwidth, lower latency (delay) LAN networks. Unfortunately, current networks are limited to 100 Mbs by the use of the CAT 5 Cable and the lengths of the cable runs. One way that networks are being upgraded to achieve 1000 Mbs or 1 Gbs speed is by moving the edge switch closer to groups of users, often below 20 m where 1000 BaseT (Gigabit Ethernet) will run reliably on CAT 5 cable. While solving the cable speed problem, this approach introduces additional problems by both increasing network complexity and network latency.

Network administrators try to achieve better performance by upgrading the cable in the user home run links to higher grades of cable like Category 6 (CAT 6) or Category 7 (CAT 7) cable. These types of solutions are in themselves only temporary as bandwidth increases above 1 G to 10 G will only brig back the same problem. These conventional upgrade approaches, involving replacement of existing CAT 5 cables with CAT 6 or CAT 7 cables or adding remote network switches deep in the network within GbE reach of a CAT 5 cable, are not ideal, as they add significant amounts of network latency and complexity while only offering modest improvements to overall network performance. Further, these higher-category cables have significant cost premiums.

Using fiber optic links instead of CAT cables is another option in communications networks, but fiber optic technology has not gained much traction in the enterprise network context due to the high cost of conventional fiber optic transceivers, the labor costs involved in installing and terminating conventional fiber optic links, and the inability of conventional fiber optic links to interface with Power over Ethernet (PoE) connections and network components utilizing the PoE standard.

SUMMARY

The present invention discloses a method of delivering power and data communication to a point of use comprising providing a source of standard AC line voltage to a central location, running fiber optic cable from a remote source to the vicinity of said central location, converting said line voltage to low voltage AC or DC power (e.g., about 60 volts or less), providing a low voltage power cable to carry said low voltage power (e.g., up to as much as about 180 watts), and running said low voltage power cable and said fiber optic cable (e.g., by joining them in a common sheath to form a hybrid cable) from said central location to said point of use for delivering power and data communication to one or more devices.

The present invention also discloses a system for delivering power and data communication to one or more end user devices, which includes: a data source located at a remote location; a source of line voltage located in the vicinity of a central location; a fiber optic cable to convey data from said remote location to the vicinity of the central location; a device for converting said line voltage to low voltage power; and means for delivering said data and said low voltage power to one or more end user devices.

Embodiments of the invention integrate ultra-high speed communications with low-voltage powering in a simple-to-deploy and reconfigurable network, compatible with power over Ethernet (PoE) infrastructure and capable of achieving power provisioning to end devices at power levels of 100 to 180 watts or more. Further, low voltage power and high speed data may be simultaneously provided to a wide variety of devices via a single cable.

Embodiments of the invention include, for example, a fiber optic communications network having a flexible and easily reconfigurable low-cost and low-voltage architecture. The architecture includes cost-efficient optical transceivers, robust connection interface devices, fiber links having inexpensive terminations, and hybrid fiber-power cable links that transition to PoE-compatible connections. Additionally, the architecture allows for connector-less installation utilizing a low cost and easy-to-deploy fiber terminating and joining process, as well as allowing integration of power transfer and communications for simultaneous connection of both powered and non-powered devices. Further features and advantages of the invention will be discussed in further detail below.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

FIGS. 3A and 3B are diagrams illustrating components of an exemplary GGP cable.

DETAILED DESCRIPTION

Figure 1A:
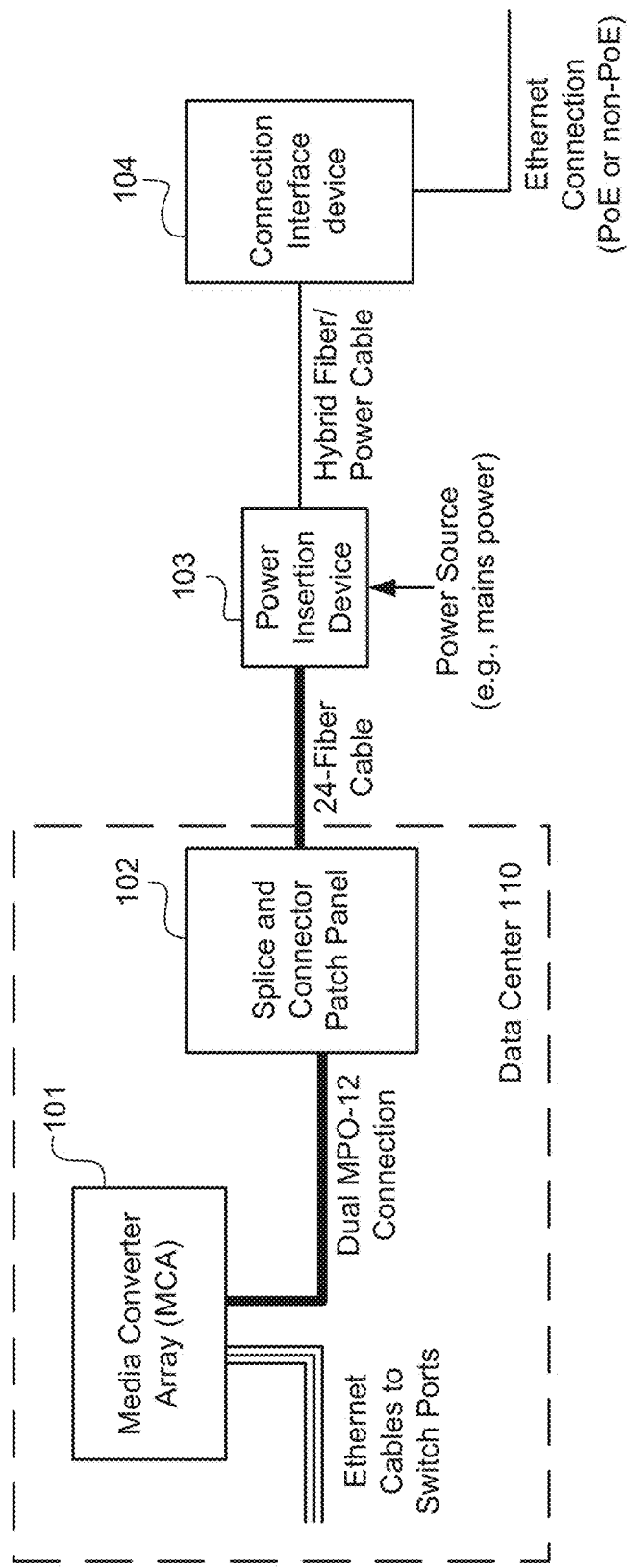
FIGS. 1A-1C are block diagrams illustrating components of an exemplary fiber optic communications-based network.

FIG. 1A is a block diagram illustrating components of a fiber optic communications-based network in an exemplary embodiment of the inventive architecture. The depicted network connects a network switch (not depicted) in a data center 110 with CAT5-compatible ports to end devices utilizing CAT5 connection (not depicted). Data from the switch is communicated to a Media Converter Array (MCA) 101 via CAT5 cables, and the MCA 101 provides for conversion to a fiber optic-based connection (e.g., a dual MPO-12 fiber connection) to a splice and connector patch panel 102. The splice and connector patch panel 102 is connected to a Power Insertion Device 103 via a fiber connection (e.g., a 24 GGP fiber cable, which is a cable containing 24 individual fiber connections). The splice and connector patch panel 102 provides for mechanical splices or connectors, which connect the fibers from the dual MPO-12 fiber connection to the 24 GGP fiber cable. The splice and connector patch panel 102 also allows for appropriate levels of bandwidth to be provided for particular users (e.g., patching of a 10GbE source to an end device requiring a 10GbE connection). It will be appreciated that the data center 110 may further include, for example, servers for executing remote desktop software and/or for carrying out file transfers that are connected to the switch and/or splice and connector patch panel 102 via fiber optic and/or Ethernet connections.

The Power Insertion Device 103 provides for power input to one or more fiber connections to Connection Interface devices 104 (i.e., fiber fan out), which are in turn connected to end devices (not depicted). Only one exemplary connection between the Power Insertion Device 103 and a Connection Interface device 104 is shown in FIG. 1A, utilizing a hybrid power and fiber cable (e.g., a multimode GGP fiber with 18 AWG copper for power). The Power Insertion Device 103 utilizes mains power (for example, 110 VAC (with up to 20 A) input), and inserts power into the network along hybrid power and fiber cables connected to the Power Insertion Device 103. The hybrid power and fiber cables connected to the Power Insertion Device 103 (as well as non-powered fiber cables connected to the Power Insertion Device 103 no depicted)), connect to Connection Interface devices 104, which allow for conversion to PoE or non-PoE Ethernet connections which are plugged into end devices (e.g., PoE, non-PoE, CAT5 cables).

Thus, this exemplary network architecture provides a transparent L1 network from an edge switch to a client device, with the fiber link being passive to data traffic aside from an electrical to optical (E to O) and an optical to electrical (O to E) conversion process (which does not require additional network switches and adds close to zero packet timing jitter). Because the data center 110 utilizes an optical connector or mechanical splice patch panel, and a low-cost multi-fiber cable transports data to a convenient area near local clients where power is injected via the Power Insertion Device 103, this exemplary network architecture is able to provide data transmission at a high bandwidth and low cost, while maintaining compatibility on the data center end with CAT interfaces utilized by an edge switch (via the MCA 101) and maintaining compatibility on the client device end with CAT interfaces utilized by client end devices (via the Connection Interface device 104). This allows for networks to be upgraded from conventional bandwidth-limited CAT implementations to the high-performance and low-cost fiber network architecture depicted in FIG. 1A in a flexible and cost-efficient manner by replacing components between the edge switch and the client device without requiring any changes to be made to the edge switch or end client devices.

Figure 1B:
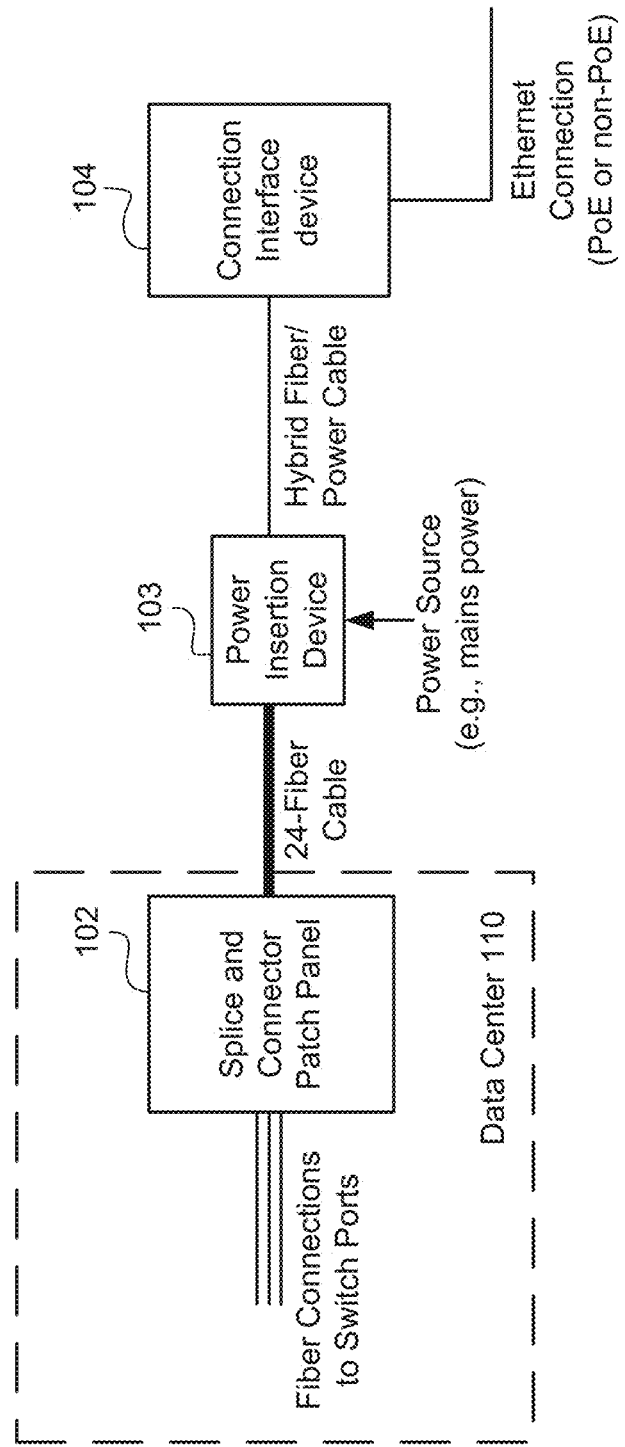

FIG. 1B is a block diagram illustrating an exemplary network architecture connected to a network switch with fiber optic-compatible ports (e.g., ports adhering to the SFP standard). The exemplary architecture depicted in FIG. 1B is similar to the architecture shown in FIG. 1A, but since fiber optic connections can directly be made with the network switch, an MCA is not needed in the architecture of FIG. 1B.

Figure 1C:
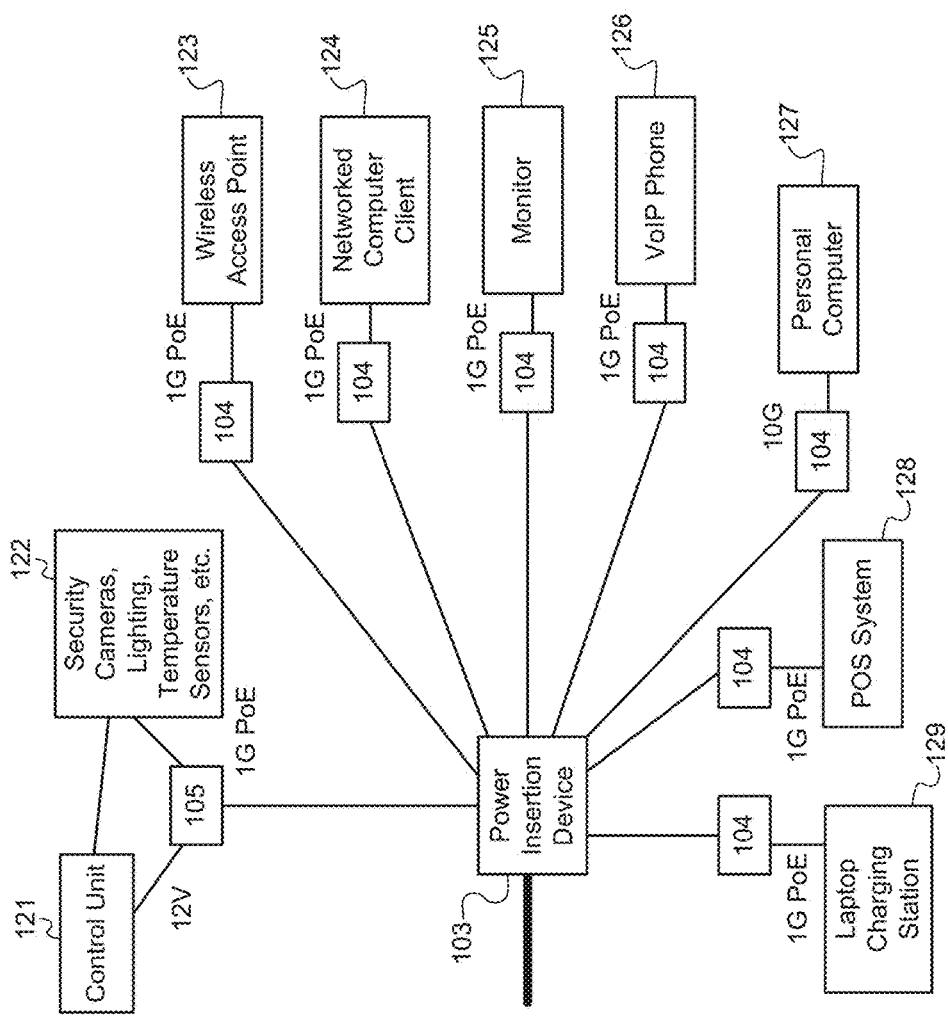

FIG. 1C is a block diagram illustrating examples of various connections that extend out from the Power Insertion Device 103. As depicted in FIG. 1C, a variety of end devices are connected to the Power Insertion Device 103 via respective Connection Interface devices 104 (and/or a specialized Connection Interface 105), including, for example, hut not limited to, the depicted control unit 121, security camera, lighting, temperature sensors, and other outdoor device applications 122, wireless access point 123, networked computer client (e.g., a zero-client workstation such as a client computer running Multipoint software) 124, a monitor or TV (e.g., a 12V monitor or a TV executing a streaming application) 125, a voice over internet protocol (VoIP) phone 126, a personal computer (e.g., with a 10 G card performing data transfer) 127, a point of sale (POS) system 128, and a laptop charging station 129. The specialized Connection Interface 105 represents one exemplary way in which a general Connection Interface device 104 may be customized to suit a particular application, for example, in this illustration, to provide 12V power to the control unit 121 which controls the end device 122 in addition to providing a PoE connection to the end device 122. Some examples and features of certain customized Connection Interface devices 105 are discussed in further detail below with respect to FIGS. 6, 7A and 7B.

Further, it will be appreciated that the different end devices shown in FIG. 1C having different respective power and data requirements can be provisioned with different corresponding data rates and power levels. The annotation of PoE in FIG. 1C can refer to PoE, PoE+, LTPoE++, and other levels of PoE power, and it can be seen that certain devices may not be provisioned with power at all via the connection to the Connection Interface device 104 (it will be understood that other references to PoE, PoE+, LTPoE++, and/or PoE3+ are also exemplary and not intended to be a limitation as to the applicability of only one type/level of PoE power). Similarly, as shown in FIG. 1C, certain devices can be provisioned with 1G data rates while others are provisioned with 10 G data rates. Each Connection Interface device 104/105 may be specifically designed or configured to provision the appropriate data rate(s) and power level(s) to the connected end device(s).

Some features and characteristics of the architecture described above with respect to FIGS. 1A-1C are as follows:

Small Form Factor (SFF) Tranceivers. Utilizing SFF and SFP (Pluggable) industry standards allow for significant cost reductions by using Vertical Cavity Surface Emitting Lasers (VCSELs) that have low cost and make highly automated assembly possible. To allow for implementation of these transceivers, conventional network switches with RJ-45 connectors for CAT 5 cable can be replaced with network switches enabled with SFP receptacles (e.g., FIG. 1B) or can be used in combination with a highly parallel MCA (e.g., FIG. 1A). VCSELs can also be used as part of the Connection Interface device to provide cost-efficient media conversion.

Passive Fiber Routing. The network architecture provides for a fiber pair to be routed all the way from a port on a switch to an end device. It is advantageous that each of the fiber links can be provisioned at different data rates—e.g., a 10 G link (or even up to a 50 G link) can easily be provisioned in the midst of 1 G links so long as appropriate devices are connected at either ends of the fiber. This allows for individual end devices to be transitioned, for example, from 1 G links up to 10 G links in a convenient and granular fashion.

Multi-Fiber Cable Trunk Lines. The network architecture utilizes multi-fiber bundles to run the communications to a local area in a building. For example, a 24 fiber cable (which is capable of serving 12 end devices) is smaller than a single CAT 5 cable and far less expensive.

Local Power Insertion. Because of the availability of mains power connectors (e.g., 110 VAC or 220 VAC) in nearly all buildings, the insertion of low voltage power via the Power Insertion Device can be accomplished generally within 30 m of the end device (while at the same time the data can be transmitted over long distances to the Power Insertion Device, e.g., with 300 m or 500 m or more between the power insertion device and a data center). This allows for significant amounts of power to be provided to the end devices, with less power loss in the wiring than with long CAT5 cable runs, within the context of a long-distance data communications network. Further, this allows end devices to be operated in locations even where mains power connections are not available at the point of use, as well as reducing the number of mains power connections needed to power a plurality of end devices.

Hybrid Fiber Copper Cable. The run of cable from the Power Insertion Device to the end device (e.g., a 30 m hybrid power and fiber cable from the Power Insertion Device to the Connection Interface) can be a hybrid fiber/copper cable with two multimode fibers capable of high data rates and two copper wires (e.g., 18 AWG, 22 AWG or 24 AWG). This combination of relatively large gauge wire and short distances allows for power levels of over 200 W to be delivered per end device with less power loss. This provides opportunities for a broad classes of devices to be powered that cannot be powered by conventional PoE technology, such as TVs and even whole offices.

PoE Compatibility. At the end device location, the Connection Interface device includes a network-powered transceiver that converts the optical fiber signal to a conventional electrical Ethernet connection. Users of the end device thus never have to interact with the network on an optical basis—the use of fiber connections is transparent to them, as they can simply plug in their conventional devices into respective Connection Interface devices. Further, the Connection Interface device can support the PoE, PoE++ (90 W), and PoE3+ (180 W) protocols as well. The transceiver is further configured with control logic that is able to sense whether an end device connected to the transceiver is a PoE-compatible Powered Device (PD) or not, such that the transceiver taps power from the line to power the optical transceiver when a PD is connected, or such that the transceiver will act as a PD itself to request power when the end device connected to the network has no requirement for network power. Alternatively, the Connection Interface device may also provide a manual switch that allows a user to select an appropriate mode of operation for the Connection Interface device based on whether the end device is a PD or not.

No Strip Fiber (NSF) and Fiber Mechanical Splices. The use of NSF and mechanical splices provides for a significant reduction in fiber termination and connecting costs relative to conventional multimode fiber and LC type connectors.

Flexible Reconfigurability. Because the network provides power at voltage levels low enough to allow for convenient rearrangement (e.g., simple unplugging and replugging with appropriate movement of connections), and further because the power is integrated with the data communication lines up to the Connection Interface device, it is very convenient for users to set up and rearrange fiber-based networks in accordance with embodiments of the invention. For example, in a building environment, to reroute electrical connections and provide power to end devices, an electrician is typically needed due to regulations concerning the line voltage power network. However, in exemplary embodiments of the present disclosure, because the hybrid power/fiber cables are able to flexibly provide power in addition to data at levels of less than 60 V and around or less than 100 W, an electrician would not be needed for reconfiguration of the power routing. This greatly reduces the complexity for providing power throughout a building, as fewer electrical outlets are needed, and end devices in various locations can easily and inconspicuously be provided with power/data connections via thin hybrid power/fiber cables. Further, these low power levels are in compliance with UL and National building codes.

Because the hybrid power/fiber cables carry only low voltage power and can be made of very small diameter cable, they can be run under carpets. They can also be run along grooves gouged out of wall board that can then be plastered over and painted so as to effectively disappear.

In a related vein, battery backup in case of a power outage is also simpler, more efficient, and more convenient with respect to exemplary embodiments of the present disclosure. For example, the battery (or generator) backup may be provided with respect to particular power insertion devices, and control intelligence may be added such that, in the event of a power failure, only designated hybrid data/power connections connected to the power insertion device remain powered such that critical devices can be backed up while non-critical devices are shut down.

Media Converter Array (MCA)

As discussed above with respect to FIG. 1B, in certain embodiments, for example, where an edge switch is a fiber based switch having Small Form-factor Pluggable (SFP) cages instead of conventional RJ-45 ports, it may not be necessary to include the MCA in the inventive network architecture, as in such cases, the media conversion from an CAT connections to fiber connections would not be needed.

In other embodiments, such as the architecture depicted in FIG. 1A, it is advantageous to have a reliable, compact media converter that uses parallel transceiver technology to reduce the cost and size of the data center's media conversion mechanism.

Figure 2:
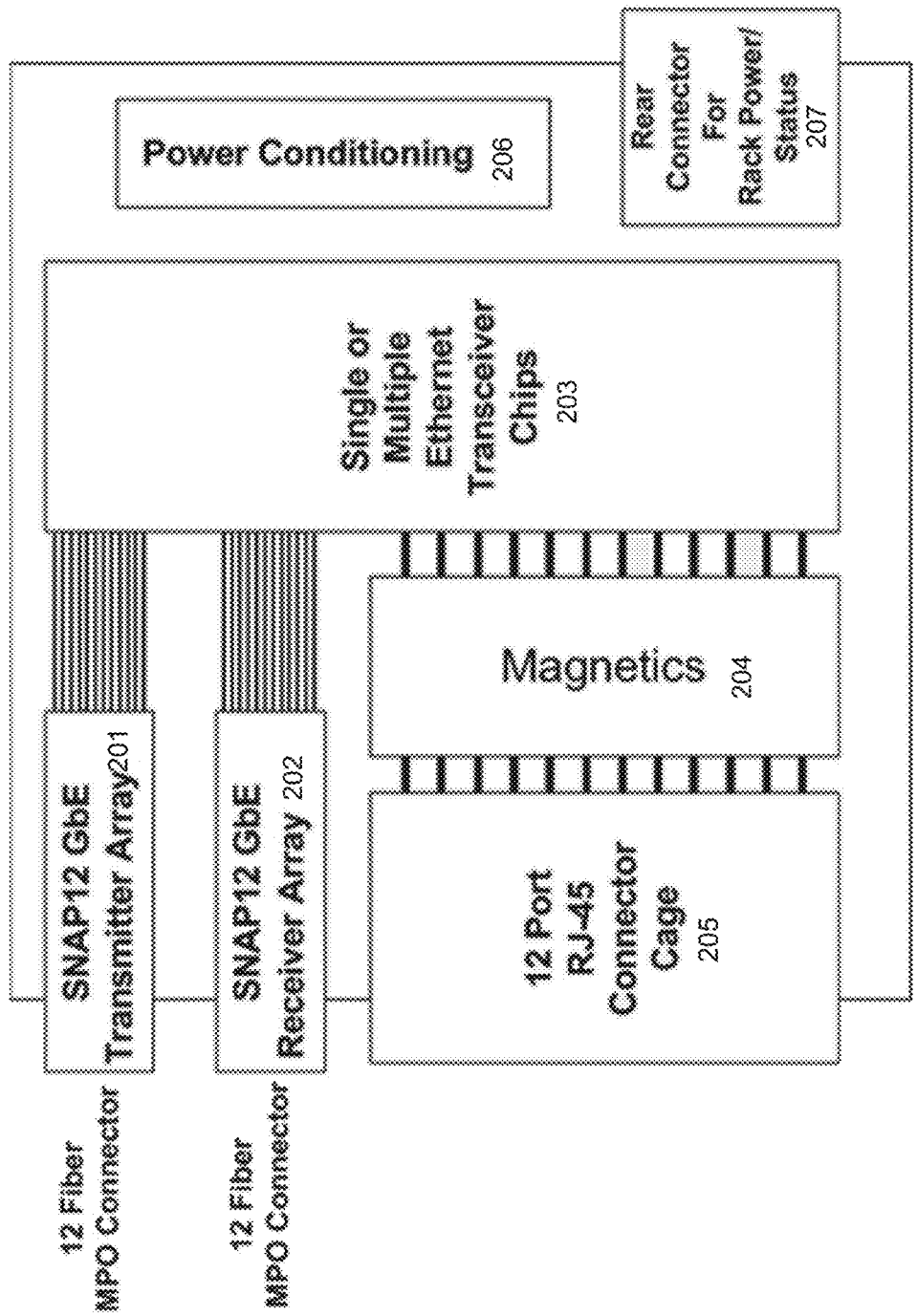
FIG. 2 is a block diagram illustrating components of an exemplary Media Converter Array (MCA).

FIG. 2 is a block diagram illustrating components of an exemplary MCA which corresponds to a 12-channel media converter, and which, in practice, fits in a 3RU×6"×1" rack mountable module. In the exemplary embodiment depicted in FIG. 2, the MCA includes a SNAP12 GbE Transmitter Array 201 for creating the optical signal for transmission from the device, a SNAP12 GbE Receiver Array 202 for receiving the incoming communications signals, Single or Multiple Ethernet Transceiver Chips 203 for terminating and re-clocking the transmit and receive signals, magnetics 204 for creating an electrical Ethernet signal that can travel through Category type copper cables (e.g., specific high speed transmission characteristics copper transmission cable generally require implementation of a circuit comprising of inductors and capacitors to impedance match the device electrical circuit to the cable), a 12-Port RJ-45 Connector Cage 205 for connecting the MCA to the switch through the multiplicity of CAT5 cables from the switch, a Power Conditioning circuit 206 for providing conditioned power to the device, and a Rear Connector for Rack Power/Status 207 which allows the device to be connected to the power and service channel provided for in the Rack.

The exemplary MCA shown in FIG. 2 is able to achieve low per-channel costs by utilizing highly-parallel VCSEL-based transceivers, and is able to achieve rack port densities of 144 channels per 3RU rack, and further provides dual powering and monitoring. The MCA is a Layer 1 device with minimal packet manipulation and minimum latency and jitter. It has 12 transmit and 12 receive channels, and is able to connect to two 12-fiber MPG connectors. The two 12-fiber MPO connectors interface with SNAP12-type or equivalent transceiver modules that are mounted directly to a face plate of the MCA without any intervening fiber within the MCA. While FIG. 2 illustrates an MCA utilizing SNAP12-type parallel receiver and transmitter, other embodiments may utilize other types of parallel optical devices as well.

The front panel of the MCA further includes a 12-port RJ-45 cage with integrated magnetics (together with the two MPG connectors and locking screw mounts), which is board-mounted to come out the front panel. Status lights are also on the front panel to indicate unit status (e.g., in accordance with conventional monitoring functionalities for media converters). The front panel is further arranged in a manner where it is easy to insert and remove the connectors, while the whole unit is still able to fit into 3RU module cage. The Ethernet Transceiver chip may be, for example, a multi-channel Ethernet transceiver (e.g., supplied by Broadcom or Marvell) well-suited for minimizing total cost and space.

Additionally, each MCA unit can operate as a single isolated unit or in a multi-unit rack, and can be configured to operate with standard wall mount power supplies.

Splice and Connector Patch Panel

In an exemplary embodiment, a fiber fallout assembly between the MCA 101 and the splice and connector patch panel 102 is terminated on the MCA end by two 12-fiber Multi-fiber Push-On (MPO) connectors and on the other end by 24 bare fibers. The bare fibers terminate into either Lucent Connector (LC), Subscriber Connector (SC) or mechanical splice terminations at the splice aid connector patch panel of the data center.

In a particular exemplary implementation, the fiber fallout assembly is approximately 3 m in length and is a glass, glass and polymer (GGP) fiber assembly. The individual fibers are further color-coded with a scheme such that the fibers can be identified with respect to which port on the edge switch they correspond to, as well as their directional polarity (i.e., from the switch or towards the switch).

In embodiments utilizing a mechanical splice termination at the Patch Panel, a special splicing tool is used to create fiber-to-fiber connections which provide relatively lower losses (compared to connectors using pre-terminated mechanical connectors). In the mechanical splice, a v-groove or ferrule holds fibers together such that mechanical contact is made between fibers. Additionally, an index matching gel resides at the contact point to further reduce the losses. The splicing tool utilizes both a fiber bed point for injecting visible light from the side of the fiber and/or a magnified viewing port to observe the fiber contact directly.

It will be appreciated that in other embodiments of the fiber communications network architecture, other patch panel configurations may be used as well, so long as they have appropriate connections for interfacing with the other components of the respective networks.

Multi-Fiber Cable

In accordance with the exemplary embodiment discussed above where 24 bare fibers are terminated at the Patch Panel, in an exemplary embodiment, the multi-fiber cable between the Patch Panel and the Power Insertion Unit includes 24 fiber links. In a particular exemplary implementation, each of the fiber links is a GGP fiber cable with proper color-coding to identify the fiber.

Figure 3B:
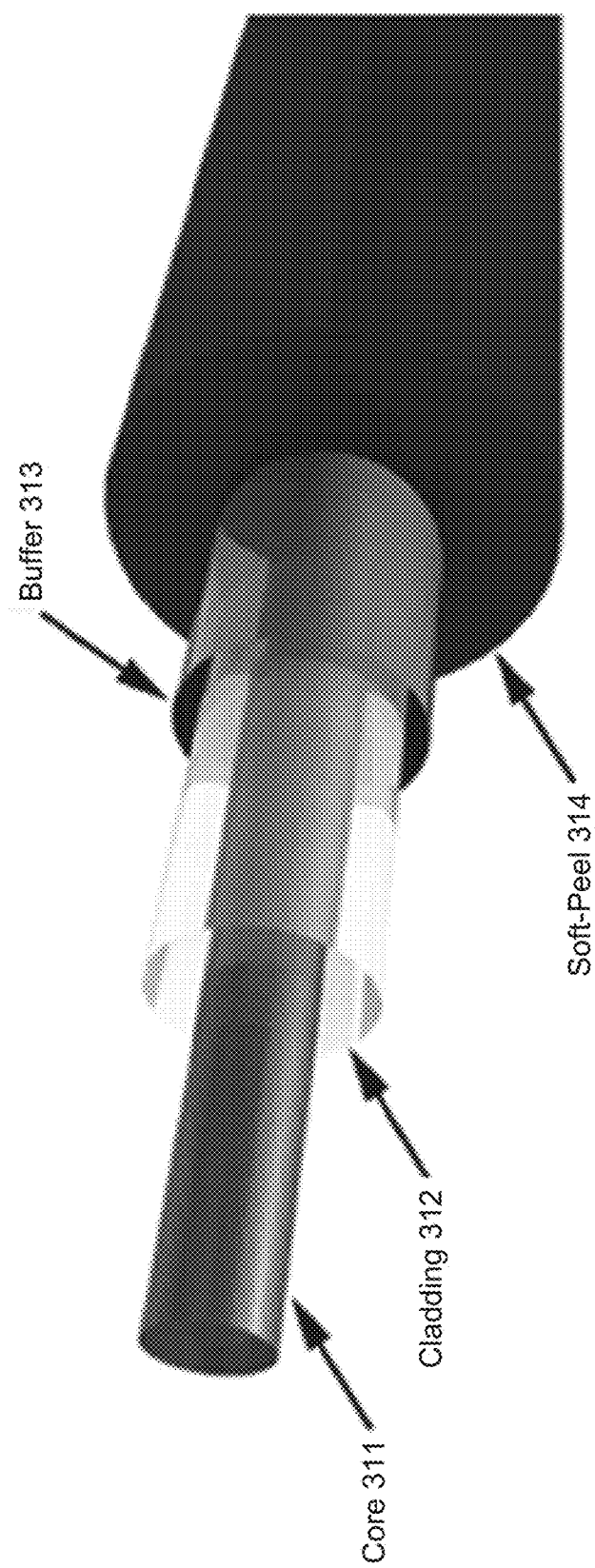

FIGS. A and 3B illustrate a GGP fiber cable according to an exemplary embodiment (FIG. 3B) versus a conventional GGP fiber cable (FIG. 3A). Both of FIGS. 3A and 3B include a fiber core (301/311), a cladding (302/312), and a hard-coating polymer buffer (303/313). However, the hard-coating polymer buffer 313 of FIG. 3B is relatively thin, and is further surrounded by a soft-peel polymer 314. In a particular implementation, the hard-coating polymer used is the polymer described in U.S. Pat. No. 8,374,474, which is incorporated by reference herein in its entirety.

Because this multi-fiber cable is used to create links from the data center to the area in the vicinity of end clients, embodiments of the invention are able to avoid the costs and complexity of running long CAT 5 links or multiple 10 G links using remote switches. Additionally, because this multi-fiber cable is merely a passive fiber link, it eases the process of provisioning old networks with updated high-bandwidth (e.g., 10 G) links and allows for a seamless upgrade of the entire network to higher bandwidths (e.g., 10 G), and further allows for granular, piecemeal upgrades of particular links (e.g., one-at-a-time, if desired).

It will be appreciated that, in other exemplary embodiments, other types of fiber cables may be used for the (typically long distance) link between the data center and the power insertion device at the local area in the vicinity of the end client devices as well e.g., including multi-fiber cables with different fiber counts, or different types of fiber cables such as single-mode or multi-mode of grades OM2, OM3 or OM4. For example, a multi-mode fiber cable of grade OM3 may be limited to 300 m at 10 G, while a single-mode fiber cable may be capable of being used for long distances of up to multiple kilometers at 10 G data transfer is in multiple kilometers.

Power Insertion Device

In an exemplary embodiment, the Power Insertion Device is connected on one end to the multi-fiber connection described above and on the other end to a plurality of hybrid power/fiber links, and serves to provide power along the hybrid power/fiber links. In a particular exemplary implementation, because the Power Insertion Device is provided at a relatively short distance away from the Connection Interface and end client devices (e.g., typically within 30 m), the Power Insertion Device acts as a Power Serving Equipment (PSE) and is able to provide hundreds of Watts of power delivery over each of a plurality of hybrid power/fiber cables to end devices with low voltage drop (and is capable of achieving power levels to allow for compatible with the PoE, PoE+, and LTPoE++ standards).

Figure 4:
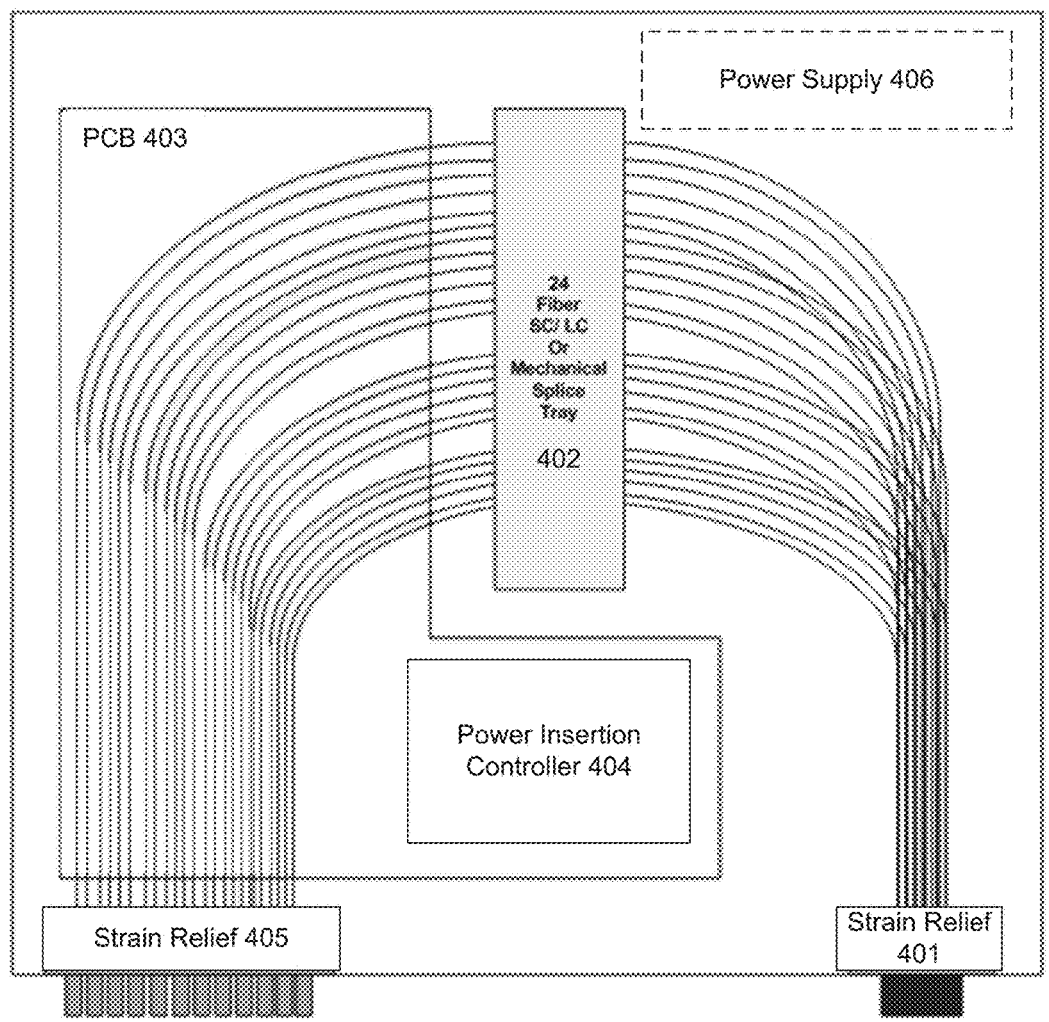
FIG. 4 is a block diagram illustrating components of an exemplary Power Insertion Device.

FIG. 4 illustrates components of a Power Insertion Device in an exemplary embodiment. The Power Insertion Device takes as input a fiber-only connection (e.g., a 24-fiber GGP cable), passed through a strain relief component 401. The fibers enter a connector or mechanical splice tray 402, with power being inserted via a PCB 403 (e.g., a PCB with a transistor array) having a power insertion controller 404. In an exemplary embodiment, the power insertion controller is a 12-channel LTPoE++ Controller which is configured to provide power insertion for up to 12 separate outputs connecting to up to 12 hybrid power/fiber cables. Thus, each pair of fibers in the fiber-only connection input into the Power Insertion Device may be patched through to a respective separate hybrid power/fiber cable output from the Power Insertion Device (along with a second strain relief component 405 corresponding to the output connections), with power and data both being carried along each of the hybrid power/fiber cables. The Power Insertion Device further includes a power supply 406 (e.g., configured to provide 48-55 V (DC) and 200-1000 W based on a 110 VAC and up to 20 A input). The power supply provides for a degree of statistical multiplexing for the client devices such that the power supply can be appropriately sized to accommodate power provisioning on all lines without needing to be so large as to simultaneously provide 90 W on every line.

The Power Insertion Device provides fiber fan out and power added functionality for a large number of end devices (e.g., FIG. 4 shows an exemplary Power Insertion Device capable of serving up to 12 end devices), with high power levels achievable per port (e.g., in the 90-100 W range). The PCB 403 and power insertion controller 404 are configured to provide full PoE regulation (e.g., at 48V) to each of the output cables such that no additional regulation is needed further down the line (e.g., at the end device and at the Connection Interface), even with powers up to 90 W in LTPoE++ applications. It will be appreciated that the copper wires (e.g., 18 AWG or 22 AWG) can be clipped to the PCB 403. Further, to the extent that an end device (e.g., a high-wattage TV) requires more than the power level achievable via a single hybrid cable, multiple hybrid cables may be used to supply the end device with the requisite power (e.g., a Connection Interface device connected to the high-wattage TV may take as input two hybrid fiber/power cables, one of which is used for both data and power, and the other of which is used for only power). Thus, various types of end devices, ranging from standard PoE devices requiring less than 30 W of power, to more power-hungry devices such as laptop charging stations and high-wattage TVs can all be flexibly provisioned using the described network architecture.

The connector or mechanical splice tray 402 can utilize mechanical splicing or conventional fiber connectors as discussed above with respect to the splice and connector patch panel (e.g., bare fiber mechanical splices; SC-SC connections with bulkheads; and/or LC-LC connections with bulkheads). The Power Insertion Device is able to run off of a 20 A 110V line such that it can be conveniently powered by conventional wall outlets.

Further, the Power Insertion Device is a compact unit providing for clean fiber management. As depicted in FIG. 4, on the output side, up to 12 hybrid power/fiber cables are connectable, and the Power Insertion Device includes a strain relief component at the attachment interface of the cables to the Power Insertion Device. On the input side, a 24-fiber cable is connected and a strain relief component is similarly provided.

The power insertion provided by the PCB 403 may be accomplished, for example, through Linear Technology's LTPoE++ standard (or, in other embodiments, according to other PoE protocols). In one exemplary implementation, the power insertion controller 404 may utilize the LTPoE++ PSE Controller Chipset. Further details regarding the components and operation of the LTPoE++ PSE Controller Chipset may be found in Linear Technology, "LTPoE++/PoE+/PoE, PD Controller," Datasheet 4275f, available at http://www.linear.com/product/LT4275, which is incorporated herein by reference.

Hybrid Power/Fiber Cable

In an exemplary implementation, a hybrid power/fiber cable used between the Power Insertion Device and a Connection Interface device includes two fiber core elements and two wires for power transmission. In a particular exemplary implementation, the two fiber elements are OM3 50 μm core GGP elements and the two wires are 22 AWG wires.

Figure 5:
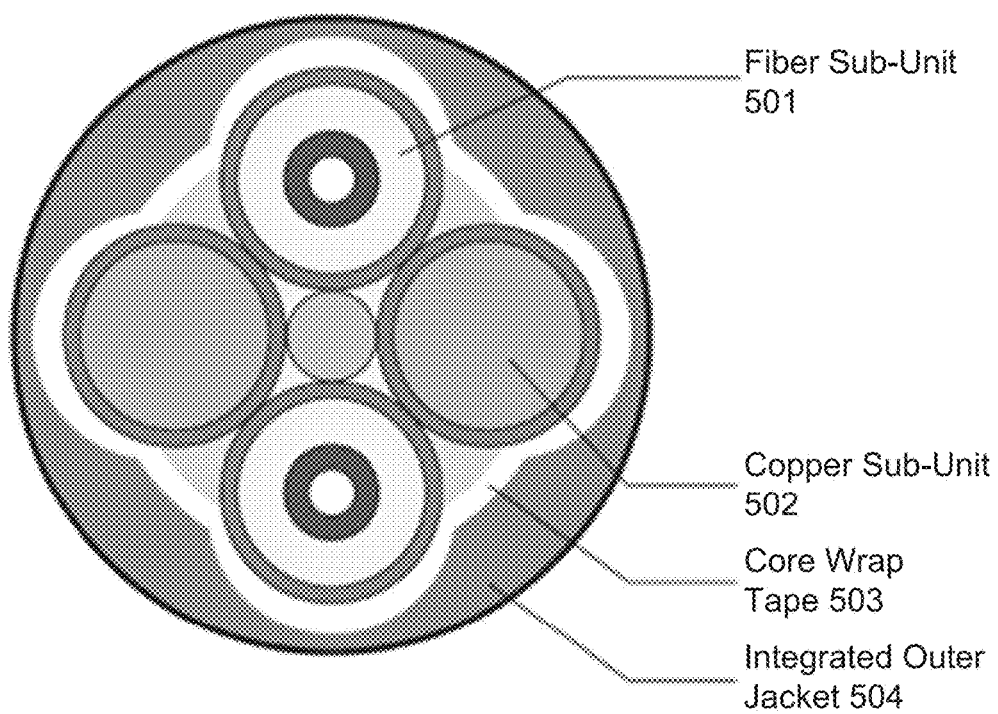
FIG. 5 is a schematic diagram illustrating components of an exemplary hybrid power/fiber cable.

FIG. 5 is a schematic diagram illustrating various components of the hybrid power/fiber cable. The hybrid power/fiber cable includes a fiber sub-unit 501 (which includes, for example, a 900 μm tight buffer, Aramid fiber, and a PVC jacket); a copper sub-unit 502 (e.g., 22 AWG); core wrap tape 503, and an integrated outer jacket 504.

In embodiments of the invention, by using hybrid fiber/power cables, the fiber optic communications network is able to provide the ability to communicate at 1 Gbs and higher speeds, while at the same time providing client end devices (such as monitors, lighting and other computing devices) with power. It will be appreciated that one of the fibers (e.g., fiber sub-unit 501) may be used for data communications in one direction (such as from the Power Insertion Device to a Connection Interface Device), while the other of the two fibers (e.g., fiber sub-unit 502) may be used for data communications in an opposite direction (such as from a Connection Interface device to the Power Insertion Device). Additionally, in an alternative embodiment (not depicted in FIG. 5), a single bi-directional time-shared optical fiber may be used for data communications in both directions.

In an example, 22 gauge wires may be used for hybrid power/fiber cables extending up to approximately 30 meters, and are able to provide about 100 W of power. In other examples, different thicknesses of the wires within the hybrid power/fiber cable may be used to achieve longer or shorter runs of hybrid power/fiber cable from the Power Insertion Device to a Connection Interface Device.

Connection Interface

The Connection Interface device provides an interface between the hybrid power/fiber cable and a respective cable corresponding to a client end device (e.g., a CAT 5 cable in either PoE or non-PoE applications). Thus, a user of a client end device needs only to use a conventional cable compatible with his or her client end device to connect with a Connection Interface device proximate to the client end device to utilize the fiber optic communications network according to embodiments of the invention. For example, using a short (e.g., 1-3 m) CAT 5 cable, the client end device is able to receive power levels of over 100 W from the fiber optic communications network, as well as receive data at data rates in the multi-Gbs range. Different particular implementations of the Connection Interface device may be particularly suited to different client end devices, e.g., by tailoring the Connection Interface device to provide data and/or power according to various communication protocols (e.g., PoE, PoE+, and/or LTPoE++).

Figure 6:
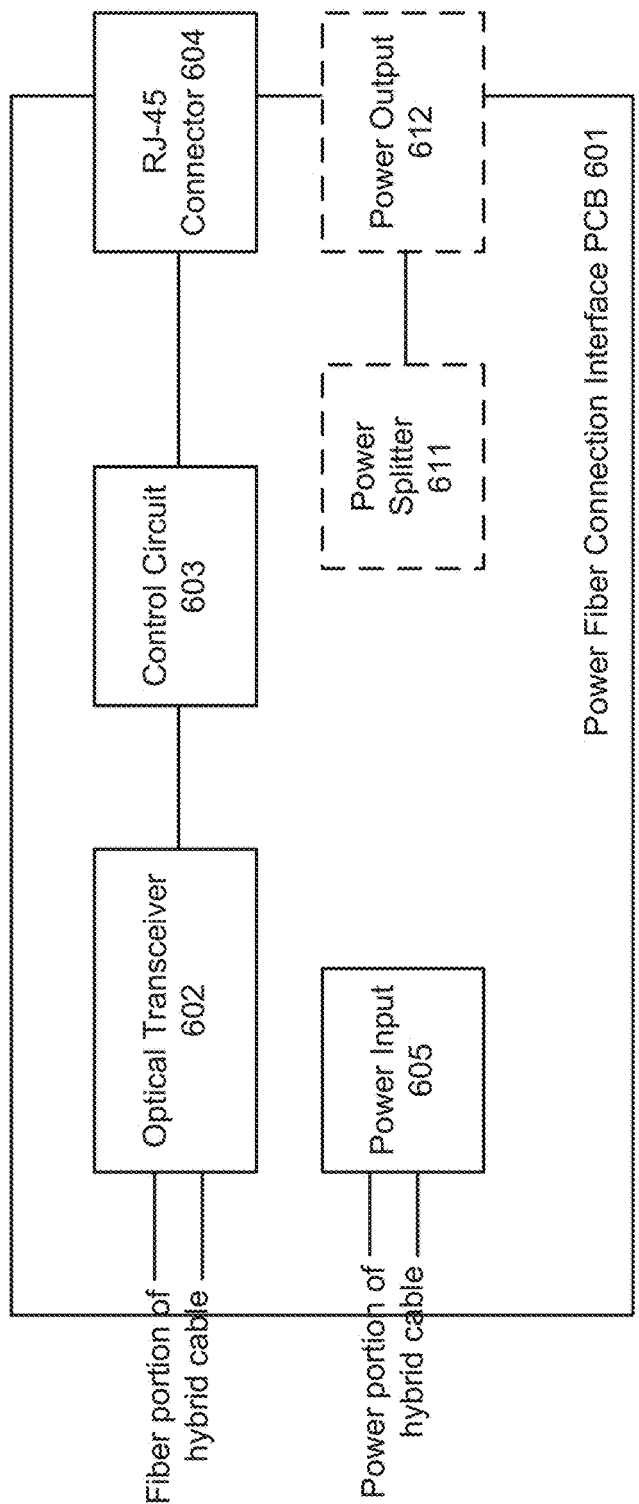
FIG. 6 is a block diagram illustrating components of an exemplary Connection Interface device.

FIG. 6 is a block diagram illustrating components of a Connection Interface device according to exemplary embodiments of the invention. The Connection Interface device includes a PCB 601, upon which an optical transceiver 602 is mounted for accepting fiber connections from a hybrid power/fiber cable (e.g., via LC connectors, SC connectors, or other connection mechanisms), and an RJ-45 connector 604 by which an end device may be connected to the Connection Interface device. Data and/or power may be provided via the RJ-45 connector 604 depending on whether the connected end device is PoE-compatible or not (for non-PoE applications, only data is provided via the RJ-45 connector 604, while for PoE applications, both data and power are provided via the RJ-45 connector 604). The power portion of the hybrid cable, which is transmitted via the copper wires of the hybrid cable, is received by a power input 605 (e.g., via+ and − clips of the PCB 601). The control circuit 603 determines whether the end device connected to the Connection Interface device is a powered device (PD) or not, and operates the Connection Interface device in accordance with its determination.

In a further embodiment, the Connection Interface device further includes a power splitter 611 and a power output 612.

This allows non-PoE devices that nonetheless require power to be powered by the Connection Interface device. The power splitter 611 may include various levels of power and voltage for different non-PoE devices (e.g., 19V for computers/laptops, 110V for TVs, etc.), such that even non-PoE devices can conveniently receive data and power via the Connection Interface device.

Conventional PoE systems are designed for only one PD unit for every PSE port, with the Power Serving Equipment (PSE) port typically being a RJ-45 port on a switch. The Powered Device (PD) is the client device that utilizes the power provided by the PoE System. When a PD is connected to a CAT 5 cable, the PSE senses the connection and then signals the PD asking how much power the PD requires. The PD then signals back its power request which the PSE provides. The conventional PoE arrangement thus allows for only one PD for every PSE port.

An issue arises in a fiber optics-based system because the optical transceiver that converts the optical signal back to electrical, which needs power, is between the power-injecting device (e.g., the Power Insertion Device or PSE) and the end client device. Ordinarily, if a non-PD end client device that requires no power is connected to the Power Insertion Device or PSE via the Connection Interface device, the non-PD end client device would not request any power from the Power Insertion Device or PSE, and the Connection Interface device would not have any power to use for itself.

According to embodiments of the invention, in a situation where a non-PD end device is connected via the RJ-45 connector 604, the control circuit 603 of the Connection Interface device requests power from the Power Insertion Device to provide power for operation of the optical transceiver 602 (and the power splitter 611 and power output 612, if applicable). In the other situation where a end device is connected via the RJ-45 connector 604, the control circuit 603 causes the optical transceiver 602 (which does not require much power) to utilize the power that is already being provided to the PD end device to also provide for operation of the Connection Interface device. Some examples of optical transceivers 602 that may be used in accordance with exemplary implementations of the invention are: a 1 G SFF VCSEL-based 850 nm XCVR unit, or a 1 G chip-on-board or TOSA/ROSA XCVR unit. Another exemplary implementation of an optical transceiver 602 that may be used includes a VCSEL integrated into a ULTEM or PEEK body having a lens and a ferrule/groove providing a fiber termination. In certain alternative exemplary embodiments, the media conversion functionality may take place in a standalone media converter instead of using optical transceiver 602, with control of the media converter and power input/output still handled by components of the Connection Interface device.

The signaling exchange that takes place between the control circuit 603 and the Power Insertion Device allows flexible and simple operation of the Connection Interface device by a user (i.e., the user does not have to know whether his or her device is a PoE-compatible device or not and can simply plug it into the RJ-45 connector 604). This signaling exchange further provides for additional advantages, such as allowing an exemplary embodiment to be achieved where both a PD end device and a non-PD end device are connected to the Connection Interface device, including configurations where the PD and non-PD end devices are connected to the Connection Interface device in parallel or in series. This allows multiple end devices to be connected to a single hybrid fiber/power link that is patched back to the switch/data center.

Alternatively, the Connection Interface device may provide different interfaces for PD end devices and non-PD end devices (such that the Connection Interface device itself acts as PD when only a non-PD end device is plugged in), or the Connection Interface device includes a switch that may be manually adjusted by a user or installer to toggle operation of the Connection Interface device between a power-requesting mode (where the Connection Interface device itself acts as a PD to accommodate a non-PD end device) and a power-leeching mode (where the Connection Interface device siphons off a bit of the power being requested by a PD end device). The Connection Interface device and the overall system may accommodate different connections, including passive optical LANs (one fiber, two wires), SFP or SFP+ (two fibers, two wires), Quad SFP (QSFP) or QSFP+ (four fibers, two wires), or low data rate signaling (no fibers, two wires).

Figure 7A:
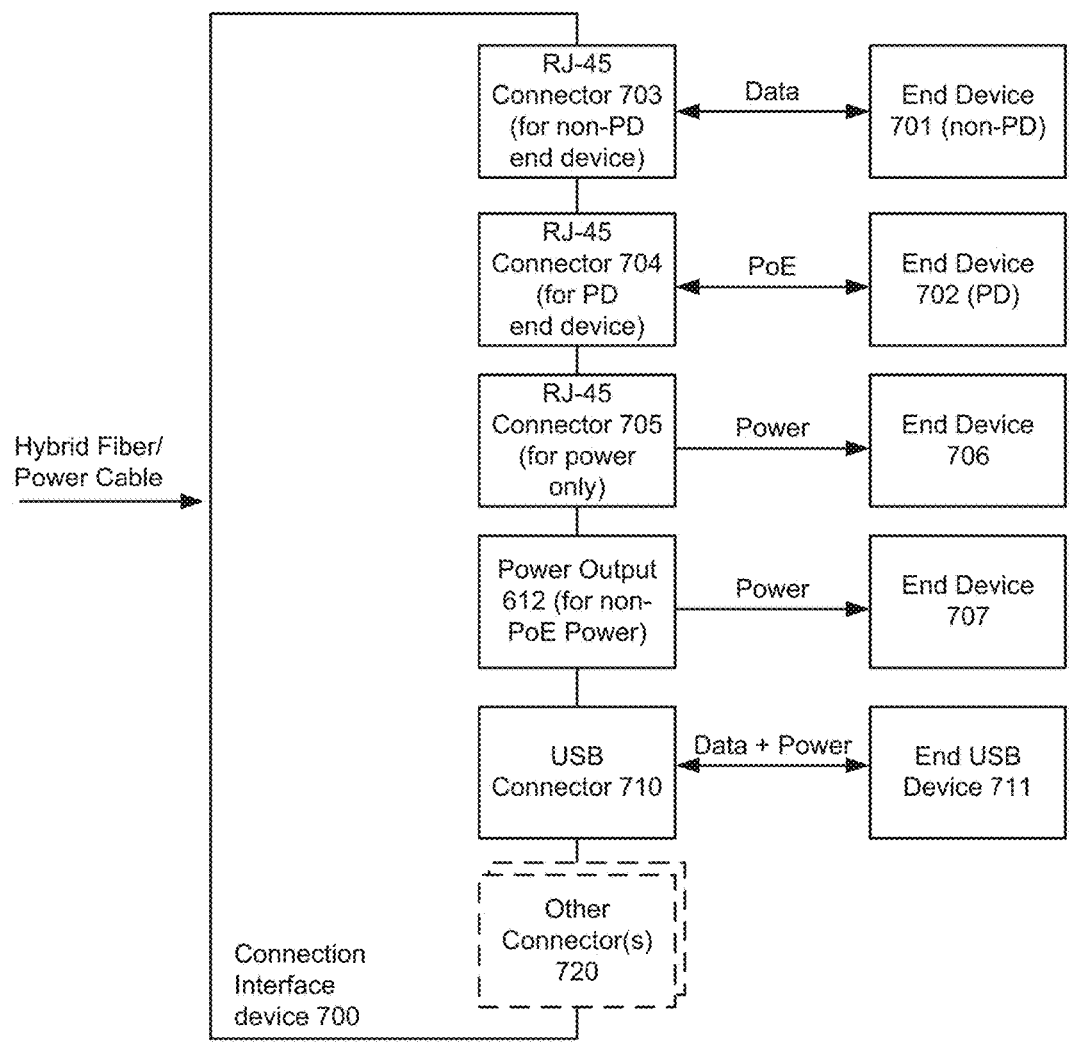
FIGS. 7A-7B are block diagram illustrating exemplary configurations of end devices connected to Connection Interface devices.

FIG. 7A is a block diagram illustrating exemplary ways in which the Connection Interface device may be customized (such as with respect to Connection Interface device 105 depicted in FIG. 1C). The exemplary Connection Interface device 700 depicted in FIG. 7A includes a plurality of interfaces, including an RJ-45 Connector 703 configured for a non-PD end device 701, an RJ-45 Connection 704 configured for a PD end device 702, an RJ-45 Connector 705 for providing only power to an end device 706 via an Ethernet connection, and a power output (such as the power output 612 from FIG. 6) for providing power to an end device 707 via a different type of power connection. Further, the exemplary Connection Interface device 700 includes a Universal Serial Bus (USB) connector 710 for providing power and/or data to an end device 711 that is USB-compatible. For the end USB device 711, power may be provided via a conventional USB Power protocol (with the Connection Interface device 700 acting as a PD to request power from the Power Insertion Device or PSE), or may be provided using a protocol similar to the PoE protocol at the end USB device 711 for allowing the end USB device 711 to act as a PD to request power from the Power Insertion Device or PSE (e.g., via a protocol similar to the one used for PoE signaling but adapted for communication over a USB connection). In one example, the Connection Interface device 700 may rely on a USB Type-C (or "USB-C") interface and the accompanying USB 3.1 standard and USB Power Delivery Standard to provide both power and data to a USB Type-C-compatible end device.

Further other connector(s) 720 for power and/or data may be incorporated into the Connection Interface device 700 as well, and it will be appreciated that various embodiments of the Connection Interface device 700 may include various combinations of the depicted interfaces and/or other interfaces. Thus, the customizability of the Connection Interface device 700 provides the user with flexibility as to whether the user wants to use a non-PD end device, a PD end device, USB-compatible devices, and/or other types of devices needing power and/or data in connection with the fiber-based network.

Figure 7B:
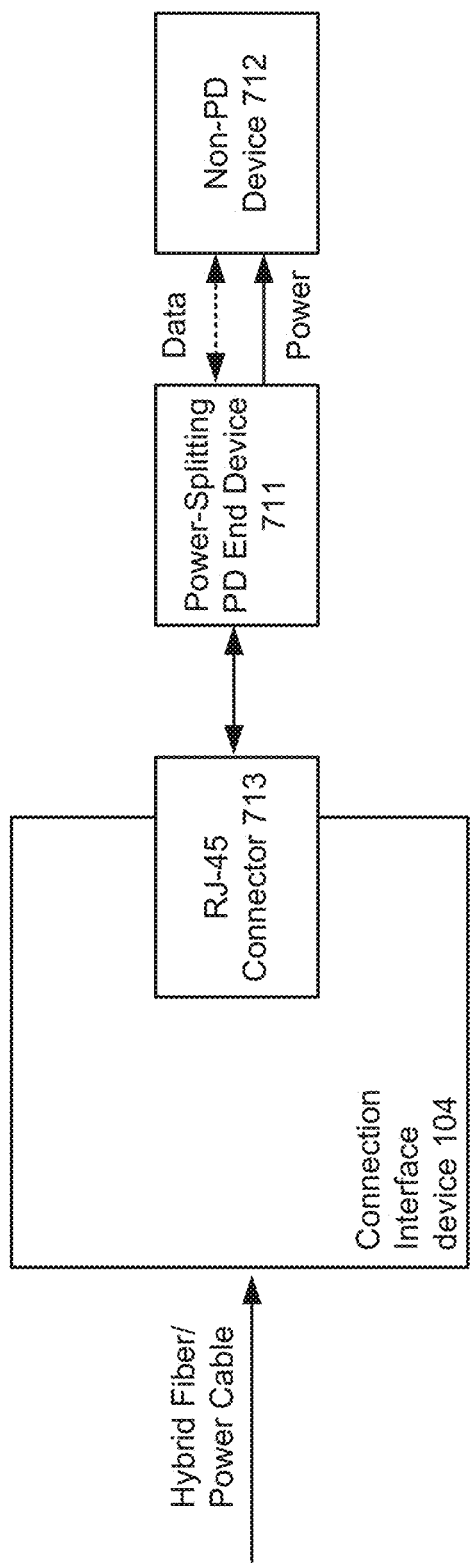

FIG. 7B is a block diagram illustrating an exemplary operating context for a PD end device 711 that provides power-splitting functionalities with respect to a further non-PD device 712 connected to the PD end device 711. In an exemplary implementation, such as where the power-splitting PD end device 711 is a camera and the non-PD device 712 is a light, and the camera is intended to always stay on and control whether the light is on or off, the camera is able to use the power supplied to the camera via the fiber network so as to split off some of the power for operation of the light.

A data connection between the light and the camera (e.g., to pass command signaling) may also be used (but in some implementations may not be necessary). It will be appreciated that other implementations may utilize other types of power-splitting PD end devices and non-PD devices connected thereto.

The configurations of the Connection Interface devices discussed above with respect to FIGS. 6, 7A and 7B may also be utilized in contexts that do not require fiber-Ethernet conversion (with the hybrid fiber/power cable input being replaced by some other form of power/data input). For example, the functionality of a conventional PoE network can be extended by using these Connection Interface device configurations to allow for more flexible configurability, including situations with multiple devices connected to a single upstream PSE port.

Further details and figures relating to a particular exemplary implementation of a Connection Interface device are provided below to further explain the details regarding the operation of the PD/non-PD signaling process discussed above with respect to FIG. 6. Specifically, FIG. 8A is a block diagram illustrates components of an exemplary Connection Interface device with further detail, and FIG. 8B is a block diagram illustrating components of the control circuit depicted in FIG. 8A in even greater detail.

Figure 8A:
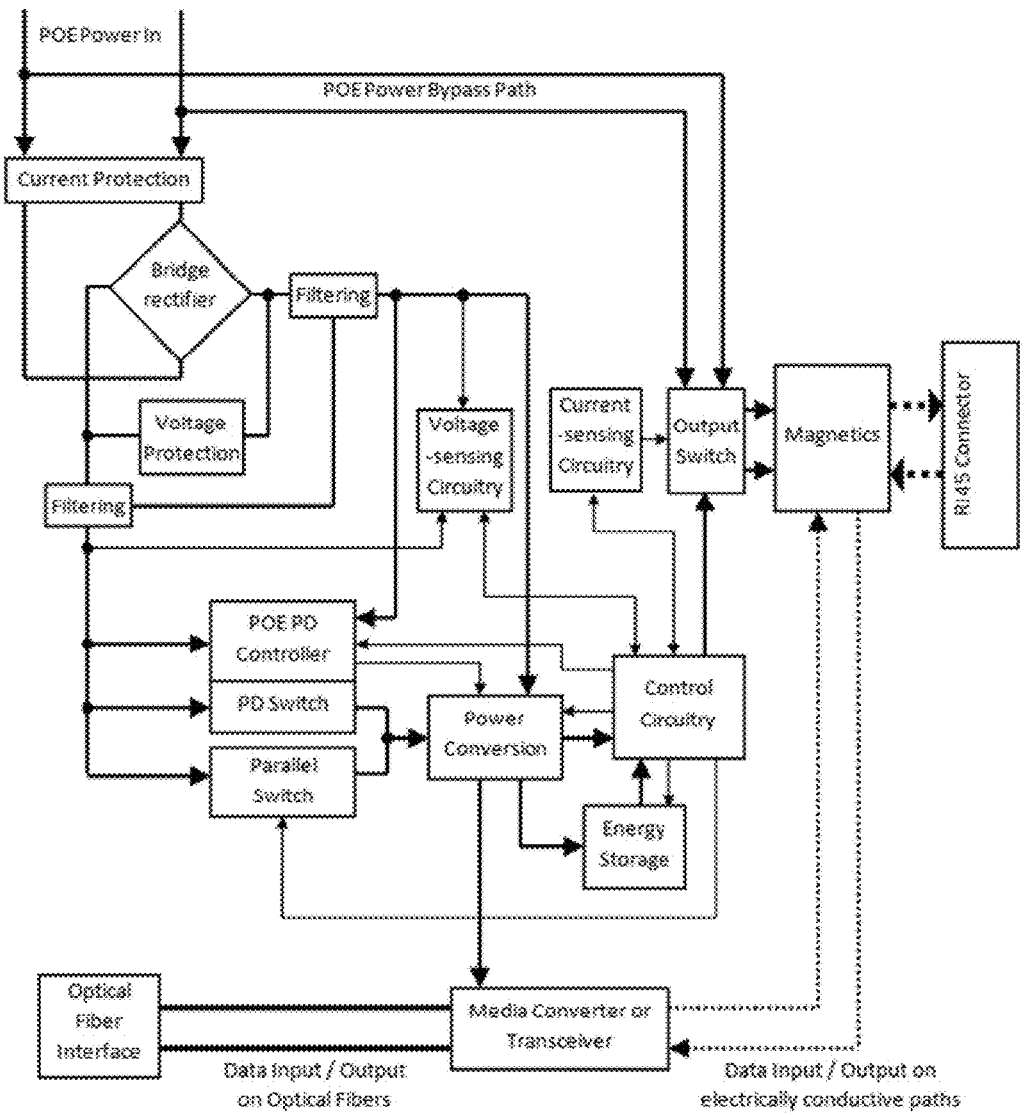
FIGS. 8A-8B are block diagrams illustrating components of an exemplary Connection Interface device in further detail.
Figure 8B:
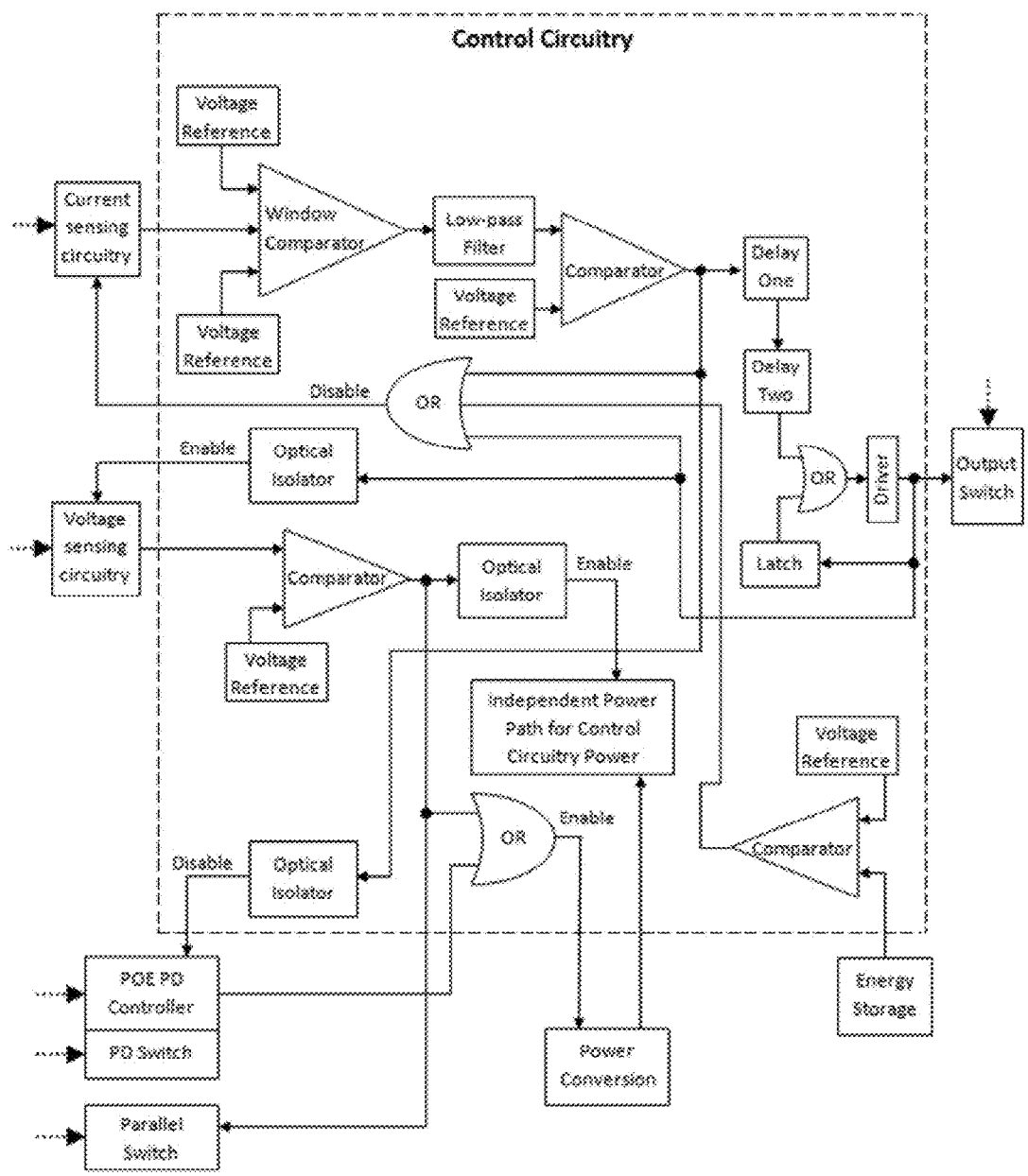

Components of the exemplary Connection Interface device depicted in FIG. 8A include:

A front-end power section comprising current protection, a rectifier, voltage protection, filtering and a bypass of the above for the incoming PoE power.

Voltage sensing circuitry tied across filtered and protected PoE power.

A PoE Powered Device (PoE PD) controller (e.g., in an exemplary implementation, this could be a Linear Technologies LTC4275A controller, although other controllers are contemplated in other implementations).

A switching device that is controlled by the PoE PD controller for relaying PoE-provided power to the power conversion and regulation section or not. In an exemplary implementation, this switching device is internal to the controller, and, for example, is a MOSFET. In another exemplary implementation, the switching device is external to the PoE PD controller (but still controlled by the PoE PD controller).

An additional, parallel power switching device that is external to, and not controlled by, the PoE PD controller. In an exemplary implementation, this parallel power switching device is also a MOSFET.

A power conversion and regulation section that converts incoming power into regulated voltages and currents needed by the operational circuitry of the Connection Interface device, as well as providing galvanic isolation. In one exemplary implementation, the operational circuitry is internal to the Connection Interface device; in another exemplary implementation, the Connection Interface device includes multiple physical housings, with the operational circuitry being distributed between the housings (and with the regulated voltages and currents supplied from the housing with the power conversion and regulation section to the other housing(s)).

Energy storage that can store sufficient energy to power the requisite circuitry during periods of transition between operational states of the Connection Interface device.

Current sensing circuitry capable of providing a test current that is sufficiently compliant with a PoE protocol so as to detect the presence of a PoE PD end device plugged into the Connection Interface device. The Connection Interface device may further include protection circuitry (not depicted in the Figure) for the current sensing circuitry to guard against reverse or over-voltages.

Control circuitry capable of utilizing inputs from sensing circuitry and other inputs to control the power conversion circuitry, the energy storage, the switching devices, and the PoE PD controller in a controlled and timed sequence.

An output switch capable of carrying and switching any polarity of the full PoE power achievable by the Connection Interface device. In an exemplary implementation, the output switch is an electro-mechanical relay; in other implementations, a solid state switching apparatus may be used.

One or more magnetic components (such as transformers and inductors) capable of carrying both the full PoE power achievable by the Connection Interface device and imposing it upon Ethernet conductive paths along with the full rate of data achievable by the Connection Interface device in a manner compliant with PoE protocols. In an exemplary implementation, the LTPoE++ protocol is utilized, with data rates up to and including Gigabit Ethernet speeds. In other exemplary implementations, PoE protocols achieving higher or lower power and/or data rates are usable as well.

A connector compliant with Ethernet and PoE protocols. In an exemplary implementation, this is an RJ45-type connector complying with the LTPoE++ and Gigabit Ethernet standards.

A media converter (e.g., a transceiver) capable of converting optical signals on optical fibers into electrical signals over electrically conductive paths. In an exemplary implementation, this conversion provides for Ethernet speeds up to and including gigabit speeds (or even higher speeds). The optical interface may be based on the multi-source agreement (MSA) compliant devices including, for example, but not limited to SFP, SFF, SFP+, QSFP, etc. The optical interface may also be a custom-designed transceiver that is optimized for a low cost enterprise data communications network. The media converter may be a part of the same physical construction of the rest of the Connection Interface device or may reside in a separate physical construction of the Connection interface device such that optical fiber interface and media converter are physically separate (e.g., on a separate PCB or in a separate housing). In implementations where the media converter is separately housed, an additional Ethernet connection, with additional RJ45 connectors, as well as an additional power connection for providing power to the media converter device, may be provided to connect the media converter of the Connection Interface device to the rest of the Connection Interface device.

Components of the exemplary control circuitry depicted in FIG. 8B include:

Optical isolators that maintain galvanic isolation, as required by PoE protocols, between the incoming PoE power and the converted power that is supplied to the media converter and other operational circuitry of the Connection Interface device.

Voltage references and comparators that use the voltage references to evaluate the inputs from the voltage sensing circuitry and the current sensing circuitry in order to ascertain whether the values represented by those inputs fit certain criteria (e.g., to determine if the end device connected to the Connection Interface device is a PD, and/or further to determine whether a PoE power application cycle is complete such that PoE power is being provided). Alternatively, in another exemplary implementation, analog-to-digital converters may be used to convert the output of the sensing circuitry into digital values, and the digital values are compared to a numerical reference by a microcontroller (or other type of processing unit) in order to ascertain whether those inputs fit the required criteria.

Circuit-based or microcontroller-based logic for determining when the switching devices should be activated based upon the inputs from the comparators, the PoE PD controller status, the power conversion status, and/or the energy storage charge state. In one exemplary circuit-based implementation, the control logic is rendered in discrete components comprising, for example, diodes, bipolar junction transistors, MOSFETS and resistors. In an exemplary microcontroller-based implementation, this logic is expressed as processor executable instructions in a microcontroller.

A latch that keeps the output switch in its active state, even as the energy stored in the energy storage approaches minimum level, to maintain the provision of power to the connected end device.

Filtering and time delay circuits (or corresponding microcontroller programming) to ensure that events occur in a correct sequence to facilitate proper operation.

A driver for the output switch (e.g., a low $V_{CE\_SAT}$ Bipolar Junction Transistor (BJT)).

Figure 9:
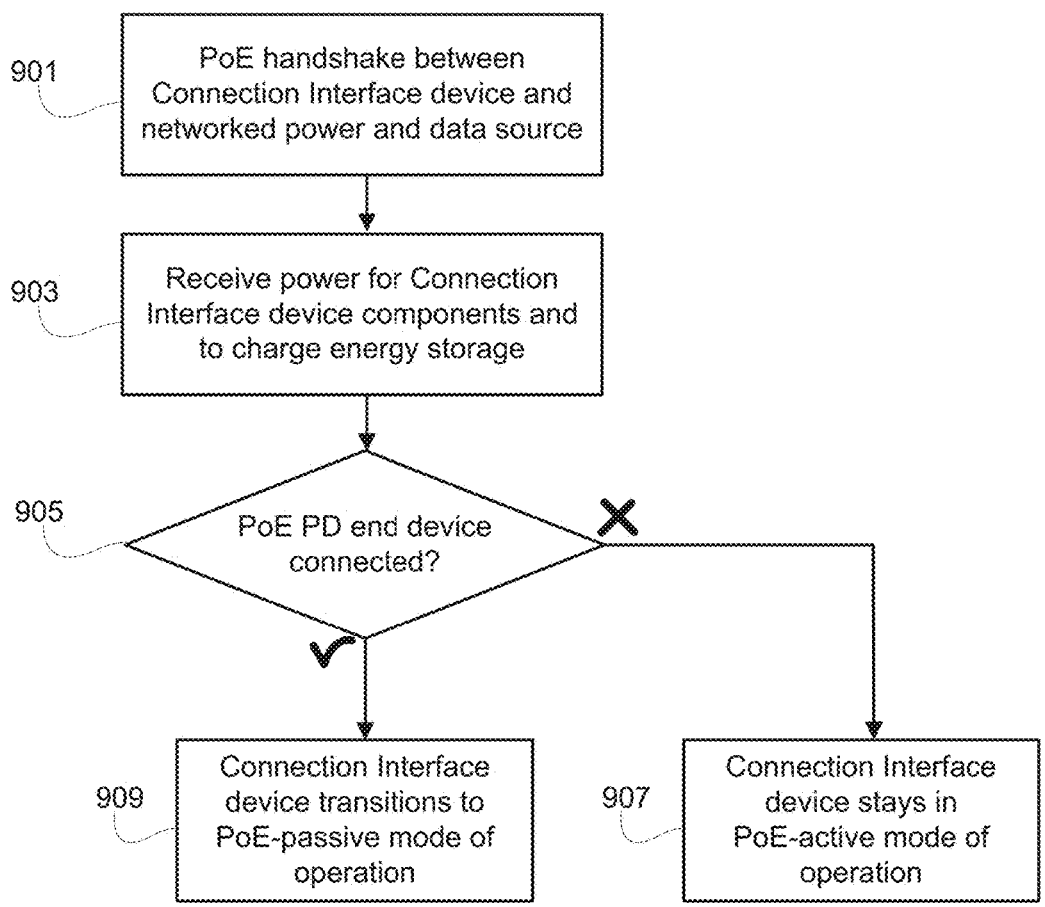
FIG. 9 is a flowchart illustrating an exemplary process for operating a Connection Interface device.

In the context of the configuration of components shown in FIGS. 8A and 8B, FIG. 9 is a flowchart illustrating a process for operating a Connection Interface device. The process begins after the Connection Interface device is properly connected to a suitable power source and fiber optic communications source (e.g., the Power Insertion Device or other PSE). At stage 901, the Power Insertion Device or PSE (i.e., a networked power and data source) is powered on and initiates a signaling exchange according to a PoE protocol to determine whether a powered device is connected thereto. The PoE PD controller of the Connection Interface device responds with the appropriate handshaking protocol that informs the Power Insertion Device or PSE that the Connection Interface device is a PD that needs power.

After the PoE handshaking is complete, the Power Insertion Device or PSE sends power to the Connection Interface device (e.g., via the hybrid fiber/power cable or other connection between them), allowing power to flow through the Connection Interface device's switch and power conversion circuitry to other circuitry at stage 903. This allows the media converter to be powered and begin functioning, as well as charging of the Connection Interface device's energy storage.

When the energy storage is sufficiently charged, a comparator enables the current sensing circuitry at stage 905, which applies a test current through the output switch to ascertain whether there is a PoE-compliant end device that is a PoE PD plugged into the RJ45 connector of the Connection Interface device. In the initial power-up state, the output switch defaults to "open" for the PoE power bypass path (i.e., the PoE power is not passed through the magnetic and the RJ45-style connector to the end device; only but the test current is). Additionally, for the determination of whether a PoE PD end device is present, a low-pass filter may be applied to reduce transients so as to minimize the likelihood of a false positive. Once the signal is confirmed present for a sufficient time, the detection of the presence of a PoE PD end device is considered to be valid.

If the test current does not detect the presence of a PoE PD end device, the media converter continues to operate to convert optical data to electrical data, and the output switch remains "open" for the PoE power bypass path (stage 907), which corresponds to remaining in a PoE-active mode of operation where the Connection Interface device continues to act as a PD and to request and receive power from the Power Insertion Device or PSE. This allows a non-PD end device plugged in to the Connection Interface device to send and receive Ethernet data in a normal fashion (while utilizing a long range enabled by the optical fiber-based communication network). In this mode where the Connection Interface device itself requests power, the Connection Interface device provides an effectively self-powered optical Ethernet transceiver, needing no independent or far-end source of power to be provided to the transceiver by the end device or a user.

If the test current detects the presence of a PoE PD end device, the Connection Interface device transitions to a PoE-passive mode of operation (stage 909) where the Connection Interface device does not act as a PD and does not request power from the Power Insertion Device or PSE. A first delay, "Delay One," is initiated, current sensing circuit is disabled, and the PoE PD controller of the Connection Interface device is disabled. The period of Delay One is set so as to allow sufficient time for the Power Insertion Device or PSE to recognize that the Connection Interface device is no longer functioning as a PD and to shut down power to the Connection Interface device. Once the Power Insertion Device or PSE shuts down power, the power conversion circuitry of the Connection Interface device will become inactive, while the control circuitry will continue to run on the power already stored in energy storage.

At the end of the Delay One period, a second delay, "Delay Two," is initiated, whose period is long enough to ensure that the state of the output switch is changed and that a latch is activated. This latch maintains the output switch in an activated state such that the output switch stays activated even as the energy remaining in energy storage of the Connection Interface device approaches its minimum. Also activated and latched is the voltage-sensing circuitry which enables detection of incoming PoE voltage independently of the PoE PD controller (which has already been disabled during the Delay One period).

With the output switch is activated, the path that runs through the magnetics is transferred from being connected to the current sensing circuitry to being connected to the PoE Power Bypass. This then connects the "PoE Power In" through the magnetics and the RJ45-style, connector to the PoE PD end device that is connected to the RJ45 connector. This allows the Power Insertion Device or PSE to initiate a PoE start-up handshaking protocol with the PoE PD end device. Until this handshaking is complete, no power is applied to the PoE Power In and consequently, the control circuitry and the output switch are powered by the energy stored in energy storage. The energy storage is designed to have sufficient capacity to continue to provide enough power to the control circuitry and the output switch to operate long enough for the Power Insertion Device or PSE to begin delivering power to a PoE PD end device.

Once the Power Insertion Device or PSE is providing power to the PoE PD end device via the PoE Power Bypass of the Connection Interface device, the now-active voltage-sensing circuitry detects the presence of a PoE Power In voltage above the PoE protocol-compliant minimum. This causes the Parallel Switch to be activated to apply power to the Power Conversion circuitry. This, in turn, allows power to be applied to the media converter which provides for data communications between the Power Insertion Device or PSE and the PoE PD end device via the Connection Interface device. Thus, in this PoE-passive mode of operation where the power for the Connection Interface device is siphoned off from the power provided to the PoE PD end device by the Power Insertion Device or PSE, an independent power path is enabled to allow the control circuitry of the Connection Interface device to be re-powered without waiting for the delay of charging the energy storage section. This enables proper continued functioning an greatly reduces the likelihood of a fault condition due to a delay in re-powering the control circuitry.

With the transition to the PoE-passive mode of operation for the Connection Interface device complete, the PoE PD end device is fully powered by the Power Insertion Device or PSE, and operation of the media converter of the Connection Interface device provides the data path between the Power Insertion Device or PSE and the PoE PD end device.

If the PoE PD end device is powered off or unplugged, or if the Power Insertion Device or PSE is powered off or disconnected, the Connection Interface device resets to a default initial operating state (which it was in prior to stage 901). This puts the Connection Interface device into condition to allow for power up and initiation of communications, and minimizes the risk of damaging a connected end device.

Exemplary Connection Interface Devices

The following discussion provides several examples of connection interface devices in accordance with certain embodiments of the disclosure. The connection interface devices serve as adapters to interface one or more hybrid power/fiber cables with one or more user devices (previously referred to as end devices or end client devices). One advantage of this system is that once the hybrid power/fiber cables and the connection interface device is set up, the user experience is similar to a legacy system (e.g., they would only need to plug in a device via a USB port or an Ethernet port, and would not need to interact with the fiber optic-based portion of the network).

Figure 10:
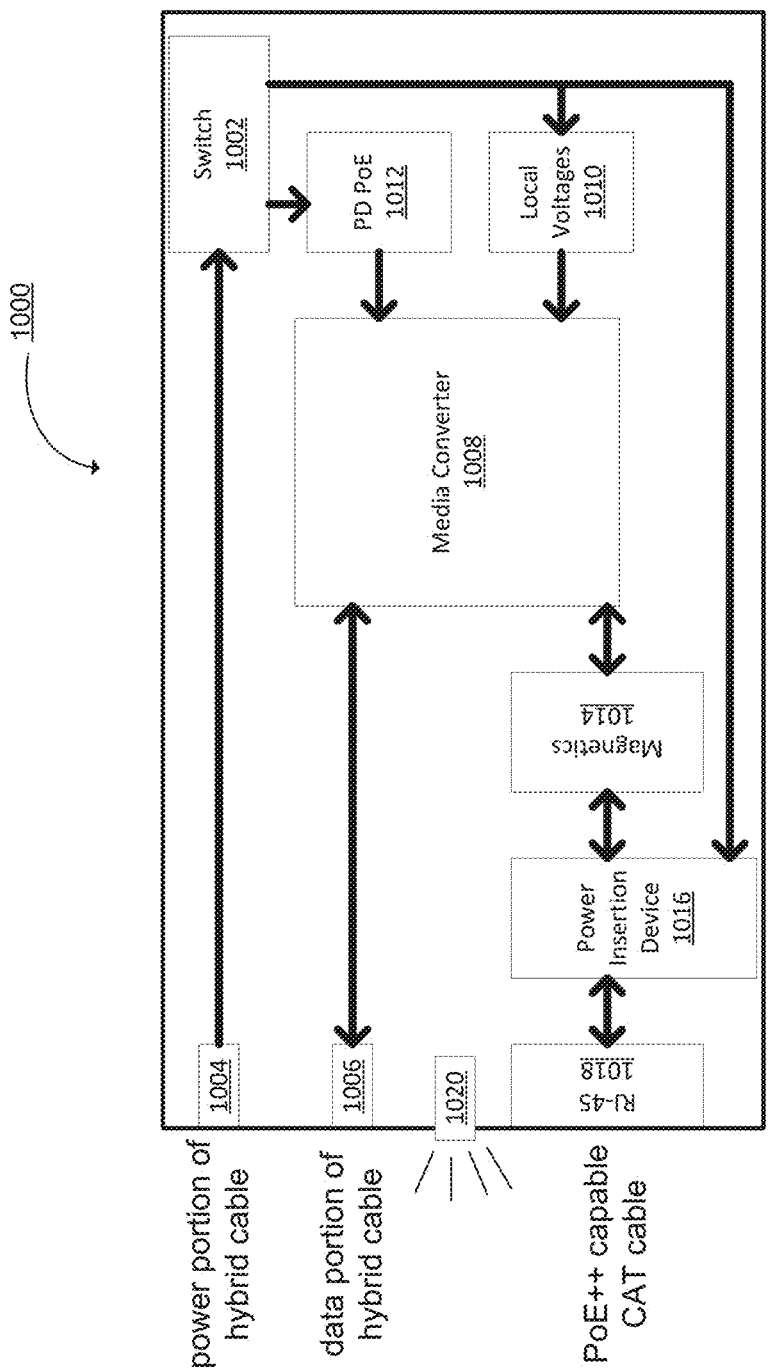
FIGS. 10-13 are block diagrams illustrating exemplary configurations of Connection Interface devices for several exemplary applications.

FIG. 10 provides an exemplary embodiment of a connection interface device 1000 compatible with multiple versions of PoE, for example, PoE, PoE+, and/or PoE++. The connection interface device 1000 is shown to include a power input port 1004, a data port 1006, a swath 1002, a voltage converter 1010, a media converter 1008, a powered device controller 1012, magnetics 1014, a power insertion block 1016, and an RJ-45 connector 1018. The connection interface device 1000 may have other features like an indicator light 1020. In certain embodiments of the disclosure, the connection interface device 1000 receives a power portion of a hybrid fiber-power cable through power input port 1004 and a data portion of the hybrid fiber-power cable through data port 1006. A switch 1002 is included that allows the diversion of the power from power input port 1004 to either the powered device controller 1012 (such that the converter itself may act as a powered device) or the power insertion block 1016 (such that the end device may act as a powered device via the RJ-45 port). As discussed above with respect to other exemplary embodiments, the switch 1002 may be a manual switch controlled by a user or an automatic switch controlled by a controller (not shown).

The connection interface device 1000 may be used with a powered device (PD) end device that requires power through Ethernet connection (the RJ-45 connector 1018) or may be used with a non-PD end device with no power requirement.

In certain exemplary configurations, the Ethernet connection supports data transmission at a rate of at least Gigabit Ethernet (GbE or 1 GigE). In the case where a PD end device is connected to the RJ-45 connector 1018, switch 1002 is configured to pass the power signal from the power input port 1004 to the power insertion block 1016. With this path chosen by the switch, the voltage converter 1010 also obtains the voltage present at the power input port 1004 and converts these voltages to local voltages used to run the media converter 1008. For example, the power input port 1004 allows a 55 V electrical signal to pass to the voltage converter 1010 and the power insertion block 1016. The voltage converter 1010 then converts the received 55 V electrical signal to a 12 V electrical signal used to power the media converter 1008. In certain embodiments, the power input port 1004 interfaces a power cable that is no larger than about 18 gauge. When switch 1002 is configured to allow the voltage present at the power input port 1004 to pass to the powered device controller 1012, the powered device controller 1012 is used to provide power to the media converter 1008. For example, the power input on 1004 allows a 55 V electrical signal to pass to the powered device 1012, and the powered device 1012 converts this voltage to a 12 V electrical signal in order to power the media converter 1008. This methodology may be proposed for low voltage applications where the power portion of the hybrid cable does not carry an electrical signal with a voltage rating greater than 60 V. The power insertion block 1016 may be engineered to pass the no greater than 60 V signal through the RJ-45 connector 1018 to the PD end device.

The media converter 1008 contains multiple elements. Data port 1006 receives the data portion of the hybrid fiber-power cable (or hybrid cable). Thus, the data port 1006 receives the fiber portion of the hybrid cable, and the media converter 1008 is configured to convert the optical signals to electrical signals. In certain instances, the data port 1006 is an SFP cage that receives an active optical cable (AOC) that already has an SFP built into the cable. The media converter 1008 contains at least one transceiver chip and any support circuitry required to convert the optical signals to electrical signals. In certain aspects, the media converter 1008 supports 10/100/1000/10000 SFP to Ethernet conversion. To comply with Ethernet standards and provide isolation, magnetics 1014 couple the signals between the RJ-45 connector 1018 and the media converter 1008. Since RJ-45 connector 1018 may be configured to provide power to a PD end device (not shown) connected to it, the power insertion block 1016 couples the power signal relayed from the switch 1002 to appropriate terminals on the RJ-45 connector 1018. In certain instances, the connection interface device 1000 is made to be as small as possible.

Figure 11:
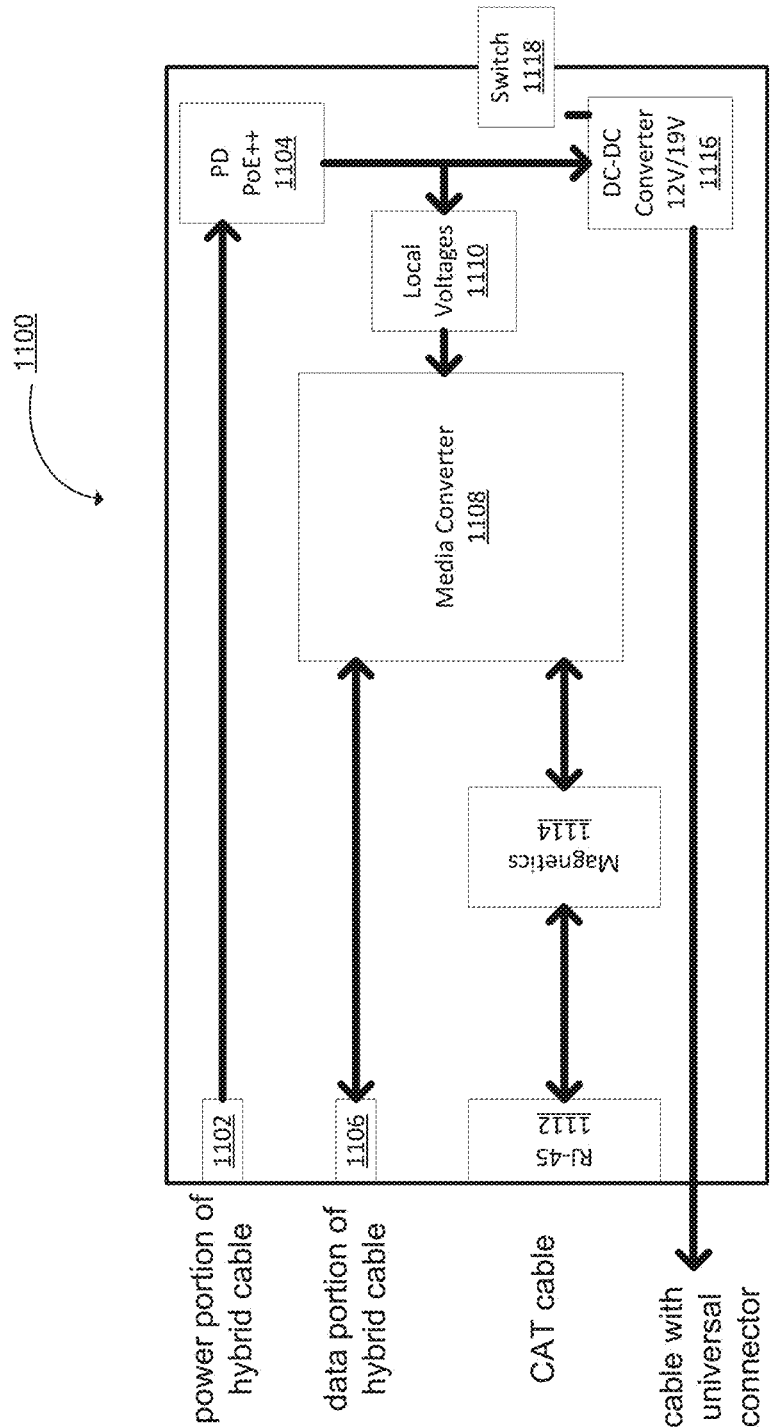

FIG. 11 provides an exemplary embodiment of a connection interface device 1100, with DC-DC converters, that allows a non-PoE end device with a separate power connector to be provided with both data and power (e.g., a laptop). FIG. 11 includes a power input port 1102, a data port 1106, a media converter 1108, a powered device controller 1104, a voltage converter 1110, magnetics 1114, and RJ-45 connector 1112. These blocks perform similar functions those explained for FIG. 10. FIG. 11 additionally includes a DC-DC converter 1116 and a switch 1118. The connection interface device of FIG. 11 uses the swath 1118 to select between multiple output voltages of the DC-DC converter 1116. For example, the power input port 1102 provides a 55 V electrical signal to powered device controller 1104, and powered device controller 1104 relays the 55 V electrical signal to the DC-DC converter 1116. The DC-DC converter 1116 down-converts the 55 V electrical signal to either a 12 V electrical signal or a 19 V electrical signal. The output of the DC-DC converter 1116 is controlled by the switch. 1118. In an exemplary implementation, the powered device controller 1104 is a Linear Technology PoE++ 100 W PD, and the DC-DC converter 1116 is a Linear Technology 100 W 55 V to 12 V/19 V DC-DC Converter.

FIG. 11 does not provide a power insertion device coupled to the RJ-45 connector as provided in FIG. 10, so this connection interface device 1100 may target different applications than that of FIG. 10. An exemplary application is provided in FIG. 11 where the wire from the DC-DC converter 1116 is part of a 3 ft laptop cable terminated with a universal connector. Some laptops require 19 V chargers, so the specific example where 19 V is supplied by the DC-DC converter is advantageous. The ability to use a hybrid cable to supply enough power to charge or power a laptop is advantageous. In certain aspects, the RJ-45 connector 1112 is used by the laptop for data communication. Therefore, a hybrid cable carrying fiber data and copper power may be provided to a connection interface device 1100, and the output of the connection interface device 1100 provides separate ports for communication (RJ-45 connector 1112) and power to a user device. A laptop is provided here as an example, but is not meant to be limiting, for a desktop computer, a server device, a handheld device like a personal digital assistant (PDA), a tablet, etc. may benefit from the connection interface device 1100. In some instances, the DC-DC converter 1116 may be modified in order to match the output voltage of the DC-DC converter 1116 to user device-expected input voltages. For example, power supplies for a large number of computers may require 115 V or 230 V signals. Additionally, in certain embodiments, an AC-AC converter may be used to accommodate providing 115V or 230V AC signal when the power input to the connection interface device 1100 is an AC signal.

In addition to using the connection interface device 1100 for a single laptop, multiple connection interface devices 1100 with several hybrid cables may be used for multiple computing devices. For example, when using a powered device 1104 with a power limit of 100 W, only one laptop may be able to draw power from this connection interface device 1100. Commercial laptops may be found with about 45 W to about 90 W power adapters, so depending on the power requirements of the laptop, only one connection interface device 1100 with a power limit of 100 W may be used for one laptop. In order to power more devices, for example in an office setting, each laptop may need its own connection interface device 1100 so as to not exceed the 100 W power limit. Desktop computers and servers are sometimes known to require at least double the amount of power compared to laptops, so in an office setting, a desktop computer may require at least two hybrid cables for power. In certain embodiments, a parallel system is utilized to realize the power requirements for a desktop computer. Two connection interface devices may be housed in one box, and the box receives two hybrid cables and provides two output ports, for example a 19V output and a USB-C output. The two output ports will supply a combined total of at most 200 W, and a user device with both a 19V connector and a USB-C connector may combine the power from both to sidestep the 100 W limit of a connection interface device. A single device with two power ports may combine both 100 W outputs to obtain the at most 200 W power required. In certain instances, the two output ports are utilized to support two different devices.

In certain embodiments, an end device is a zero client computing device that does not need multiple hybrid fibers or multiple connection interface devices. The zero client device uses minimum components, relying on cloud services for software, computing, and storage. Only a minimal number of applications are installed on the zero client device, and in some cases, the zero client device is merely mirroring display projections of a remote server. In this setup, the media converter 1108 is very advantageous since large amount of data transfers will occur between the zero client device and its cloud server(s). In certain examples, the zero client device may be a zero client, monitor, laptop, or desktop.

Figure 12:
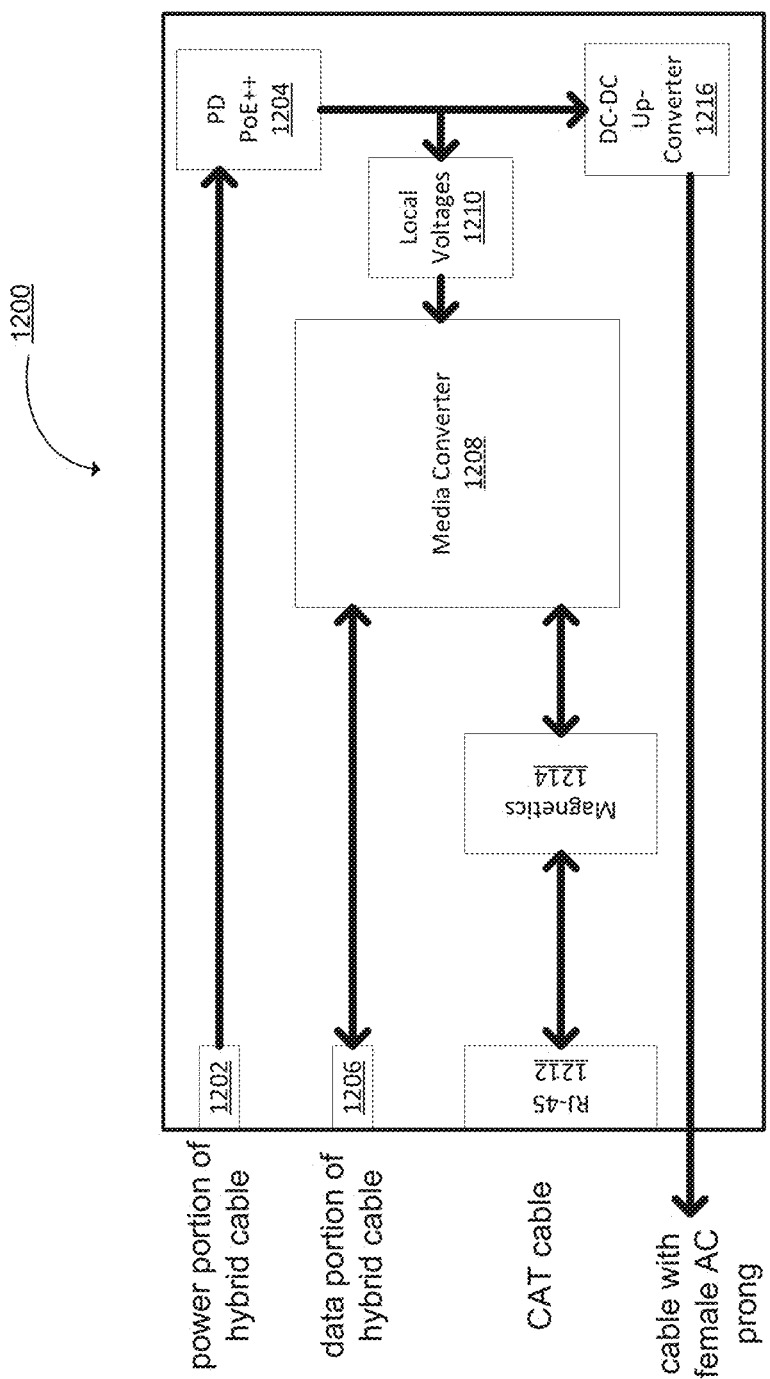

FIG. 12 provides another exemplary embodiment of a connection interface device 1200 that may be used instead of that of FIG. 11. The discussion surrounding desktop computers or all-in-one computers may include modifications to the power supply in order to comply with the architecture provided in FIG. 11. In FIG. 12, a DC-DC up-converter 1216 is provided which up converts, for example, a 55 V electrical signal to a 140 V electrical signal in order to comply with voltage requirements without requiring changes to the desktop computer's power supply. In FIG. 12, a power input port 1202, a data port 1206, a media converter 1208, a powered device controller 1204, a voltage converter 1210, magnetics 1214, RJ-45 connector 1212, and a DC-DC up-converter 1216 is provided. The architecture is similar to that of FIG. 11, but there is no switch selecting the output voltages of the DC-DC up-converter 1216. In certain embodiments, a switch may be added to provide different output voltages. The output of the DC-DC up-converter 1216 may be terminated with an AC type 2 to 3 prong female connector. The DC-DC up-converter 1216 may be one of many converters that include components selected from the group consisting of capacitors, inductors, diodes, and transistors. The connectors provided in certain embodiments of FIGS. 10, 11, and 12 are provided as examples to interface each connection interface device for the various applications provided and are not meant to limit embodiments.

Figure 21:
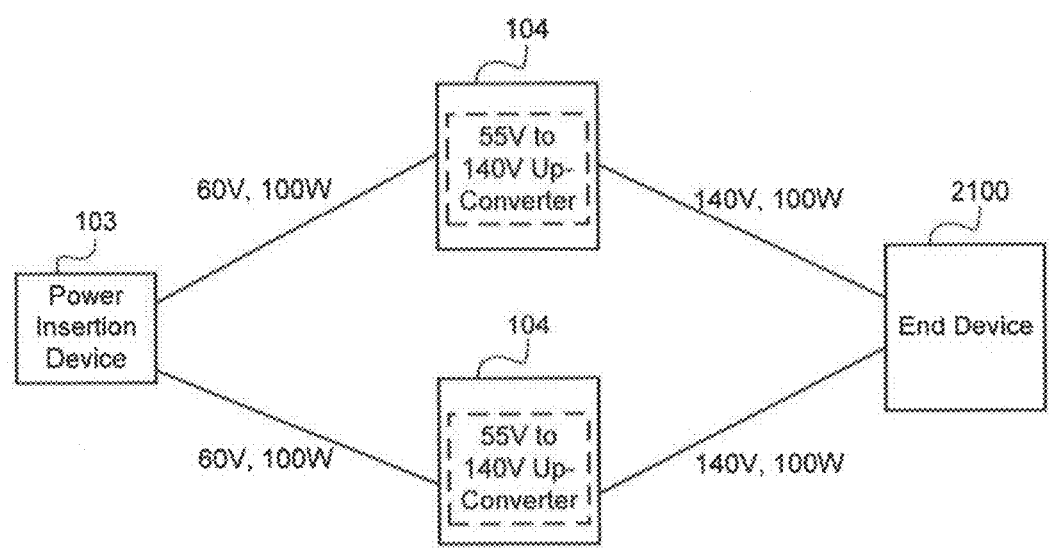
FIG. 21 illustrates an example of supplying a relatively high-wattage end device with power according to an exemplary embodiment of the disclosure.

FIG. 21 illustrates an example of how up-conversion from a 55V electrical signal to a 140V electrical signal may be used to supply a relatively high-wattage end device 2100 (such as a TV requiring over 100 W) with power in accordance with the network architectures shown, for example, in FIGS. 1A-1B. In FIG. 21, the power insertion device 103 provides 60V, 100 W power over multiple hybrid cables. These hybrid cables are input into multiple connection interface devices 104 having up-converters for converting 55V to 140V (or alternatively, input into a single connection interface device 104 having multiple inputs for hybrid cables and respective up-converters). Accordingly, two separate 100W, 140V power lines may be combined at an end device TV to achieve more than 100 W being provided to the end device TV. It will be appreciated that, for simplicity of illustration, the data connections between the connection interface devices 104 and end device 2100 are not illustrated. Up-converting 55V to 140V is used here as an example. If an end device requires more than 140V, multiple up-converted power signals may be combined to power a single end device 2100 as depicted in FIG. 21, or, in the alternative, an up-conversion of 55V to an electrical signal of greater than 140V (e.g., 55V to 200V) may be utilized. In some instances, 140V is the appropriate voltage, but more than 100 W of power is necessary, so multiple up-converted power signals are provided to increase the amount of current and thus increase power provided to the single end device 2100 to over 100 W. In some embodiments, the hybrid cables that connect to multiple connection interface devices 104 include input receptacles that support various types of connectors. Examples of connectors for use with hybrid fiber/wire cables are described in U.S. patent application Ser. No. 15/233,312, which is incorporated herein by reference in its entirety.

In certain instances, the DC-DC up-converter 1216 is capable of providing a 140 V signal in order to power a desktop computer or a zero client device. In addition, the connection interface device 1200 is capable of being used to power a television or smart television. When powering a smart television, the TV's power connector plugs directly into the 2-3 prong female connector of the connection interface device 1200. The smart TV may use the RJ-45 connector 1212 to transmit and receive data. Up-converting to 140 V is provided here as an example, but the 55 V electrical signal may be up-converted to any desired voltage above 55 V (e.g., up to 140 V or more), in some embodiments, the up-converter is built into the smart TV, and the connection interface device provides 55 V electrical signal to the smart TV. The up-converter in the smart TV then converts the 55 V electrical signal to 140 V to operate the TV.

Figure 13:
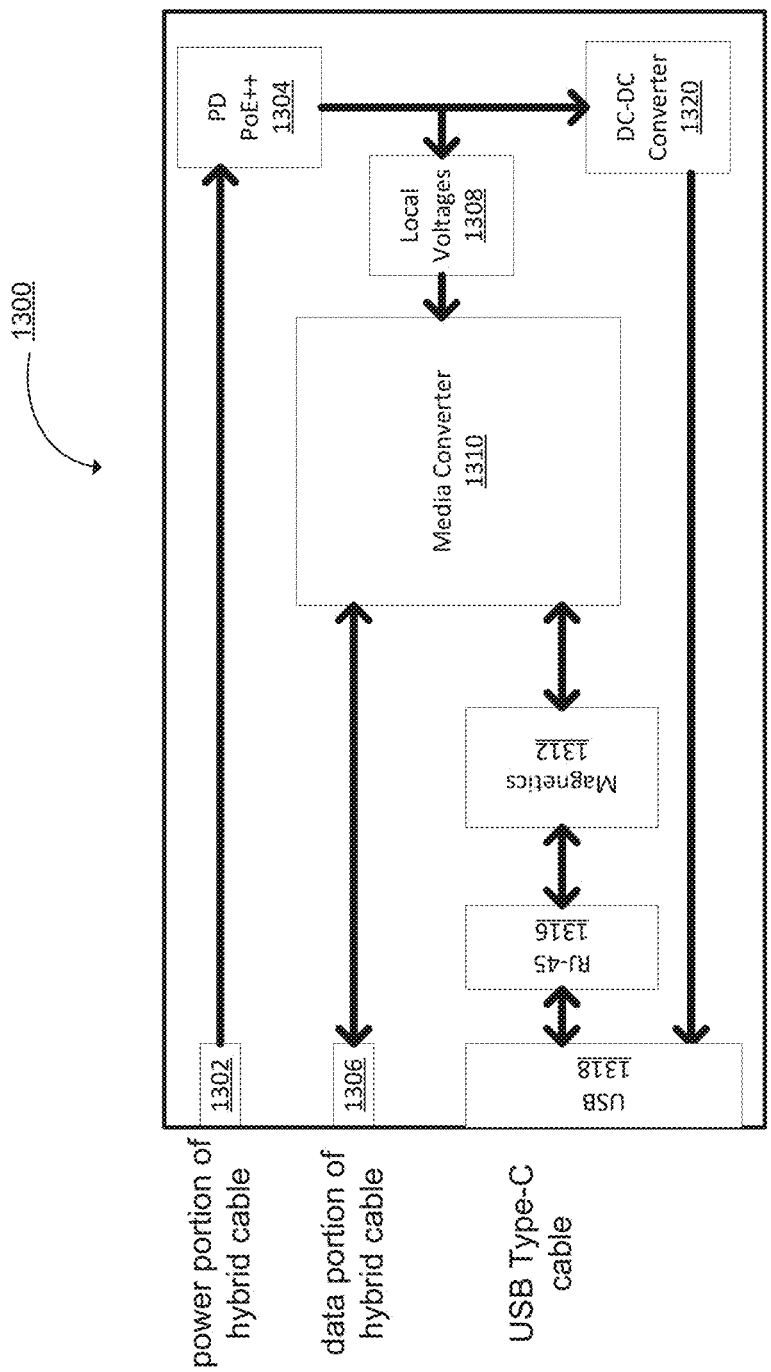

FIG. 13 provides another embodiment of a connection interface device 1300. The connection interface device 1300 includes a power input port 1302, a data port 1306, a powered device controller 1304, a voltage converter 1308, a media converter 1310, magnetics 1312, an RJ-45 connector 1316, a USB Type-C connector 1318, and a DC-DC converter 1320. The DC-DC converter 1320 in FIG. 13 may be a downconverter that converts a 55 V 100 W electrical signal from the powered device controller 1304 to a 20 V 100 W electrical signal for power insertion to USB Type-C connector 1318.

FIG. 13 provides an example where one connector (RJ-45 connector 1316) is mapped to another connector (USB Type C: connector 1318). An immediate application of this connection interface device 1300 is the powering of laptop computers and mobile devices. The small form factor of a USB Type-C connector 1318 supports a thin interface for smaller, lighter devices. Additionally, the USB Type-C connector 1318 will support data transfers of up to 10 Gbps. FIG. 13 provides a low cost method of realizing an SFP to USB-Type C converter, allowing for power insertion as well in order to provide a single port that may be used for both power and data transfer. This utility is advantageous because as real estate in mobile devices becomes more valuable, certain hardware and connectors are usually left off. This trend was seen in the disappearance of the floppy drive from laptops and later on the non-inclusion of optical drives in laptops. The connector interface device 1300 provides a compact means to use one port for powering a device as well as performing high speed data transfers for the device. The example provided in FIG. 13 is compatible with using off-the-shelf components in order to minimize costs, but there are multiple ways of realizing the architecture. In certain instances, the intermediate conversion to RJ-45 is unnecessary.

FIGS. 10-13 provide certain additional exemplary embodiments of a connection interface device. The realization of such a device, in the context of the fiber optic communications-based network of FIG. 1A, is applicable in multiple situations.

Exemplary Environments

The following discussion will center on several environments that benefit from certain aspects of the disclosure.

In an office building scenario, an exemplary data center 110 may be housed in a multistory office building, for example, at the basement of the building. Fiber cables may be run from the data center 110 to multiple offices and areas of the building. One or more power insertion devices 103 are placed at strategic locations in the multistory office building. The one or more power insertion devices 103 interface with the fiber cables, connected to data center 110, and provide multiple hybrid fiber-power cables that are then routed to specific devices or equipment in the building. For an exemplary office space, multiple hybrid fiber-power cables may be utilized in different capacities. Further, certain end devices may utilize above-the-ceiling runs of copper connections, such that multiple different types of connections may branch out from the power insertion device (e.g., hybrid fiber-power cables, power-only copper cables, hybrid cables in which only one or the other of the fiber and power portions are used, etc.). In certain instances, the power portion of the fiber-power cable (e.g., a copper wire), may be used for both power and low-level communications. For example, pulse width modulation (PWM) signaling may be used to provide certain control functions, such as to dim lights, reset smoke alarms, and provide signaling for intruder detectors like motion, sound, and heat detection circuits. Additionally, in certain instances, a copper connection may be used to power a room thermostat and to simultaneously report temperature from the thermostat or other low data rate monitors. For these types of end devices, the connection from the power makes it unnecessary to run the fiber connection of the hybrid fiber cable, since both power and data transfer may be realized with only the copper connection. Data transfer on the copper wire provides the ability to remotely monitor as well as remotely control several end devices in the office space. The remote monitoring and control enables management of energy resources used by several items in the office.

In an exemplary aspect of the office space scenario, combinations of multiple hybrid fiber-power cables (or, e.g., a hybrid fiber-power cable with a power-only cable) may be used to provide about 200 W to power end devices in an office that have relatively higher power requirements. This amount of power is enough to run, for example, a large TV, a desk lamp or LED light fixture, and/or charging stations for mobile or laptop computing devices. In one example, connection interface devices like those provided in FIGS. 10-13 may be provided with multiple output ports, for example, through a multi-outlet converter or power strip to provide power to or to provide charging for multiple devices. In certain instances, depending on output power requirements, multiple hybrid cables may be used as inputs into a box that contains multiple connection interface devices to provide the multi-outlet power strip.

In a specific exemplary implementation, an LED lamp and a laptop may be powered for under 100 W by a particular connection interface device with multiple power input ports and multiple power output ports. Another 100 W provided to the connection interface device may be used to provide a power strip for other devices, for example, a USB charging outlet for handheld devices like tablets, phablets, mobile telephones, mobile gaming systems, and other small electronics. In addition to these devices, security cameras requiring high data rates may use both the data and power attributes of the connection interface device. Similar to the security camera application, small electronics like wireless access points and wireless or wired routers may utilize the connection interface device according to various embodiments for power and sometimes for data transfer.

In another exemplary aspect of an office environment, a conference room is equipped with multiple connection interface devices that provide a plurality of outlets for powering devices as well as multiple connectors for data transfer. For example, Ethernet RJ-45 connectors and USB Type-C, connectors as discussed above are able to power devices, as well as facilitate data transfer. In certain instances, one or more AC female connectors are provided. The conference room may have a large, central table with multiple outlets connected to at least four hybrid fiber-power cables in order to provide at least 400 W of power.

Although a conference table is used here as an example in an office location, it will be appreciated that these concepts may be extended to other building environments with similar needs. For example, in an airport, a charging bar or multiple charging kiosks may be set up by running multiple hybrid fiber-power cables. The number of hybrid fiber-power cables run depends on the demand expected from the charging bar or kiosks. In an example that utilizes up to 400 W of power, four hybrid power-fiber cables may be utilized to deliver power, and optionally data, to the charging bar or kiosk. Each hybrid cable in this example would carry up to about 100 W of power.

In certain embodiments, the size of the connection interface device is minimized. For example, in the laptop AC adaptor setup exemplified in FIG. 11, providing the components of connection interface device 1100 in an adapter of the same size as laptop adapters, for example, about 2 inches×5 inches×1.2 inches. Furthermore, when considering the embodiment provided in FIG. 13, minimization of connection interface device 1300 to be USB dongle sized, for example, 1.2 inches×0.6 inches×4 inches is beneficial.

Another exemplary environment in which embodiments of the present disclosure may be used is a hospital or other medical services-related environment. For example, each hospital may run one or more private data centers 110 as provided in FIG. A. In other examples, only the Splice and Connector Patch Panel 102 is housed in the hospital. The fiber cables from data centers 110 are routed throughout the hospital with power insertion devices 103 located for example, in every room, or on every floor, or in designated zones of the hospital. In certain instances, an AC wall outlet in the room providing 120 V AC is utilized with a power insertion device and downconverted to around 60 V AC or DC for power insertion along hybrid cables. After the power insertion point, multiple hybrid cables are run from the power insertion device to various connection interface devices as provided in FIGS. 10-13 in order to power different electrical devices, instruments, and equipment. For example, the hybrid cable may be used to power a television in the room. In an example, in order to reduce the chance of wireless interference with hospital equipment, a smart TV with a connection interface device similar to that of FIG. 12 may be used. This allows for the RJ-45 connector to facilitate data transfer, and the DC-DC up converter 1216 to power the smart TV. As previously discussed, multiple hybrid cables may be used in order to boost the power supplied to the smart TV past 100 W. Apart from a smart TV, the hospital room may also utilize the hybrid cables with connection interface devices to power, for example, patient sensors through the power ports of the communication interface device and to monitor the status of those sensors through the data ports of the communication interface device.

In certain embodiments where the data center 110 is close to the power insertion device 103, for example, in a smaller hospital, the power insertion device 103 may be housed with the data center 110. Long runs with lower AWG wires may be used in these instances to reach the various devices and instruments within the hospital that require power and/or data. This scenario is beneficial because power insertion for the entire hospital is centralized, allowing for central control of both power and data at the data center 110. This scenario allows, for example, implementation of a centralized backup power system and centralized control of various items, such as, lights, thermostats, etc.

It will be appreciated that the hospital and office environments discussed above are merely exemplary, and that the principles discussed herein are applicable to many other environments where multiple end devices are used virtually an building). For example, the hybrid cable and connection interface device may be utilized in casinos for slot machines, poker terminals, surveillance devices, point-of-sale systems, etc. Other exemplary environments include courtrooms, educational institutions, dorm rooms, athletic facilities, nursing facilities, large residences, etc.

Exemplary Installation Configurations

Various embodiments of the disclosure provide methods of connecting the connection interface device 104 to the power insertion device 103. In one exemplary embodiment, to aid installation of hybrid power-fiber connections between the power insertion device 103 and the connection interface devices 104, a structured cabling configuration may be used where connections are mapped out and the fibers precut and terminated for long connections. In another exemplary embodiment, various standard lengths of hybrid fiber-power cables may be used such that the runs of cable between the power insertion device 103 and specific connection interface devices 104 may be used. In other exemplary embodiments, as will be discussed in further detail below, an installer for the overall hybrid power-fiber cable system may run the hybrid cables to the end devices at various end locations on the fly.

The following discussion will describe some exemplary ways in which hybrid fiber-power cables and connection interface devices may be installed (for example, in any of the exemplary environments discussed above) such that the end user is able to interact with an electrical port (such as an RJ-45 port or a USB port) on the connection interface device.

Figure 14A:
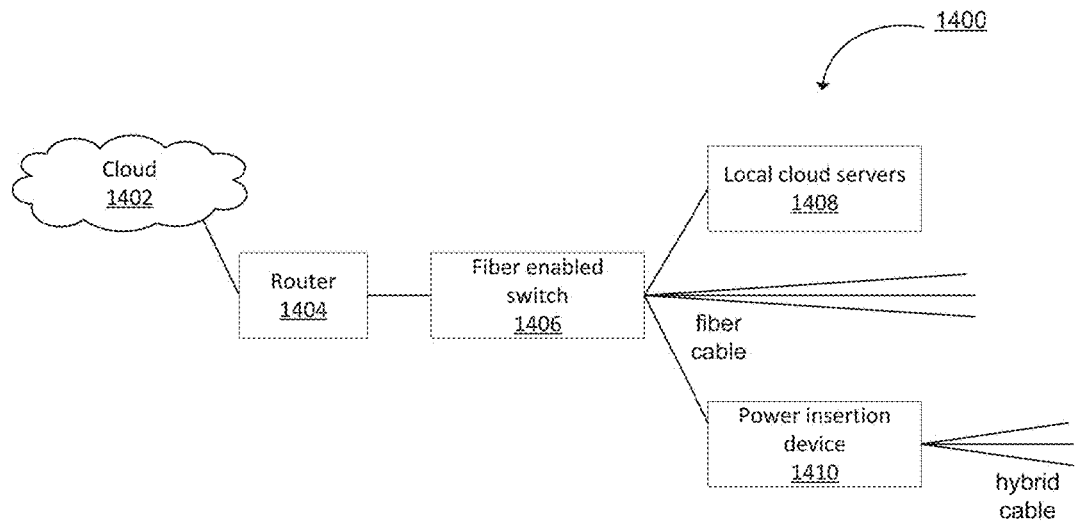
FIG. 14A-B are block diagrams illustrating home and network configurations according to certain exemplary embodiments of the disclosure.
Figure 14B:
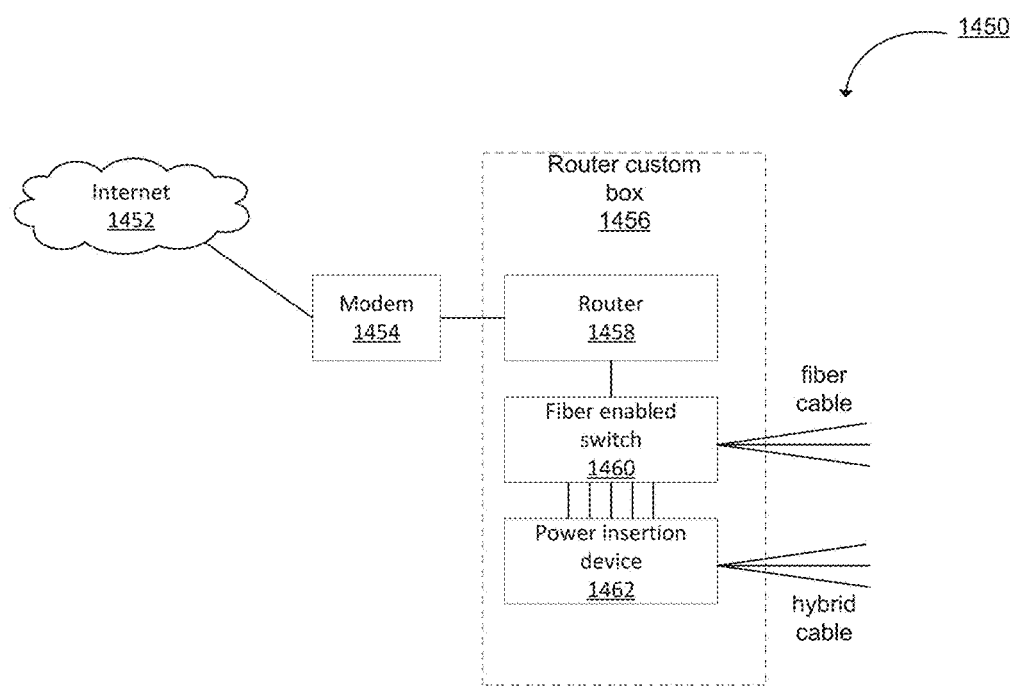

FIGS. 14A-B are block diagrams that illustrate examples of an enterprise architecture and a home network architecture, respectively, to better understand the environment an installer may be working in. The enterprise network architecture 1400 in FIG. 14A comprises an internet space and/or external cloud 1402, router 1404, fiber enabled switch 1406, local cloud servers 1408, and power insertion device 1410. The fiber enabled switch 1406 provides fiber connectivity and is analogous to the data center 110 in FIG. 1A. The fiber enabled switch 1406 may connect to multiple end devices (not shown), where each end device corresponds to a port on the switch 1406. The fiber enabled switch 1406 may have very high speed connections, for example, 40 Gb to local cloud servers 1408 and lower speed connections, for example, 1 Gb or 10 Gb to other devices connected through the fiber cable. The power insertion device 1410 provides power to devices connected through hybrid cables (or through copper power cables). In this enterprise network architecture 1400, the fiber cables may span long distances while one or more power insertion devices 1410 may be positioned at strategic locations closer to the end devices to which they provide power to (e.g., within about 30 m of the end device, or on the same floor or in the same room as the end device).

The home network architecture 1450 in FIG. 14B comprises an outside network such as the internet 1452, a modem 1454, a customized interface box 1456 that provides router functionality 1458, a fiber enabled switch 1460, and a power insertion device 1462. In certain implementations, the customized box 1456 will provide an 8-port fiber enabled switch 1460 for the small home environment. The number of fiber cable connections and hybrid cable connections are dependent upon application and manufacturer, and may vary between different implementations. In this exemplary home network architecture 1450, the hybrid cable will be connected to connection interface devices, with appropriate installations of the hybrid fiber-power cables to the connection interface devices.

Figure 15:
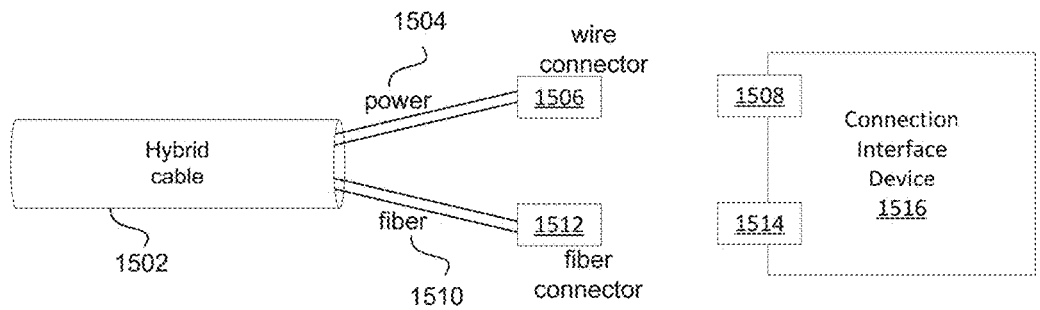
FIG. 15 illustrates an exemplary configuration of how to connect a hybrid cable to a connection interface device according to certain exemplary embodiments of the disclosure.

FIG. 15 shows an exemplary hybrid power-fiber cable 1502 with a cabling interface that is compatible with power port 1508 and data port 1514 of connection interface device 1516. In certain embodiments, the hybrid cable carries two copper wires 1504 for power and two optical fibers 1510 for data connection. In FIG. 15, the hybrid cable is shown with separate wire connector 1506 and fiber connector 1512. In certain instances, the fiber connector 1512 is an LC connector or a duplex LC connector. The matching data port 1514 on connection interface device 1516 is configured to accept the fiber connector 1512. In this scenario, the hybrid cable is a predetermined length because it is "pre-terminated" with the fiber connector 1512. An installer then connects the fiber connector and the wire connector to the corresponding ports of the connection interface device on-site. This scenario matches a structured cabling scenario where the fiber connectors are added by cable manufacturers.

Figure 16:
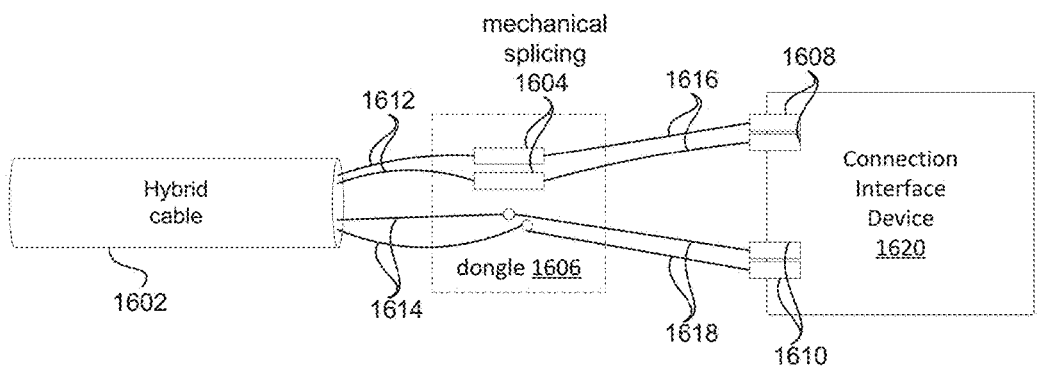
FIG. 16 illustrates an exemplary configuration of how to connect a hybrid cable to a connection interface device according to certain exemplary embodiments of the disclosure.

FIG. 16 shows another exemplary cabling interface. Hybrid cable 1602 is shown connected to connection interface device 1620 through a dongle 1606. In this scenario, the connection interface device 1620 is shown to have two fiber ports 1608 (one for transmitting data and the other for receiving data) and two power ports 1610 (for positive and negative terminal connections). The connection interface device 1620 is provided with already-terminated ports on one end and two fibers for data 1616 and two wires for power 1618 that are not terminated on the other end. The hybrid cable 1602 likewise has two fibers for data 1612 and two wires for power 1614 that are not terminated. The custom dongle 1606 provides for connection of the non-terminated wires and fibers via mechanical splicing 1604 of the fibers together within the dongle to hold optical fibers 1612 and 1616 together. A soldering, welding, or wire connector is used to connect copper wires 1614 from the hybrid cable 1602 to the corresponding dangling wires 1618 on the connection interface device 1620. The dongle 1606 (or junction box) may further have a covering that secures and clamps the wires together, providing strain relief. FIG. 16 provides an example with mechanical splicing, but in certain embodiments, the mechanical splice may be replaced with a connector pair.

Figure 17A:
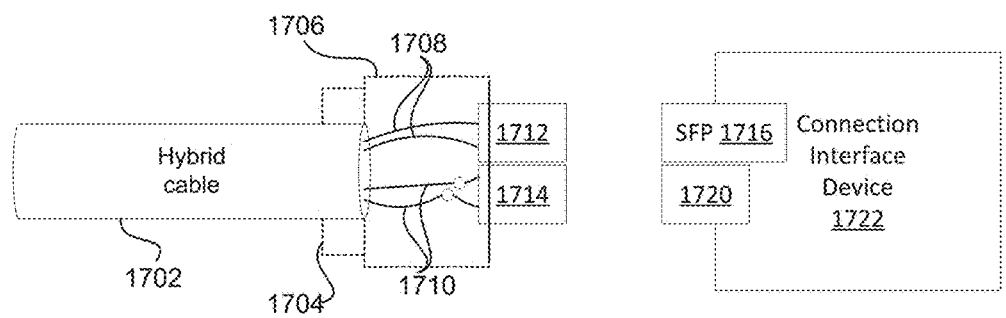
FIGS. 17A-C illustrate exemplary configurations of how to connect a hybrid cable to a connection interface device according to certain exemplary embodiments of the disclosure.
Figure 17B:
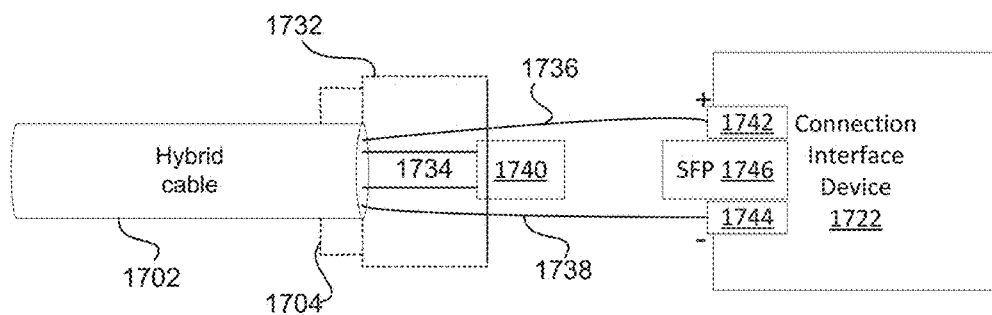
Figure 17C:
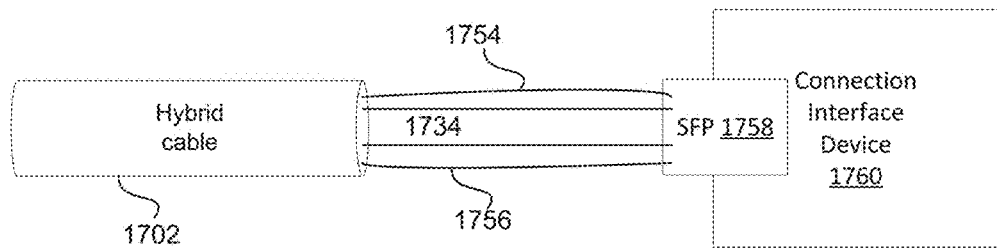

FIGS. 17A-C show single connector configurations from a hybrid cable to a connection interface device with an SFP. In FIGS. 17A-C, on the side of the connection interface device, no LC or SC fiber connectors are necessary since the SFP serves as the data interface to the connection interface devices. FIGS. 17A-B show connectors made from available off the shelf components while FIG. 17C shows a connector to interface with a custom built SFP.

In FIG. 17A, hybrid cable 1702 is to be connected to connection interface device 1722. Connector 1706 is held to hybrid cable 1702 through clamp 1704. Connection interface device 1722 has an SFP cage with an SFP 1716 and a power port 1720 to interface with connector 1706 with fiber connectors 1712 and wire connectors 1714. An advantage to this connection methodology is fiber connector 1712 may be a bare fiber connector since it only has to interface to air. Additionally, fiber connectors 1712 and wire connectors 1714 may be flexibly connected in order to facilitate connecting the hybrid cable 1702 to the connection interface device 1722. The main difference between FIG. 16 and FIG. 17A is that FIG. 17A is factory assembled while FIG. 16 may be assembled during installation of the connection interface device 1620.

FIG. 17B shows an alternate connector 1732 to that of FIG. 17A. The power connectors in FIG. 17B are on either side of the SFP of connection interface device 1784. In certain embodiments, instead of a one-to-one mapping between FIG. 17A and FIG. 17B, the connector 1732 may be configured to house an SFP at 1740, and the SFP cage at 1746 would be configured to receive the SFP. In this configuration, the SFP is used as a connector. In yet another embodiment, the electrical connection between 1736 and 1742 and 1738 and 1744 are built into 1740, providing a connection similar to that of FIG. 17C.

FIG. 17C shows another alternative where the power wires 1754 and 1756 and optical fibers 1752 are connected to a custom SFP 1758. This may be a more expensive option since most available SFPs do not currently integrate power and data lines. The option provided in FIG. 17C may use active optical cables (AOC) for connections since fibers and electrical paths are built-in. The installer in this case would use a proprietary SFP connector to connect the AOC to the custom SFP 1758.

Figure 18A:
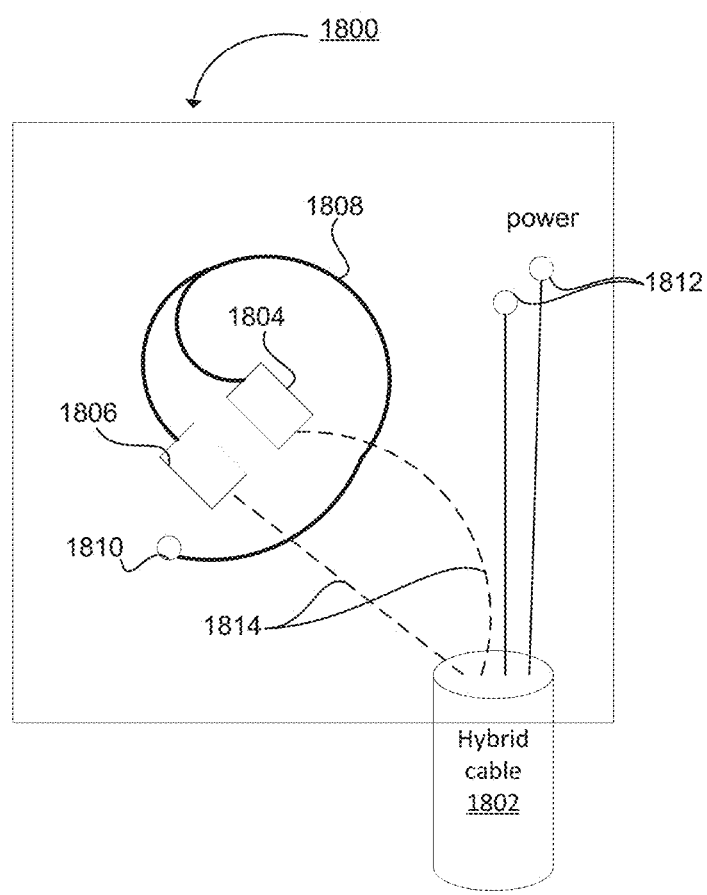
FIGS. 18A-B illustrate exemplary configurations of how to connect a hybrid cable to a connection interface device according to certain exemplary embodiments of the disclosure.
Figure 18B:
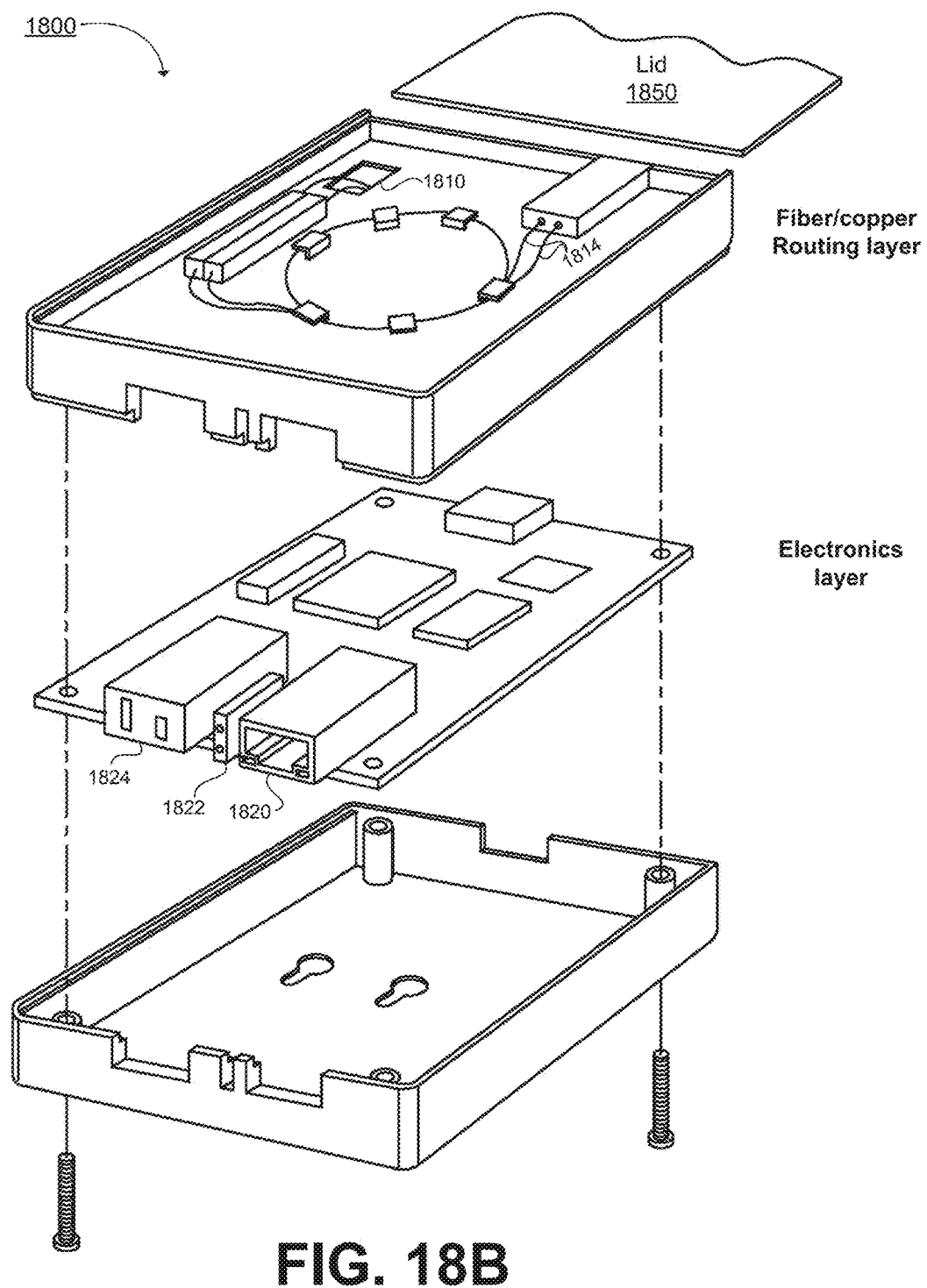

FIGS. 18A-B illustrate top and layered views of an exemplary connection interface device 1800. The connection interface device 1800 is housed in a box with a lid 1850. FIG. 18A shows the top view with the lid open. The connection interface device 1800 is multileveled with the top level providing fiber connectors 1804 and 1806. The fiber connectors 1804 and 1806 may be LC, SC, FC, other types of fiber connectors. The optical fibers 1808 are wound to accommodate multiple fiber lengths if standard lengths are being used to build the box. A hole is provided to allow the optical fibers 1808 access to the components on the lower level of the connection interface device 1800. During installation, an installer would insert hybrid cable 1802 through an opening in connection interface device 1800 and clamp the cable to secure it. The installer would then run the copper wires of hybrid cable 1802 to wire connectors 1812 and terminate the optical fibers 1814 with appropriate connectors compatible with fiber connectors 1804 and 1806. The box allows for strain relief because optical fibers 1814 may be wound multiple times within the box if the fiber lengths are too long. This provides flexibility for the installer so pre-cutting hybrid cables to precise cable lengths is not required as long as the hybrid cables are long enough. FIG. 18B shows perspective sketches of the layers of an exemplary connection interface device 1800. Cable routing is accomplished in the top layer (copper connection not shown). A cabling management system is provided in the figure. Fiber cables 1814 from the hybrid cable are wound around the cable management system. The electronics layer lies below the cable routing layer. The electronics layer provided is in accordance to an exemplary embodiment of the disclosure. The electronics layer shows a power plug 1824, light indicators 1822, and an Ethernet connector 1820 and several integrated circuits and components. In certain instances the integrated circuits may include voltage converters, media converters, powered device controllers, magnetics, etc.

The scenarios in FIGS. 15-18 are not meant to be exhaustive but are meant to provide several examples of how a hybrid cable can be connected to a connection interface device. In certain instances, buildings utilize junction boxes for better cable management, so instead of a direct connection from power insertion device to connection interface device, a junction box is used as an intermediary. FIG. 18 can be viewed as an all-in-one implementation where a junction box has been built into a connection interface device.

In an exemplary embodiment, a method for delivering power and data communication to a point of use includes providing a source of standard AC line voltage to a central location, running fiber optic cable from a remote source to the vicinity of said central location, converting said line voltage to low voltage power (e.g. about 60 volts or less) AC or DC and providing an output cable to carry said low voltage power of up to as much as about 180 watts, preferably up to about 100 watts; inserting, in a power insertion device, the low voltage power cable into a common jacket with the fiber optic cable to form a hybrid cable; and running the hybrid cable from the central location to the point of use for delivering power and data communication to one or more devices.

The hybrid cable can carry the power component in very small diameter copper wire, e.g., as small as 22 gauge, and since it carries low voltage power, it can be run, for example, under a rug or carpet.

In another exemplary embodiment, a system for delivering power and data communication to one or more end user devices includes: a fiber optic source delivering data to a location; a source of line voltage; a fiber optic cable; a power insertion device; a hybrid cable comprising a fiber optic line and a low voltage power line, wherein the fiber optic source is at a location remote from the source of line voltage and wherein the power insertion device is in the vicinity of the line voltage source.

Additional exemplary embodiments and aspects of the invention are discussed as follows.

In an exemplary implementation, an end user device is a television, comprising: an interface, configured to receive a connection to a hybrid cable; wherein the television is configured to receive low-voltage power at a voltage of approximately 60 volts or less and data communication at a rate of about 1 GbE or more via the connection to a hybrid cable. The interface may be configured to receive DC power from the hybrid cable. The television may further include an adapter, configured to up convert low-voltage power received from the hybrid cable via the interface up to approximately 120 volts, the adapter further comprising: an Ethernet connector; power and data input ports for the hybrid cable; and a media converter, configured to convert optical signals received from the hybrid cable into electrical signals suitable for the Ethernet connector.

In an exemplary implementation, an end user device is a zero-client monitor, comprising: an interface, configured to receive a connection to a hybrid cable; wherein the zero-client monitor is configured to receive low voltage power at a voltage of approximately 60 volts or less and data communication at a rate of about 1 GbE or more via the connect or to a hybrid cable.

In an exemplary implementation, an end user device is a security camera, comprising: an interface, configured to receive a connection to a hybrid cable; wherein the security camera is configured to receive low-voltage power at a voltage of approximately 60 volts or less and data communication at a rate of about 1 GbE or more via the connection to a hybrid cable.

In an exemplary implementation, an end user device is a point of purchase device, comprising: an interface, configured to receive a connection to a hybrid cable; wherein the point of purchase display is configured to receive low-voltage power at a voltage of approximately 60 volts or less and data communication at a rate of about 1 GbE or more via the connection to a hybrid cable.

In an exemplary implementation, a data and power network for an office includes: a display; an internet-enabled telephone; and an LED lamp; wherein the data and power network for the office is provided with data communication and power through a low-voltage hybrid cable; wherein the display, the internet-enabled telephone, and the LED lamp are connected to the low-voltage hybrid cable and are each adapted to run on a voltage of approximately 60 volts or less; wherein the display, the internet-enabled telephone, and the LED lamp are each provided with data communication at a data rate of approximately 1 GbE or more by the low-voltage hybrid cable.

In an exemplary implementation, a data and power network for a hotel room includes: a television; a streaming video device; an internet access device; an internet-enabled telephone; and LED lighting; wherein the data and power network for the hotel room is provided with data communication and power through one or more low-voltage hybrid cables; wherein the television, the streaming video device, the internet access device, the interact-enabled telephone, and the LED lighting are connected to the one or more of hybrid cables and are each adapted to run on a voltage of approximately 60 volts or less; wherein, via one or more fiber optic components of the one or more low-voltage hybrid cables, the streaming video device is configured to receive streaming video content and the internet access device is configured to provide internet access; wherein the television, the streaming video device, the interact access device, the internet-enabled telephone, and the LED lighting are configured to receive low-voltage power via the one or more low-voltage hybrid cables; and wherein the television, the streaming video device, the internet access device, the internet-enabled telephone, and the LED lighting are each provided with data communication at a data rate of approximately 1 GbE or more by the one or more low-voltage hybrid cables.

Exemplary Wall-Mount Embodiments

Figure 19A:
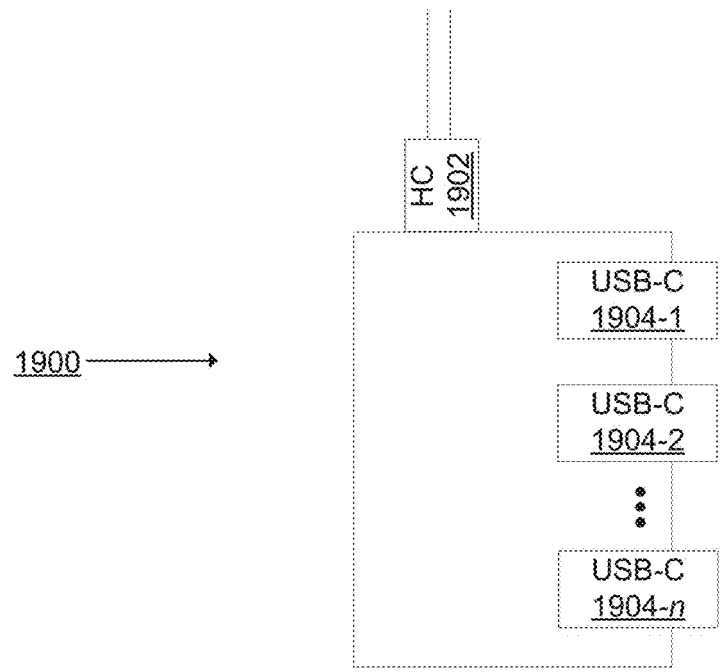
FIGS. 19A-B illustrate exemplary configurations of wallmounts according to certain embodiments of the disclosure.
Figure 19B:
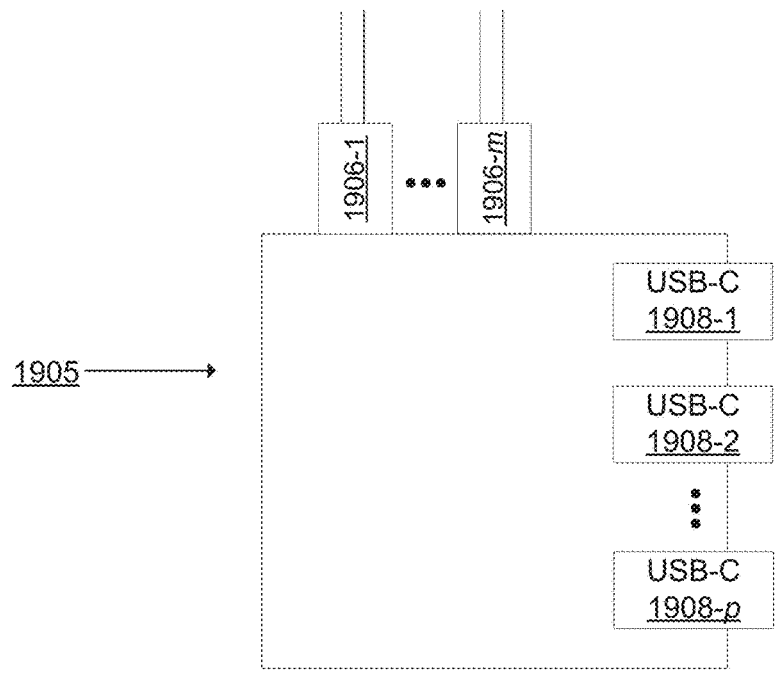

As mentioned above, various embodiments of the disclosure provide a connection interface device utilizing one or more USB interfaces. In one exemplary implementation, the connection interface device may be configured as a wall-mount or may be mounted behind the wall with only the faceplate showing. A wall-mount is a device that may be configured to attach to a wall or behind a wall in an office, a home, a hospital, etc. FIGS. 19A-B provide exemplary embodiments of wall-mount devices for providing USB-C interfaces. In FIG. 19A, wall-mount 1900 is shown to take in a hybrid cable "HC" 1902 and USB-C interfaces 1901-1 to 1901-*n*. In FIG. 19B, wall-mount 1905 is shown to take in multiple hybrid cables 1906-1 to 1906-*m* and USB-C interfaces 1908-1 to 1908-*p*. In some cases, the wall-mount 1900 of FIG. 19A receives 100 W from hybrid cable 1902 and is able to provide at most 100 W total power to the combination of USB-C interfaces 1904-1 to 1904-*n*. In some cases, the wall-mount 1905 of FIG. 19B receives multiple 100 W rated hybrid cables 1906-1 to 1906-*m* and provides power to USB-C interfaces 1908-1 to 1908-*p*. In certain exemplary embodiments, one or more of the hybrid cables 1906-1 to 1906-*m* may be used solely to provide power or solely to provide data, or may be substituted with power-only cables or data-only cables. The hybrid cables may use one or more connectors described in U.S. patent application Ser. No. 15/233,312 to make connection to the wall-mount, and may include one or more receptacles in a face plate of the wall-mount configured to receive such connectors.

The wall mount can be adapted to the application, and the internal circuitry would also be adapted to the application. The wall mount allows configurable power and interfaces for different applications. For example, in an office setting, the wall mount might have multiple USB outputs, and a desk equipment would have the appropriate corresponding USB connections. The wall mount circuitry would constitute a mapping between a number of channels (Hybrid, power only or fiber only) and a number and type of electrical outputs (Ethernet, USB, 140V, or other custom DC connector).

The wall-mount 1905 may thus be used to provide power and/or data to various devices, including, for example, televisions that need more than 100 W of power. In some embodiments, two or more USB-C interfaces that each supply up to approximately 100 W power are connected to the device to be powered, for example, in a bundled configuration where one USB-C connection is used for data and power and another USB-C connection is used for only power, to provide over 100 W of power to the device. In an exemplary embodiment, a single cable having two USB-C connectors at a connection interface device end and two USB connectors at an end device end is used. In another exemplary embodiment, a single USB-C interface may be used to provide over 100 W of power by utilizing a single USB Type-C cable capable of carrying over 100 W of power.

In other exemplary implementations, the connection interface device may include similar features as discussed above with respect to wall-mount 1900 and 1905, but the connection interface device may be configured as some other type of device, for example, as a box device or a dongle-type device intended to be located proximate to the end device to which it provides data and/or power.

Figure 20A:
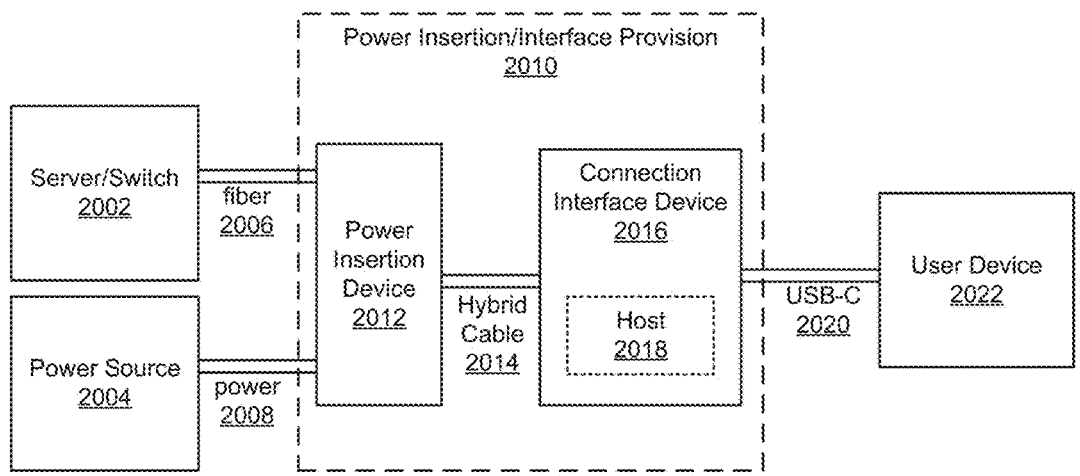
FIG. 20A illustrates an exemplary network architecture for connecting a user device to a connection interface device according to certain exemplary embodiments of the disclosure.
Figure 20B:
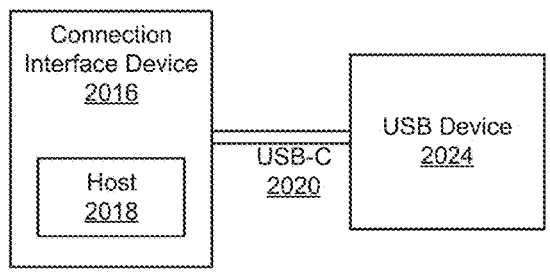
FIGS. 20B-C illustrate exemplary configurations for the connection interface device according to certain embodiments of the disclosure.
Figure 20C:
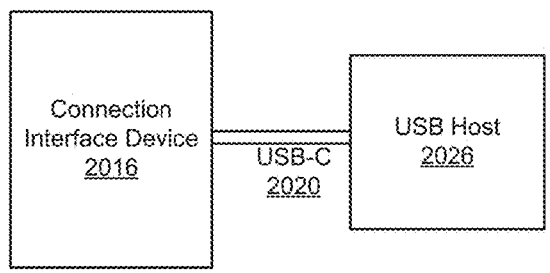

FIG. 20A provides an exemplary network architecture for connecting to a USB user device. FIG. 20A is analogous to the network architecture provided in FIG. 1B. Server/Switch 2002 provides routing for data which is carried through fiber cable 2006. Power source 2004, such as a mains power source, provides power though a power cable 2008. The separate power and data paths are combined in the power insertion device 2012 and routed with a hybrid cable 2014 according to already described embodiments of the disclosure. The hybrid cable 2014 then connects to a connection interface device 2016 which connects to a user device 2022 through a USB interface, for example, USB-C; interface and a USB-C cable 2020. The power insertion/interface provision 2010 block in the disclosure may be implemented in multiple manners, some of which have already been provided as embodiments in the disclosure. In order to cater to the "host-device" nature of USB protocols, connection interface device 2016 includes USB host 2018 (e.g., a USB host controller unit) that may be activated or deactivated depending on which user device 2022 is connected. FIGS. 20B-C provide example configurations of different end devices being connected to the connection interface device 2016.

USB design architecture is asymmetrical in topology, where a host connects to a peripheral device or a device. The host controls communication to the peripheral device, even controlling the amount of power the peripheral device draws. For example, when a mouse is plugged into a USB port of a laptop, the laptop acts as a host, communicating with the mouse and determining how much power (if any) to provide to the mouse through the USB port. In FIG. 20B, the connection interface device 2016 activates USB host 2018 when a peripheral-type USB device 2024 (e.g., a monitor) is connected through USB-C cable 2020. USB host 2018, which may include a USB transceiver, is configured to determine how much power to provide to USB device 2024 and to facilitate data communications through the USB-C cable 2020.

Since a host controls communications with a peripheral device in USB architecture, some USB devices have a host controller embedded. For example, a smartphone may be connected to a laptop through a USB cable. The smartphone may act as a host, requesting a certain amount of power from the USB port of the laptop. FIG. 20C provides a situation where a device that may act as a host connects to the connection interface device 2016. In FIG. 20C, the connection interface device 2016 deactivates the USB host 2018 when a USB Host device 2026 (e.g., a laptop device that acts as a host relative to the connection interface device 2016) is connected through USB-C cable 2020. The connection interface device 2016 will not activate host 2018, allowing the connected USB Host device 2026 to request a certain amount of power from connection interface device 2016. USB-C for example may provide 100 W to a TV when connected in this configuration based on a host controller in the TV requesting 100 W.

FIGS. 20A-C provide examples using USB communication protocol, specifically USB-C communication protocol. This may be extended to other asymmetric protocols with a hierarchy similar to the host and device roles. It will be appreciated that the host may be responsible for facilitating data communication, as well as providing or requesting power, over one or more of the USB ports. For example, in the embodiment of FIG. 19A, although not depicted, a host may be responsible for facilitating data exchange and power provision via the USB ports (1904-1 to 1904-*n*. A switch, which may be included or separate from the host, may further be responsible for facilitating data communications over the hybrid cable 1902 with respect to which USB ports) are active for data communications via the hybrid cable 1902).

Exemplary Solid State Lighting Embodiments

Lighting infrastructure is being transitioned to Solid State Lighting (SSL), and new opportunities and rewards are available by combining increases in network intelligence with the SSL function. Exemplary embodiments of the invention provide intelligent lighting systems (referred to as "Connected Lighting"). Connected Lighting utilizes high speed communications with open protocol standards to make the SSL function part of the larger IP network, allowing for all new and innovative apps to not only provide lighting more efficiently but also to provide it at the right time in the right place and with the right spectrum. In addition, connected lighting allows traditional SSL fixtures to be combined with sensors, building controls and security systems to create multi-functional fixtures. Unfortunately, most proposed connected SSL technologies do not meet all of the challenges presented to future SSL systems such as being able to combine powering with communicating, and high speed data functions with low speed lighting and building controls in a way that reduces capital expenditure (CAPEX), minimizes energy usage, reduces operating expense (OPEX), and in a manner that is completely secure, reliable, and meshes to create only one building network instead of the multiple siloed networks that currently exist. Exemplary embodiments of the invention provide significant improvements in this degree of connectivity as well as in powering to allow connected SSL system to achieve various advantages over conventional SSL technologies.

First generation systems use CAT5 and PoE for lighting, and second generation systems utilize the networked structure of first generation systems providing camera integration and wireless access points (WAPs) using CAT5 and PoE/PoE+. In the first and second generation systems, each light needs a cable and there is no easy method of sharing the cable between light fixtures due to the low power rating of the first and second generation systems. The inability to share cables complicates cable management and reduces device integration. In contrast, embodiments of the invention provide a third generation of integration where WAPs can achieve 1 Gb speeds, higher resolution cameras (e.g., 8K cameras) can be installed in a ceiling, and in addition monitors may also be mounted on the ceiling. With the high resolution and the increased speed, fiber is utilized to handle communication data rates lacking in long CAT5 cables. With the use of monitors and high resolution cameras, increased power consumption beyond what PoE/PoE+ can supply is also desired. As such, embodiments of the invention integrate multiple devices, supporting delivering of higher power and supporting communication at higher data rates compared to first and second generation systems.

Figure 22:
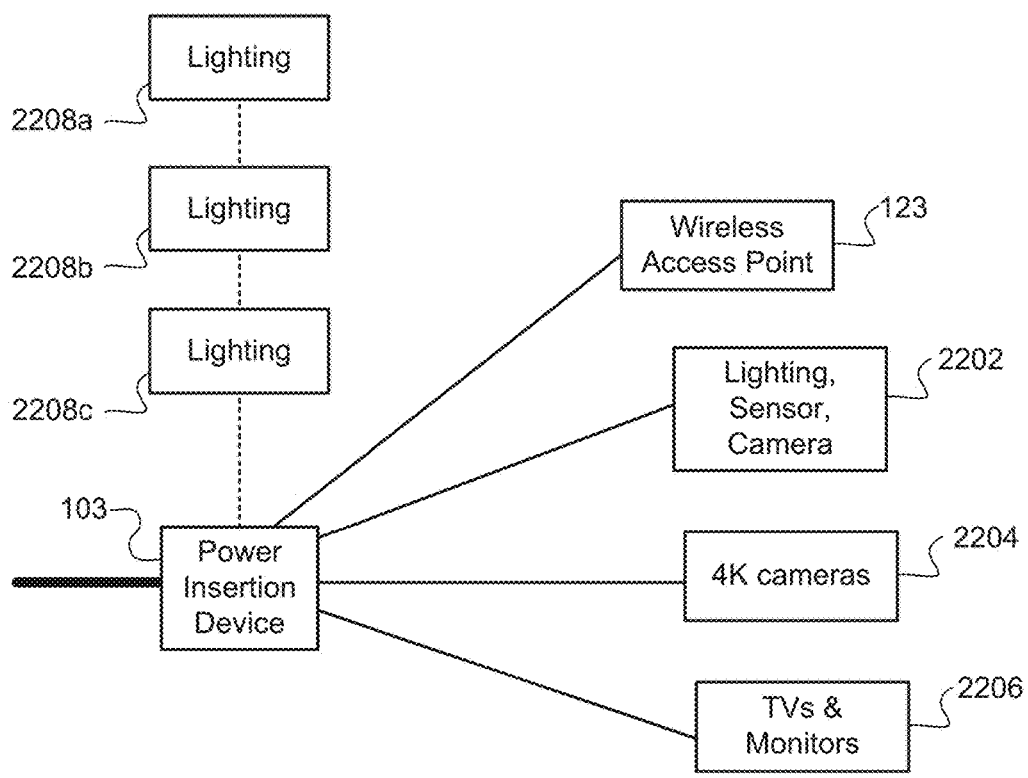
FIG. 22 illustrates an architecture for supporting Solid State Lighting (SSL) according to an embodiment of the disclosure.

In order to meet these challenges, exemplary embodiments of the invention support connected SSL applications that provide order of magnitude reductions in CAPEX as well as OPEX, and open whole new areas such as facial recognition lighting control and security by creating an advanced digital ceiling. FIG. 22 illustrates an exemplary architecture for supporting SSL according to an embodiment of the disclosure. The architecture in FIG. 22 supports SSL and provides a digital ceiling where a single low cost network provides for both low and high speed communications and the maximum amount of power available in a low voltage system instead of having networks of SSL, building controls, security, communications and ceiling mounted monitors. In FIG. 22, the power insertion device 103 connects to end devices 123, 2202, 2204, and 2206 using hybrid cables, and connects to lighting devices 2208a, 2208b, and 2208c using a single copper cable. The lighting devices 2208a, 2208b, and 2208c share a single electrical cable coming from the power insertion device 103 which can perform low speed communication on the electrical cable to control lighting states of each of the lighting devices 2208a, 2208b, and 2208c.

Exemplary embodiments of the invention include SSL to create a single network digital ceiling. Exemplary embodiments of the invention provide at least the following technological advantages. First, the integration of the PoE standard and the use of lower AWG wire preserves low cost, allows for longer distance with very low PR loss and provides for powering up to 100 W. Second, the use of future proofed fiber optics allows for SSL and other enterprise communications to be unified and on a single network, unlike the multiple siloed networks found in first and second generation systems. Third, the PoE standard is worldwide with very low cost components and compatibility with a wide array of devices. Thus, using the LTPoE++ system, which is completely compatible with all existing PoE devices and standards, inherits these advantages and provides for 100 W powering. Fourth, the 100 W powering capability allows for banks of lights to be ganged together for powering, reducing the cable count while still providing for individual control.

Further technological developments of embodiments of the invention further including providing a pure layer 1 architecture that is completely compatible with any Ethernet connected device or any PoE Ethernet connected device. In addition, embodiments of the invention provide for an advanced digital ceiling, where everything, from SSL to WAPs to ceiling mounted monitors and TVs can be both powered and communicated with. Embodiments of the invention further provide for digital ceilings that are also 100% low voltage with significant installation savings due the fact that no line voltage systems requiring adherence to building codes and licensed electricians are required. Cables used with embodiments of the invention are hybrid fiber/copper cabling that are essentially "doorbell" cable from an installation perspective. The cables comes complete with hybrid connectors that make installation quick and easy for even the most minimally trained persons.

Exemplary embodiments of the invention include SSL, creating a universal low voltage, high speed digital network. The embodiments include 10 Mbs Ethernet connectivity on a low AWG copper only cable, and provides for reductions in the size and cost of components to create an advanced digital ceiling network incorporating SSL, building controls, co-located SSL and security components and high power devices such as ceiling-mounted TVs and ceiling fans.

There are two basic methods for connecting with the SSL system. The first is via wireless, utilizing one of the many wireless protocols such as WiFi, Zigbee, Bluetooth and other proprietary systems that might become standards such as those developing into standards to serve Internet of Things (IoT) technologies. These wireless technologies have the advantage that they are easy to deploy in existing SSL systems as no new wires are required. PoE SSL approaches have the advantage that they handle both the powering and interconnecting problem through the use of home run CATx cable runs. In new builds or lighting retrofits, the PoE approach has the distinct advantage in the considerable CAPEX savings that can be realized by obviating the need for a very expensive line voltage electrical network. With RJ45 type connectors, basic IT personal can deploy these technologies in a plug and play system. The IP nature of the PoE approach means that the system can be configured and running in minutes. The PoE system is inherently safer as the electrical fire hazard is removed and the system is more secure. Moreover, performance of WiFi type networks degrade rapidly as the number of devices attached to the network increases. Adding hundreds of devices to an existing WiFi network will degrade the performance of the network for normal computing users.

The drawbacks of using PoE over traditional CATx cable is due to 28AWG wire being a poor solution for power delivery. In traditional 15 W PoE systems, low currents keep the power losses low over reasonable distances, but this very much limits the amount of power that each luminaire can handle, which leads to a large proliferation of luminaire fixtures and a large proliferation of cables. Moving to higher power, PoE+ 30 W and PoE++ 60 W systems allow for larger and fewer SSL fixtures but at the cost of larger cable $I^2R$ power losses. PoE++ begins with a 90 W capability to supply 60 W to the fixture. This cable loss demands that the number of PoE switches in an enterprise increase in order to reduce the distance from the switch to the fixture. The increase in switches erases many of gains from going to SSL lighting in the first place. Furthermore, future ultra-high definition (UHD) security cameras and Gbs WiFi WAPs are going to 10 G interfaces which will utilize fiber links, relegating the connected SSL network as a separate network within the enterprise environment.

To counter these drawbacks of using wireless systems or PoE over traditional CATx, embodiments of the invention provide an advanced implementation of connected SSL. The generation beyond connected SSL—the digital ceiling—connects all of the ceiling functions into a seamless IP network. Embodiments of the invention go beyond the digital ceiling in that not only is future proof fiber interconnectivity supplied, but also the highest powering available is provided while staying below UL and National building code restrictions for low voltage cabling. Using 22 AWG or 18 AWG stranded wire to accompany a fiber optic link for interconnections breaks the locking of power, data rate, and distance limitations that occurs in 28 AWG CATx cable. With this hybrid architecture, the voltage drop can be minimized for a given distance by selecting the desired AWG of the wire to be used. PoE signaling works well over these types of cable. Little or no cable loss can be designed in to preserve the high energy efficiency of the connected SSL system.

Embodiments of the invention combined with connected SSL provides advantages in that they have a low CAPEX cost of PoE based SSL with a more efficient system with lower cable loss. In addition, embodiments of the invention provide high power which allows for powering many fixtures off of a single cable while still controlling luminaire fixtures individually. This further reduces CAPEX cost over standard CATx PoE SSL in that fewer cables are needed. In addition, since there is only one ceiling network, CAPEX and OPEX are further reduced because the SSL system is an extension of the WAP and/or security systems and the SSL CAPEX and OPEX are subsumed in the computer IP network. In addition, luminaire functional integration can occur as 4K UHD and higher cameras and WAPs can be incorporated in lighting fixtures with fiber optic links to the cameras. This further reduces CAPEX and OPEX costs as the number of ceiling devices is greatly reduced.

By using lighting fixtures that have either WAPs and UHD cameras built into the fixtures (or fixtures with neither), a complete digital ceiling can be created where all of the lighting control functions and security functions are provided by the fixtures themselves. Items like occupancy sensors and daylight sensors are eliminated.

Using embodiments of the invention, advanced vision systems can take over most if not all functions in an intelligent building, thus creating a hyperconnected and hyper intelligent building. Traditionally, buildings include one or more sensors, e.g., motion sensors, occupancy sensors, and thermal sensors. Cameras (visible and thermal) can take over these functions. A proliferation of cameras, along with facial recognition and image processing with tracking, allows for a whole new set of applications in enterprises and residences. In large workplaces, a lot of time can be spent looking for other people. With a proliferation of cameras and image processing, people can be easily located. Embodiments of the invention provide for enhanced security by taking current device integration levels, which allow determination that someone entered the building or that someone or something tripped a motion sensor, to a much higher integration level which enables determination of who exactly entered the building and where exactly they are.

Various exemplary embodiments of the invention provide at least the following features and advantages:

1. A low data rate Ethernet signaling method to allow for an all copper option. This involves utilizing the Power Line Communications (PLC) standard to provide Ethernet like communications over lower AWG non twisted pair cable.
2. A method for connecting multiple fixtures to a single power cable but being able to communicate to each fixture independently. A universal interface to allow for multi or single fixture powering.
3. A method for incorporating a 4K UHD camera into a standard SSL fixture to provide for SSL powering and control as well as providing 10 G Ethernet capability.
4. A method for incorporating a WAP into a standard SSL fixture to provide for SSL powering and control as well as providing 10 G Ethernet capability.
5. Architectures and designs for using UHD camera capability to provide all security and lighting control functions from facial recognition, occupancy sensing, daylighting controls, light harvesting, demand response and building automation system (BAS) lighting systems.
6. Architectures and designs for integrating 48V to 60V solar based systems directly to the digital ceiling/connected solar systems. Distributed batteries at the fixture level for lighting/solar integration.

In SSL control systems the data rates from turning on the lights and dimming are very low. Thus, it may not be necessary to run two fibers with 10 G capability and optical transceivers to an SSL fixture. Embodiments of the invention provide the capability for copper only links but using lower AWG wire than is afforded by CATx cable. These exemplary embodiments may include a power line communications (PLC) system that rides on the copper power lines.

Figure 23:
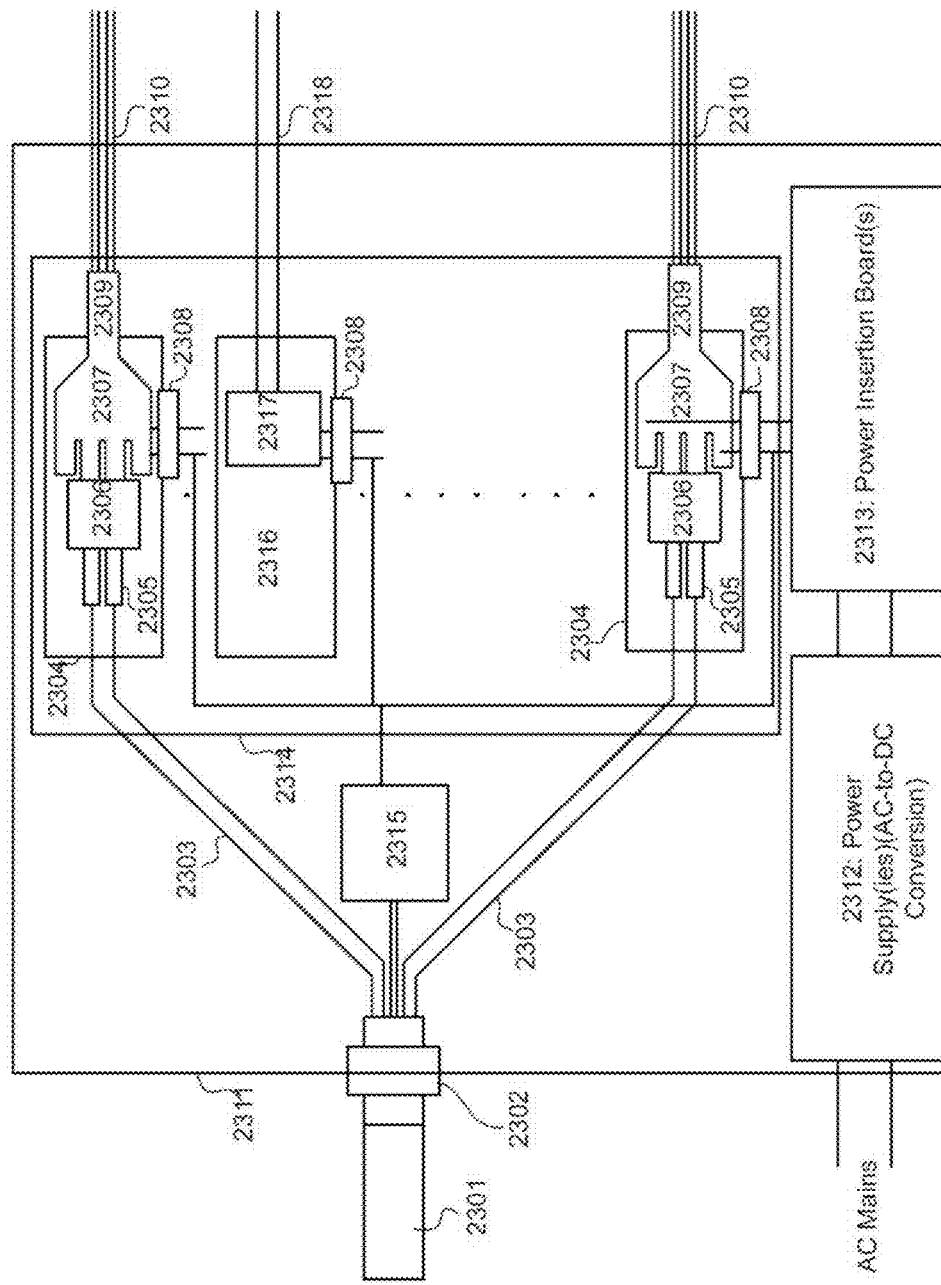
FIG. 23 is a block diagram illustrating components of a power insertion device in another exemplary embodiment.

FIG. 23 is a block diagram illustrating components of a power insertion device 2300 in an exemplary embodiment. A fiber connection 2301 from a network is input into a housing 2311 of the power insertion device 2300 via one or more bulkhead connectors 2302. In one exemplary implementation, the fiber connection 2301 may include one or more multi-fiber cables containing, for example, up to 24 or 48 fibers connected to one or more multi-fiber bulkhead connectors (e.g., Multi-fiber Push On (MPO) multi-fiber bulkhead connectors).

A plurality of bi-directional fiber links 2303 connect from the bulkhead connector 2302 to a plurality of interface cards 2304, each interface card 2304 in this example corresponding to one bi-directional link 2303 having two fibers. The interface card 2304 includes a board which provides a removable fiber connection and power insertion through a dual bulkhead connector 2306. Each interface card 2304 further includes an electrical connector 2308. One or more fiber connectors 2305 (e.g., of LC or SC or other types) allow a bi-directional fiber link 2303 to be connected to a fiber bulkhead connector 2306, and the electrical connector 108 provides power to each interface card 104. A connector assembly 2307 at the end of a hybrid fiber (for data) and wire (for power) cable 2310 (shown unsheathed), with a strain relief 2309, is connected to the dual bulkhead connector 2306 and receives power from the interface card 2304 so as to provide power and enable data communications via respective wires and fibers of the hybrid cable 2310 (shown unsheathed).

The plurality of interface cards 2304 are connected to a distribution board 2314 which distributes power for each interface card 2304 via respective electrical connectors 2308. The electrical connectors 2308 may be, for example, backplane connectors which not only provide power to the interface card 2304, but also provide mechanical support to the interface card 2304 for holding each interface card 2304 vertically in place within the housing 2311.

The source of the power for the power insertion device 2300 may be, for example, AC mains power (e.g., 110-120 or 220-240 V AC) which is input into one or more power supplies 2312. The power supply(ies) 2312 convert the AC mains power to DC power and reduce the high AC line voltage to a relatively low DC voltage (e.g., 110-120 or 220-240 V AC to 60 V DC). The reduced DC voltage is provided to one or more power insertion boards 2313, which may be power sourcing equipment (PSE) board(s) (e.g., PoE++ PSE multichannel board(s) having 24 channels). The power insertion board(s) 2313 provide power (e.g., PoE power at 55 V) for the output hybrid cables 2310 and the wire cables 2318 via the distribution board 2314 and the interface cards 2304.

As discussed above in the context of SSL, there are situations where certain end devices may only need power (and do not need data) or may utilize a low data-rate channel over electrical wires (together with the provision of power) such that fiber connections need not he provided to all end devices. For example, in a drop ceiling environment, control signals for certain devices such as security cameras, wireless access points, motion sensors, building monitors, lighting, etc. may be provided through electrical wires through low data rate signaling without the need for running fiber to those devices. Thus, for such devices, instead of using an interface card 2304 that connects to an output hybrid cable 2310 having both fiber and wire connections, an interface card 2316 that connects to an output cable 2318 having only wire connections may be used.

As shown in FIG. 23, a bi-directional fiber link 2303 may be connected to a system 2315 that includes electronics which provide a low data rate signaling scheme for 18 AWG or 22 AWG wires (e.g., a modulator). The PLC system 2315 is connected to an interface card 2316 having an electrical-only connector 2317 which connects to an electrical-only (wire-only) cable 2318 (shown unsheathed). Like the interface card 2304, the interface card 2316 is supplied with power (e.g., 55 V DC PoE power) via the distribution board 2314. The low data rate modulation signal generated by the optical-to-electrical conversion board 2315 is mixed with the power and provided over the electrical-only cable 2318 together with the PoE power. Additional information on a power insertion device as shown in FIG. 23 is discussed in U.S. application Ser. No. 15/262,454 filed Sep. 12, 2016. The PLC system 2315 can implement a power line communications protocol for SSL luminaire control.

Various standards have been developed in order to ensure reliable communications and inter-operability, especially for the smart grid and home networking. Examples of such standards along with the organizations that govern them like CENELEC, FCC, ARIB, Homeplug Power Alliance specify ranges for operation of PLC. If a worldwide standard for PLC were to be established, this would have a positive impact on adoption of PLC. So far, the G3-PLC standard is touted as the most robust scheme available, and the IEEE 1901.2 working group is committed to developing a universally acceptable standard.

A variety of modulation schemes can be used in PLC. Some of these are Orthogonal Frequency Division Multiplexing (OFDM), Binary Phase Shift Keying (BPSK), Frequency Shift Keying (FSK), Spread-FSK (S-FSK) and proprietary schemes too (for example Differential Code Shift Keying (DCSK) from Yitran). OFDM, in particular, offers high data rates, but requires computational horsepower to churn out Fast Fourier Transforms (FFT) and Inverse-FFT (IFFT). On the other hand, BPSK and FSK are robust and simple but offer lower data rates. The current trend is to move towards OFDM with PSK modulation (G3 and probably P1901.2). Heavy computation will require DSP capability, whereas FSK, PSK and SFSK can be accomplished by a microcontroller.

The selection of the design and development of the PLC method should mesh with the needs of PoE luminaire control and is of low cost and reliable and robust. The chosen PLC method should also not interfere with PoE signaling protocols.

Figure 24:
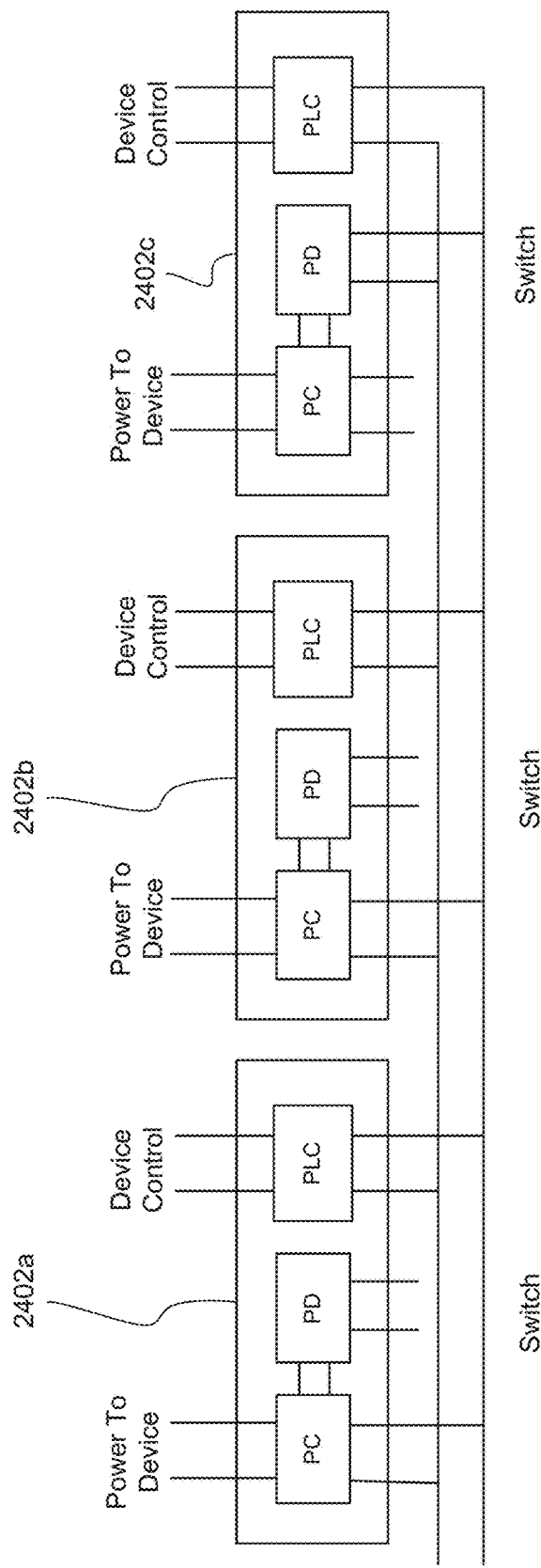
FIG. 24 illustrates a master tap for connecting multiple SSL fixtures on a single PoE line according to an embodiment of the disclosure.

Embodiments of the invention power multiple devices from a single PoE of power line. For example, an optical transceiver device connected to a PoE device, such as a PoE Camera or WAP, can be powered. In an embodiment, a "Master-Tap" method is utilized as depicted in FIG. 24. FIG. 24 illustrates a master-tap architecture for connecting multiple SSL fixtures on a single PoE line according to an embodiment of the disclosure in FIG. 24, the master-tap architecture includes a chain of control devices, each connected to a respective lighting device, with switches. Each control device may include, for example, a power controller (PC), a PoE powered device (PD) chipset, and a Power Line Communications (PLC) chipset as depicted in FIG. 24. Each control device 2402*a*, 2402*b*, 2402*c* may be operated as a PD (corresponding to a power-requesting mode where the control device is the "master") or as a non-PD (corresponding to a power-leeching mode where the control device is a "tap"). The final device in the chain is the master, as it uses its PoE PD capability to communicate with the PSE and request power for the entire chain. For example, in FIG. 24, 2402*c* may be the master while 2402*a* and 2402*b* are taps. Each of the tap devices in the chain sees the 55V PoE voltage and taps into the power flow established by the master and through power conversion devices develops the voltages required for its own needs. In a situation where the lighting device connected to the control device 2402*c* is off, a previous control device in the chain, such as control device 2402*b*, may be operated as the master while control device 2402*a* is operated as a tap.

In the universal device electronics embedded on each fixture, a switch sets the final device in the chain as the master and its PD electronics communicate with the PSE. The other devices in the chain act as taps to tap off the 55V PoE power line. The PLC functionality allows for each fixture to be individually controlled. In an embodiment, in the design and installation process, the number of devices in the chain are selected to be under the 100 W limit, and the switches are set to establish the masters and the taps.

Depending on the power requirements of each fixture, the master-tap capability can lead to a factor of 2 to 10 reduction in the number of cables that need to be pulled in a PoE based connected lighting design. The master-tap capability for light fixtures provides a number of SSL lighting fixtures on a single power line while allowing multiple addressability.

4K UHD cameras and WAPs often utilize 1 G Ethernet connections. Moving to Cameras greater than the 8 MP required by 4K UHD or 1 Gbs per user WiFi may utilize interconnects at a 10 G rate which is available through fiber connections. Given this progression, 10 G capability is desirable. Mulitmode SFP+ transceivers are relatively inexpensive and further cost reductions are expected. In an embodiment of the invention, CREE Z24 2×4 LED fixtures can be modified for this capability.

Figure 25:
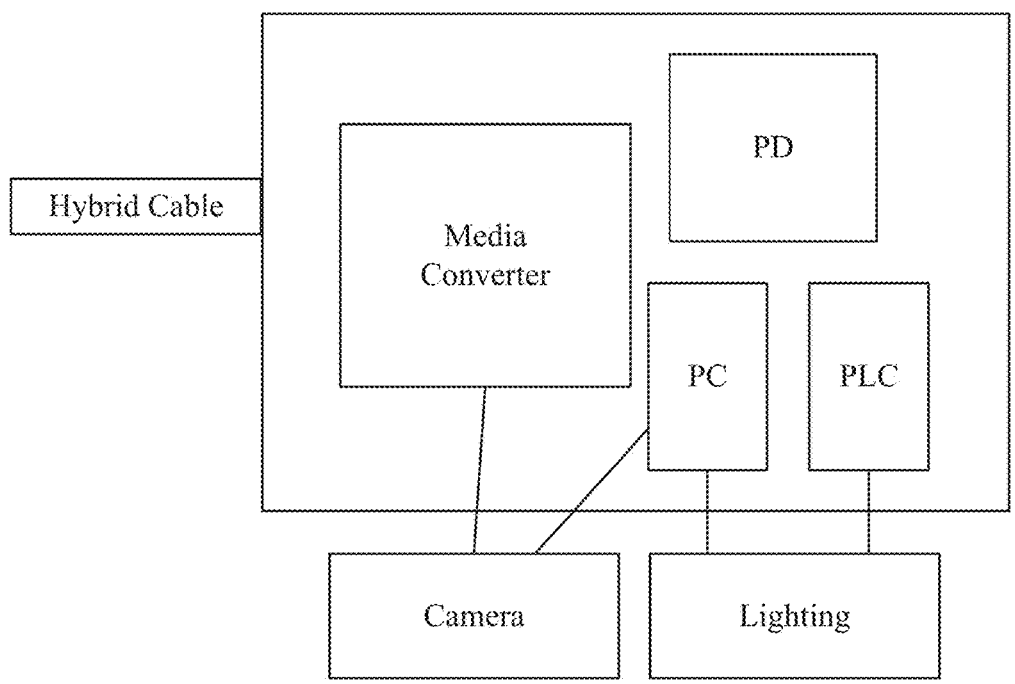
FIG. 25 illustrates a connection interface device according to an embodiment of the invention.

FIG. 25 illustrates a connection interface device according to an embodiment of the invention. As illustrated in FIG.

25, the connection interface device receives a hybrid cable which provides power through copper and data communication through fiber. The connection interface device includes a media converter that supports high data rates (e.g., an SFP+ 10 G media converter that supports a data rate of 10 G). Also as discussed above, the connection interface device includes a power controller (PC) for providing power to connected end devices (such as a camera and/or lighting device(s)) and includes PLC capability for providing communication via copper to the lighting device(s). The connection interface device includes one or more outputs for integrating multiple components, e.g., a directional camera, a 360 degree camera, a WAP, and so on. The media converter, which may have SFP+ capability, may also work at the 1 G Ethernet rate. When the higher data rate cameras and WAPs come on the market, they can be easily adapted into the existing fixture. FIG. 25 illustrates a connection interface device for integrating high speed cameras and WAPs with lighting fixtures.

As discussed above, there are a number of devices conventionally utilized in lighting control operations, such as occupancy sensors and light sensors for daylighting and other balancing features. Exemplary embodiments of the invention, however, provide connected SSL architectures whose lighting control and security features can be completely integrated. The falling costs for higher and higher resolution cameras, and the ability to integrate and power them at higher and higher data rates, will lead to a proliferation of cameras in the enterprise, especially if they are seamlessly integrated with the SSL network. This proliferation of cameras allows for all of the intelligent lighting functions to be accomplished via a security vision system.

With embodiments of the invention, individuals could be recognized when they walk in the building and the lighting in their work area brought up and adjusted to their preset preferences. Instead of the hard turn on and off of a lot of current occupancy lighting controls, soft increases and decreases of both illumination and spectral levels can be achieved. When combined with an advanced vision system, there is no limit to the intelligence that can be added to the SSL system. Low cost IR cameras may provide a way to add temperature measurements to this vision system as well.

Figure 26:
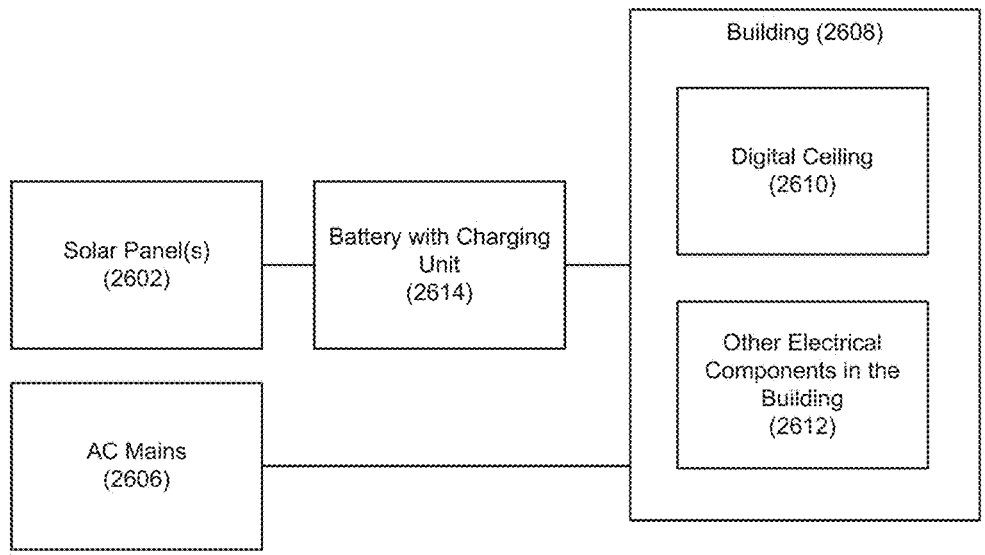
FIG. 26 illustrates tying solar panels to a centralized battery storage for powering electrical components in a building according to an embodiment of the disclosure.
Figure 27:
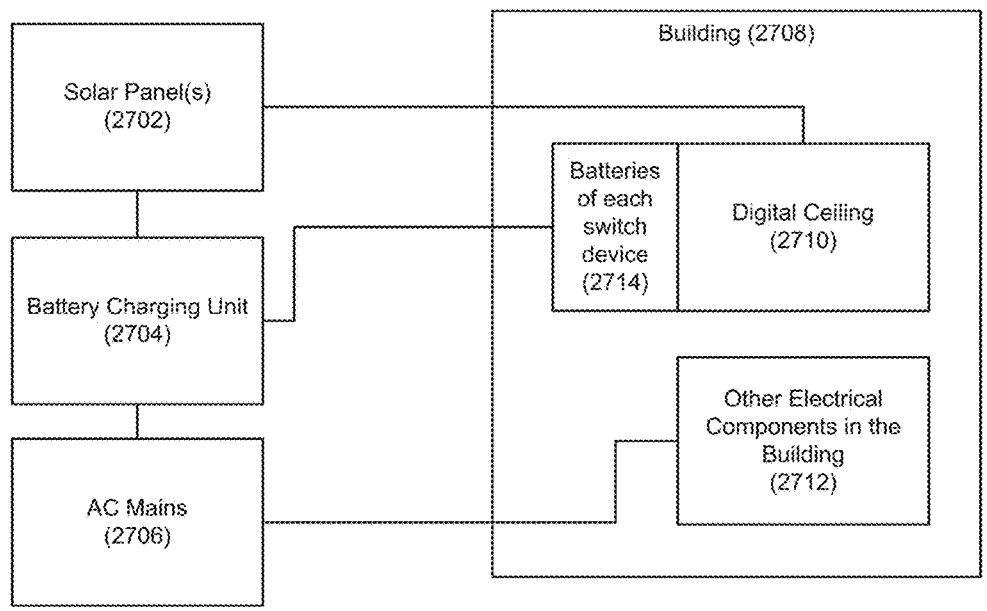
FIG. 27 illustrates tying solar panels to distributed connection interface devices powering a digital ceiling according to an embodiment of the disclosure.

Embodiments of the invention encourage the movement towards zero client computing environments which creates opportunity for PoE systems with 100 W transmission and channel bonding to 200 W and even higher power levels allows for an entire office to be completely PoE powered. Embodiments of the invention enable providing a majority of the energy needs in a building using PoE or USB low voltage power systems. For 100 W transmission a 60V power supply is used which is trimmed to 58V. The PoE transmission is at 56V. In some embodiments, solar panel(s) and batteries can be integrated into PoE systems. In some embodiments, a solar system may further be tied to the digital ceiling. FIG. 26 illustrates tying solar panel(s) 2602 to a centralized battery with charging unit 2614 for powering electrical components in a building 2608. FIG. 27 illustrates tying solar panel(s) 2602 to distributed connection interface devices powering a digital ceiling 2710. FIG. 26 illustrates a centralized battery system, and FIG. 27 illustrates a non-centralized battery system.

In FIG. 26, DC power of the solar panel(s) 2602 is provided to a centralized battery with charging unit 2614 for use in the building 2608. The battery with charging unit 2614 can be charged by the solar panel(s) 2602. The AC mains 2606 is used to power the building 2608. In some embodiments, the digital ceiling 2610 is powered primarily (or exclusively) by the solar panel(s) 2602 while other electrical components in the building 2612 are powered by the AC mains 2606. In some embodiments, based on the capacity of the solar panel(s) 2602, electrical appliances in the building 2612 that operate on DC power are powered by the solar panel(s) 2602 while electrical appliances that rely on AC power, e.g., washing machines, are powered by the AC mains 2606. Power insertion devices for the building 2608 can be located close to lights in order to limit wiring runs to connection interface devices or switches.

In FIG. 27, the solar panel(s) 2702 can directly power the digital ceiling 2710, separating powering of the digital ceiling 2710 from powering of other electrical components in the building 2712. In some embodiments, the AC mains 2706 charges batteries in each connection interface device 2714 associated with the digital ceiling 2710. In some embodiments, the solar panel(s) 2702 charges batteries in each connection interface device 2714. The battery charging unit 2704 receives power from the solar panel(s) 2702 and/or the AC mains 2706 for charging the batteries 2714. Thus, a non-grid tied digital ceiling vs. a grid tied digital ceiling can be built since the solar panel(s) 2702 can be dedicated to the digital ceiling 2710 in one scenario and the AC mains can charge batteries 2714 used for the digital ceiling 2710 in another scenario.

It will be appreciated that solar panel(s), charging units, and AC mains may be flexibly connected with batteries, a digital ceiling, and other electrical components in various other arrangements other than the exemplary arrangements depicted in FIGS. 26-27, so as to achieve various degrees of powering the digital ceiling through the solar panel(s) relative to powering the digital ceiling through the AC mains. To the extent the solar panel(s) are connected directly to a digital ceiling, an inverter system may not be needed such that significant cost savings may be achieved.

It will be appreciated that control logic discussed above may be implemented in hardware, firmware, and/or software in different exemplary implementations of the invention.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A power insertion device, comprising:
   an input interface, configured for receiving a fiber connection from a fiber network;
   an output interface, comprising:
      one or more hybrid cables for connection to one or more end devices, each of the one or more hybrid cables including fiber for data communication and wire for power transmission, and
      one or more wire cables for connection to one or more lighting devices;
   a mains power interface, configured to receive alternating current (AC) mains power;
   one or more power supplies, configured to convert the AC mains power to direct current (DC) power; and
   a power insertion board, configured to provide power insertion of the DC power out through the one or more hybrid cables and the one or more wire cables.

2. The power insertion device according to claim 1, further comprising:
   one or more interface cards to which the one or more wire cables is connected, wherein the power insertion of the DC power out through the one or more wire cables includes power insertion of the DC power out through the one or more wire cables via the one or more interface cards to which the one or more wire cables is connected.

3. The power insertion device according to claim 2, further comprising:
   a power lines communication (PLC) system configured to generate low data rate signaling for at least one of the one or more wire cables.

4. The power insertion device according to claim 3, wherein:
   the power lines communication (PLC) system is configured to generate low data rate signaling for controlling at least two lighting devices via a first wire cable of the one or more wire cables.

5. The power insertion device according to claim 1, wherein the AC mains power is received at a higher voltage compared to a voltage of the DC power.

6. The power insertion device according to claim 1, wherein a first wire cable of the one or more wire cables is connected to a plurality of lighting devices.

7. A system, comprising:
   a power insertion device connected to an end of a fiber connection, configured to:
      provide optical routing with respect to channels of the fiber connection via one or more hybrid cables output from the power insertion device and to provide power insertion for the one or more hybrid, cables, and
      provide power and low data rate signaling via one or more wire cables output from the power insertion device;
   one or more end devices connected to the power insertion device via the one or more hybrid cables, configured to receive data communications from one or more fibers of the one or more hybrid cables and receive power from one or more wires of the one or more hybrid cables; and
   one or more lighting devices connected to the power insertion device via the one or more wire cables, configured to receive power and low data rate signaling from the one or more wire cables.

8. The system according to claim 7, wherein a power source for the power insertion device is mains power.

9. The system according to claim 7, wherein a power source for the power insertion device is a solar panel.

10. The system according to claim 9, further comprising:
    a battery, configured to store power from the solar panel.

11. The system according to claim 7, further comprising:
    one or more connection interface devices, wherein at least one lighting device is configured to receive power and low data rate signaling from the one or more wire cables through a connection interface device of the one or more connection interface devices.

12. The system according to claim 11, wherein:
    the one or more lighting devices comprises at least two lighting devices;
    each lighting device is connected to a corresponding connection interface device; and
    the power insertion device is configured to provide power and low data rate signaling to the at least two lighting devices via a first wire cable connected to the at least two lighting devices via each of the corresponding connection interface devices.

13. The system according to claim 12, wherein:
    the corresponding connection interface devices are arranged in a manner such that one corresponding connection interface device is a master device while the remaining corresponding connection interface devices are tap devices; and
    the power insertion device is configured to provide power to the master device and the tap devices via the first wire cable.

14. The system according to claim 11, wherein:
    at least one connection interface device of the one or more connection interface devices includes a battery.

* * * * *